US009495927B2

(12) United States Patent
Takatori et al.

(10) Patent No.: US 9,495,927 B2
(45) Date of Patent: *Nov. 15, 2016

(54) LIQUID CRYSTAL DISPLAY APPARATUS, DRIVING METHOD FOR SAME, AND DRIVING CIRCUIT FOR SAME

(71) Applicant: NLT TECHNOLOGIES, LTD., Kanagawa (JP)

(72) Inventors: Kenichi Takatori, Kanagawa (JP); Hiroyuki Sekine, Kanagawa (JP); Ken Sumiyoshi, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 119 days.

This patent is subject to a terminal disclaimer.

(21) Appl. No.: 14/453,229

(22) Filed: Aug. 6, 2014

(65) Prior Publication Data
US 2015/0035737 A1    Feb. 5, 2015

Related U.S. Application Data

(62) Division of application No. 11/300,483, filed on Dec. 15, 2005, now Pat. No. 8,836,621.

(30) Foreign Application Priority Data

Dec. 15, 2004    (JP) .................. 2004-363407

(51) Int. Cl.
G09G 3/36    (2006.01)
G09G 3/20    (2006.01)
G02F 1/133    (2006.01)

(52) U.S. Cl.
CPC ......... *G09G 3/3655* (2013.01); *G02F 1/13306* (2013.01); *G09G 3/2014* (2013.01);
(Continued)

(58) Field of Classification Search
CPC .................. G09G 2320/041; G09G 2330/021; G09G 2340/16
(Continued)

(56) References Cited

U.S. PATENT DOCUMENTS 4,596,446 A    6/1986 Waters et al.
4,715,688 A    12/1987 Harada et al.
(Continued)

FOREIGN PATENT DOCUMENTS

CN    1348166 A    5/2002
EP    0 704 514 A2 *    3/1996
(Continued)

OTHER PUBLICATIONS

H. Nakamura, et al., "Modified drive method for OCB LCD"; IDRC 1997; pp. L-66 to L-69.
(Continued)

*Primary Examiner* — William Boddie
*Assistant Examiner* — Leonid Shapiro
(74) *Attorney, Agent, or Firm* — Sughrue Mion, PLLC

(57) ABSTRACT

The liquid crystal display apparatus is provided with a display unit, a video signal driving circuit, a scanning signal driving circuit, a common electrode potential controlling circuit, and a synchronizing circuit. The display unit has a scanning electrode, a video signal electrode, a plurality of pixel electrodes arranged in matrix form, a plurality of switching elements which transmit video signals to the pixel electrodes, and a common electrode. After the scanning signal driving circuit scans the entire scanning electrodes and transmits video signals to the pixel electrodes, the common electrode potential controlling circuit changes the potential of the common electrode into a pulse shape, overdrives video signals, or increases a torque required to return to a state in which no voltage is applied.

53 Claims, 33 Drawing Sheets

(52) U.S. Cl.
CPC ............ G09G 2300/0876 (2013.01); G09G 2310/0235 (2013.01); G09G 2320/0252 (2013.01); G09G 2320/0261 (2013.01); G09G 2320/0285 (2013.01); G09G 2320/041 (2013.01); G09G 2330/021 (2013.01); G09G 2340/16 (2013.01)

(58) Field of Classification Search
USPC .............................................. 345/87–90, 55
See application file for complete search history.

(56) References Cited

U.S. PATENT DOCUMENTS

| | | | |
|---|---|---|---|
| 4,717,871 A | 1/1988 | Yoo | |
| 4,899,224 A | 2/1990 | Ooba et al. | |
| 5,200,926 A | 4/1993 | Iwahashi et al. | |
| 5,218,232 A | 6/1993 | Yuzurihara et al. | |
| 5,274,366 A | 12/1993 | Hayashi et al. | |
| 5,410,345 A * | 4/1995 | Eichenlaub | G02B 27/0093 348/54 |
| 5,412,240 A | 5/1995 | Inoue et al. | |
| 5,483,255 A * | 1/1996 | Numao | G09G 3/3629 345/87 |
| 5,546,102 A | 8/1996 | Scheffer et al. | |
| 5,572,735 A | 11/1996 | Tanikawa | |
| 5,591,990 A | 1/1997 | Misawa et al. | |
| 5,596,023 A * | 1/1997 | Tsubota | C08F 299/028 349/153 |
| 5,637,187 A | 6/1997 | Takasu et al. | |
| 5,667,853 A * | 9/1997 | Fukuyoshi | C23C 14/086 349/139 |
| 5,670,970 A | 9/1997 | Yamazaki | |
| 5,754,154 A | 5/1998 | Katakura et al. | |
| 5,757,546 A * | 5/1998 | Lipton | G02B 27/2264 348/54 |
| 5,936,686 A | 8/1999 | Okumura et al. | |
| 6,046,790 A | 4/2000 | Hara et al. | |
| 6,067,062 A | 5/2000 | Takasu et al. | |
| 6,211,849 B1 | 4/2001 | Sasaki et al. | |
| 6,232,948 B1 | 5/2001 | Tsuchi | |
| RE37,333 E | 8/2001 | Harada et al. | |
| 6,307,681 B1 | 10/2001 | Aoki et al. | |
| 6,329,971 B2 * | 12/2001 | McKnight | 345/208 |
| 6,509,895 B2 | 1/2003 | Yanagi et al. | |
| 6,542,211 B1 | 4/2003 | Okada et al. | |
| 6,628,355 B1 | 9/2003 | Takahara | |
| 6,768,535 B2 | 7/2004 | Yasukawa | |
| 6,903,716 B2 | 6/2005 | Kawabe et al. | |
| 6,927,829 B2 | 8/2005 | Yamagishi et al. | |
| 6,982,770 B2 | 1/2006 | Lim et al. | |
| 6,992,718 B1 | 1/2006 | Takahara | |
| 7,019,725 B1 | 3/2006 | Lee et al. | |
| 7,133,004 B2 * | 11/2006 | Tomitani | G02F 1/136213 345/100 |
| 7,145,520 B2 * | 12/2006 | Ramanujan | G02B 26/008 345/32 |
| 7,355,575 B1 * | 4/2008 | Ota | G09G 3/3655 345/100 |
| 7,639,034 B2 * | 12/2009 | Murase | G09G 3/006 324/760.01 |
| 2002/0005844 A1 * | 1/2002 | Kosaka | G09G 3/293 345/204 |
| 2002/0015131 A1 | 2/2002 | Sato | |
| 2002/0018059 A1 | 2/2002 | Yanagi et al. | |
| 2002/0024491 A1 * | 2/2002 | Hosoyamada | G09G 3/3607 345/88 |
| 2002/0050972 A1 * | 5/2002 | Udo | G09G 3/3607 345/96 |
| 2002/0057403 A1 | 5/2002 | Yasukawa et al. | |
| 2002/0084967 A1 | 7/2002 | Akimoto et al. | |
| 2002/0093472 A1 | 7/2002 | Numao | |
| 2002/0113929 A1 | 8/2002 | Yamazaki et al. | |
| 2002/0154078 A1 | 10/2002 | Yoshihara et al. | |
| 2002/0190942 A1 * | 12/2002 | Lee | G09G 3/3648 345/96 |
| 2003/0011739 A1 | 1/2003 | Yoshinara et al. | |
| 2003/0025659 A1 | 2/2003 | Kondo et al. | |
| 2003/0043103 A1 | 3/2003 | Yoshihara et al. | |
| 2003/0052847 A1 | 3/2003 | Okishiro et al. | |
| 2003/0058229 A1 | 3/2003 | Kawabe et al. | |
| 2003/0058385 A1 * | 3/2003 | McKnight | G02F 1/13306 349/96 |
| 2003/0095228 A1 | 5/2003 | Hiji et al. | |
| 2003/0107546 A1 | 6/2003 | Ham | |
| 2003/0117538 A1 | 6/2003 | Lim et al. | |
| 2003/0156086 A1 | 8/2003 | Maeda et al. | |
| 2003/0160210 A1 * | 8/2003 | Bremer | C09K 19/06 252/299.01 |
| 2003/0169247 A1 | 9/2003 | Kawabe et al. | |
| 2003/0201969 A1 | 10/2003 | Hiyama et al. | |
| 2003/0218593 A1 | 11/2003 | Inoue et al. | |
| 2004/0012551 A1 | 1/2004 | Ishii | |
| 2004/0041782 A1 | 3/2004 | Tachibana | |
| 2004/0095532 A1 * | 5/2004 | Parri | G02B 5/3083 349/117 |
| 2004/0263760 A1 | 12/2004 | Kodate et al. | |
| 2005/0068277 A1 * | 3/2005 | Salsman | G09G 3/3611 345/87 |
| 2005/0140634 A1 | 6/2005 | Takatori | |
| 2006/0250346 A1 | 11/2006 | Ham | |
| 2007/0080905 A1 | 4/2007 | Takahara | |
| 2007/0085794 A1 | 4/2007 | Kawabe et al. | |

FOREIGN PATENT DOCUMENTS

| | | |
|---|---|---|
| JP | 0 704 514 A2 * | 4/1996 |
| JP | 2001-506376 A | 5/2001 |
| JP | 2002-182621 A | 6/2002 |
| JP | 2003-279929 A | 10/2003 |
| WO | 98/27538 A1 | 6/1998 |

OTHER PUBLICATIONS

U.S. Appl. No. 12/563,346, filed Sep. 21, 2009. "Liquid Crystal Display Device, and Method and Circuit for Driving Liquid Crystal Display Device" Inventor: Kenichi Takatori.

* cited by examiner

| CIRCUIT SIDE nch | CIRCUIT SIDE pch | PIXEL SWITCH nch | HOLDING CAPACITY |

LIQUID CRYSTAL DISPLAY APPARATUS, DRIVING METHOD FOR SAME, AND DRIVING CIRCUIT FOR SAME

CROSS REFERENCE TO RELATED APPLICATIONS

This application is a divisional of U.S. patent application Ser. No. 11/300,483, filed Dec. 15, 2005, which claims priority to Japanese Patent Application No. 2004-363407, filed Dec. 15, 2004, the contents of all of which are incorporated herein by reference.

BACKGROUND OF THE INVENTION

Technical Field of the Invention

The present invention relates to a liquid crystal display apparatus, a driving method for the same, and a driving circuit for the same. More particularly, the present invention relates to a high-efficiency liquid crystal display apparatus capable of responding at high speed, a driving method for the same, and a driving circuit for the same.

Description of the Related Art

With advancements in the multimedia age, a liquid crystal display apparatus from small-sized ones used in projectors, cellular telephones, view finders, and so on to large-sized ones used in notebook PCs, monitors, televisions, and so on has rapidly come into widespread use. Moreover, to electronic equipment such as viewers and PDAs and further to amusement machines such as handheld video game machines and pinball machines as well, middle-sized liquid crystal display apparatuses have become indispensable. On the other hand, liquid crystal display apparatuses have been used in all sorts of units including household appliances such as refrigerators and microwave ovens. At present, in most liquid crystal display elements, a twisted nematic (TN) display system is used. The liquid crystal display elements having the TN type display system are made of a nematic liquid crystal composition. When the conventional TN type liquid crystal display elements are subjected to simple matrix driving, it has been found that their display quality is not high and their number of scanning lines is limited. Therefore, in the simple matrix driving, an STN (Super Twisted Nematic) type liquid crystal display system is mainly used instead of the TN type liquid crystal display system. The STN type liquid crystal display system has improved contrast and viewing angle dependence when compared with initial simple matrix driving system using the TN type liquid crystal display system. However, since the STN type liquid crystal display apparatuses are low in response speed, these are not suitable for moving image displays. To improve the display performance of the simple matrix driving system, an active matrix system, in which each pixel is provided with a switching element, has been developed and widely used. For example, the TN type display apparatuses having thin film transistors (TFTs), that is, TN-TFT type display apparatuses are widely used. Since the active matrix system using the TFTs has a higher display quality than the simple matrix driving system, the TN-TFT type liquid crystal display apparatuses have become mainstream in the market at present.

On the other hand, due to a demand for even higher image quality, a method for improving viewing angles has been studied, developed, and then become commercially practical. As a result, the mainstream of present high-performance liquid crystal displays are divided into three types, that is, TN-TFT type active matrix liquid crystal display apparatuses using compensated films, TFT type active matrix liquid crystal display apparatuses of an in-plane switching (IPS) mode, and TFT type active matrix liquid crystal display apparatuses of a multi-domain vertical aligned (MVA) mode.

In these active matrix liquid crystal display apparatuses, an image signal having a frequency of 30 Hz is generally used and refreshed by the frequency of 60 Hz for positive-negative writing. A time taken for one field is about 16.7 milliseconds (ms); that is, the total time taken for the positive and negative fields is called one frame and is about 33.3 ms. In contrast, with the response speed of present liquid crystal display apparatuses, even their fastest response speed is only represented as such a frame time even with consideration given to responses during their intermediate gradation display. Because of this, to display video signals of moving images, high-speed computer graphics (CG), and high-speed game images, it is necessary to secure a faster response speed than that represented by the present frame time.

In addition, dominant pixel sizes are on the order of 100 ppi (pixels per inch) at present and higher definition is achieved by the two methods described below. One method is a method for decreasing pixel sizes through enhanced processing accuracy and the other is a method for fabricating a field-sequential (time-sharing) color liquid crystal display apparatus in which a backlight serving as the illuminating light of the liquid crystal display apparatus is switched in time sequence among red, green, and blue and at the same time, red, green, and blue images are displayed. In the latter method, since there is no need to spatially dispose a color filter, it is possible to achieve definition three times as high as the conventional ones. In the field-sequential liquid crystal display apparatus, there is a need to display one color in a time corresponding to one-third of one field and hence, a time usable to display the color is about 5 ms. Therefore, the liquid crystal itself is required to respond in less than 5 ms.

From the need for such a high-speed liquid crystal, various techniques have been studied and several high-speed display mode technologies have been developed. These high-speed liquid crystal technologies are broadly divided into two trends. One of these is a technique for enhancing the response speed of the foregoing dominant nematic liquid crystals and the other is a technique for employing spontaneous polarization-type smectic liquid crystals capable of responding at high speed and so on. The first trend, that is, the enhancement of the response speed of the nematic liquid crystals is mainly effected by the following methods: (1) cell gaps are reduced to increase an electric field strength through the application of the same voltage; (2) a high voltage is applied to increase the electric field strength and to promote a change in the state of the liquid crystal (an overdrive system); (3) the viscosity of the liquid crystal is lowered; (4) a mode, which is considered to have high-speed responsivity in principle, is used, and so on.

Even in such high-speed nematic liquid crystals, the following problems arise. In the high-speed nematic liquid crystal, since liquid crystal responses are almost completed within its frame, a change in the capacity of the liquid crystal layer remarkably increases due to the anisotropy of its dielectric constant. Due to the change in the capacity, a holding voltage to be held by writing to the liquid crystal layer changes. Such a change in the holding voltage, that is, a change in an effective applied voltage makes the contrast lowered due to insufficient writing. And when the same signal is written continuously, brightness continues to change until the change in the holding voltage ceases and hence, several frames are required to obtain stable brightness.

To prevent such responses requiring several frames, it is necessary to establish a one-to-one correspondence between an applied signal voltage and an obtained transmittance. In active matrix driving, a transmittance after a liquid crystal response is determined by the amount of charge accumulated in a liquid crystal capacitor after the liquid crystal response instead of a signal voltage is applied. This is because active driving is constant-charge driving in which a liquid crystal is made to respond by a held charge. The amount of a charge supplied from the active element is determined by a charge accumulated before a predetermined signal is written and a write charge newly written when its minute amount of leakage and so on are ignored. In addition, a charge accumulated after the liquid crystal responds also changes through the physical property constant of the liquid crystal and pixel design values such as an electrical parameter and a storage capacitor. Because of this, to establish the correspondence between the signal voltage and the transmittance, the followings are necessary: (1) correspondence between the signal voltage and the write charge, (2) the accumulated charge before the writing, and (3) acquiring information for calculating the accumulated charge after the response and calculating actually. As a result, it is necessary to provide a frame memory used for storing the item (2) across an entire screen and a calculating unit used for calculating the items (1) and (3).

On the other hand, as a method of establishing the one-to-one correspondence without the use of the foregoing frame memory and calculating unit, a reset pulse method is often used in which a reset voltage is applied to align liquid crystals into a predetermined state before data is newly written. As an example, a technique described in IDRC 1997 pp. L-66 to L-69 (hereinafter referred to as "second publication") will be explained. In the second publication, an OCB (optically compensated birefringence or optically compensated bend) mode is used in which the alignment of the nematic liquid crystal is a pie-type alignment and a compensated film is added. A response speed in the liquid crystal mode is on the order of 2 to 5 milliseconds and therefore significantly faster than that in conventional TN mode. As a result, a response should essentially complete within one frame, while as described above, since a significant decrease in a holding voltage occurs due to a change in a dielectric constant resulting from the response of the liquid crystal, several frames are required until a stable transmittance can be obtained. In view of this, a method for always writing a black image after the writing of a white image within one frame is shown in FIG. 5 of the second publication. This figure will be quoted as FIG. 4. In FIG. 4, a horizontal axis represents time and a vertical axis represents brightness. A dotted line represents a change in brightness during normal driving and a stable brightness is reached at the third frame. According to the reset pulse method, since a predetermined state is always secured at the time of the writing of new data, a one-to-one correspondence between a certain written signal voltage and a certain transmittance can be observed. Through the one-to-one correspondence, driving signals are generated very easily and a unit such as a frame memory, which stores previously written information, becomes unnecessary.

The configuration of a pixel of an active matrix liquid crystal display apparatus will be summarized below. FIG. 1 is a circuit diagram of one of the pixels of a conventional active matrix liquid crystal display apparatus. As shown in FIG. 1, the pixel of the active matrix liquid crystal display apparatus comprises a MOS transistor (Qn) (hereinafter referred to as "transistor Qn") 904, a storage capacitor 906, and a liquid crystal 908. The MOS transistor (Qn) 904 has a structure in which a gate electrode is connected to a scanning line 901 (or a scanning signal electrode), either a source electrode or a drain electrode is connected to a signal line 902 (or a video signal electrode), and the remainder of these is connected to a pixel electrode 903. The storage capacitor 906 is formed between the pixel electrode 903 and a storage capacitance electrode 905. The liquid crystal 908 is sandwiched between the pixel electrode 903 and an opposing electrode (or a common electrode) Vcom 907.

In notebook personal computers (notebook PCs) which form a large application market for liquid crystal display apparatuses at present, an amorphous silicon thin film transistor (a-Si TFT) or a polycrystalline silicon thin film transistor (p-Si TFT) is used as the transistor (Qn) 904 and a TN liquid crystal is used as the liquid crystal material in general. FIG. 2 is an equivalent circuit diagram of a TN liquid crystal. As shown in FIG. 2, the equivalent circuit of the TN liquid crystal can be represented as a circuit in which the capacitive component C3 (its electrostatic capacitance Cpix) of the liquid crystal is connected in parallel to a resistor R1 (its resistance Rr) and a capacitance C1 (its electrostatic capacitance Cr). In this equivalent circuit, the resistance Rr and the capacitance Cr are components which determine the response time constant of the liquid crystal.

A timing chart of a scanning line voltage Vg, a signal line voltage (or video signal voltage) Vd, the voltage of the pixel electrode 903 (hereinafter referred to as "pixel voltage") Vpix, which are obtained by driving such a TN liquid crystal by using the pixel circuit shown in FIG. 1, is shown in FIG. 3. As shown in FIG. 3, by raising the scanning line voltage Vg to a high level VgH during a horizontal scanning period, the n-type MOS transistor (Qn) 904 is turned on and then the signal line voltage Vd, which is inputted into the signal line 902, is transferred to the pixel electrode 903 via the transistor (Qn) 904. The TN liquid crystal generally operates in a mode in which light passes through during the period without applying a voltage, i.e., a so-called normally white mode.

In this case, as the signal line voltage Vd, a voltage, by which the transmittance of light which passes through the TN liquid crystal is enhanced, is applied over several fields. When the horizontal scanning period has completed and the scanning line voltage Vg has been brought to a low level, the transistor (Qn) 904 is turned off, thereby the signal line voltage transferred to the pixel electrode 903 is held by the storage capacitor 906 and the capacitance Cpix of the liquid crystal. The pixel voltage Vpix shows voltage shifts called feed-through voltages via the gate-to-source capacity of the transistor (Qn) 904 at a time when the transistor (Qn) 904 is turned off. In FIG. 3, the voltage shifts are represented as Vf1, Vf2, Vf3. The amounts of the voltage shifts Vf1 to Vf3 can be decreased by designing the storage capacitor 906 so as to stand at a large value.

The pixel voltage Vpix is held during the next field period until the scanning line voltage Vg is brought to the high level again and the transistor (Qn) 904 is selected. The switching of the TN liquid crystal is created according to the held pixel voltage Vpix; that is, as shown as a light transmittance T1, the transmitted light of the liquid crystal transitions from a dark state to a bright state. At this point in time, as shown in FIG. 3, the pixel voltages Vpix vary at the individual fields by $\Delta V1$, $\Delta V2$, $\Delta V3$ respectively during the holding period. This results from a fact that the capacity of the liquid crystal varies according to the response of the liquid crystal. To minimize the variation, the storage capacitor 906 is generally designed in such a way that it stands at a large value which is at least 2 to 3 times that of the pixel capacity Cpix. As explained above, the TN liquid crystal can be driven by using the pixel circuit shown in FIG. 1.

As a technique having an effect achieved by using a method developed by combining the overdrive system and the reset system, there is a technique of modulating a common voltage (common electrode voltage (or opposing electrode voltage)) shown in Japanese Translation of International Application (Kohyo) No. 2001-506376 (hereinafter referred to as "first publication"). FIG. 2C of the first publication is quoted as FIG. 5. In this technique, the common voltage, which is a voltage at a common electrode disposed so as to be opposite a pixel electrode, is modulated in general. In FIG. 5, the upper graph shows a variation in common voltage (VCG) with respect to time and the lower graph shows a variation in light transmittance (I) caused by the response of the liquid crystal with respect to time. That is, a voltage waveform 151 represents the waveform of a voltage applied to the common electrode, a light intensity waveform 152 represents a light intensity waveform corresponding to the waveform 151 with respect to time, and line segments 153 to 156 represents pixel light intensity curves. In techniques used prior to the use of this technique, driving during which a common voltage is held at a constant value is conducted or common reverse driving is conducted in which voltage varies so as to take on two values in a constant cycle represented as one frame cycle which comprises respective periods of t0 to t2 and t2 to t4 shown in FIG. 5. In the first publication, one frame cycle is divided into halves during the respective periods of t1 to t2 and t3 to t4, a voltage whose amplitude is the same as that used in conventional common reverse driving is applied. On the other hand, during periods of t0 to t1 and t2 to t3 of one frame cycle, a voltage higher than the amplitude of the common reverse such as a voltage higher than the amplitude of the common reverse by a voltage generated during a black image is applied. In this technique, there is an effect that a voltage differential between the pixel electrode and the common electrode increases during the period of t0 to t1 over which a high voltage is applied to the common electrode, thereby the entire display region can be rapidly changed to a black image. That is, driving corresponding to the reset driving is performed. Moreover, even when image data is written into the pixel electrode during the period of t0 to t1, the writing is not observed on the display since a potential difference between the pixel electrode and the common electrode is sufficiently large (for example, a voltage placed for the black image or larger). After image data is written into the entire display region, the voltage at the common electrode is returned to the amplitude of the common reverse with a timing of t1. As a result, the liquid crystal layer initiates its responses in such a way that its transmittance varies according to respective gradation levels based on the voltage stored in the pixel electrode. That is, at the time of the initiation of the response, the state in which the voltage differential is large always changes to a state in which voltage differentials are coincide with voltages at the respective gradations. Therefore, a kind of overdrive occurs during the period of t0 to t1.

Here, it should be noted that the response time of liquid crystal is generally given by the following two expressions (see the Dictionary of Liquid Crystal, p. 24, published by Baifukan Ltd., edited by the Japan Society for the Promotion of Science, the 142nd Committee on Organic Materials for Information Science, the Group on Liquid Crystal, and hereinafter referred to as "third publication"): that is, in a rise response (on-time response) in which a voltage which is higher than a threshold voltage is applied to effect an on state, the following expression 1 is established:

$$\tau_{rise} = \frac{d^2 \cdot \tilde{\eta}}{\Delta \varepsilon \cdot (V^2 - V_c^2)} \qquad \text{(Expression 1)}$$

On the other hand, in a fall response (off-time response) in which the applied voltage which is higher than the threshold voltage is quickly brought down to zero V, the following expression 2 is established:

$$\tau_{decay} = \frac{d^2 \cdot \tilde{\eta}}{\pi^2 \cdot \tilde{K}} \qquad \text{(Expression 2)}$$

where d is the thickness of a liquid crystal layer, $\eta$ is a rotation viscosity, $\Delta \varepsilon$ is dielectric anisotropy, V is an applied voltage corresponding to each gradation level, Vc is a threshold voltage, and K is a constant based on Frank elastic constant. In TN mode, K is given by the following expression 3:

$$\tilde{K} = K_{11} + \frac{1}{4}(K_{33} - 2 \cdot K_{22}) \qquad \text{(Expression 3)}$$

where $K_{11}$ is the elastic constant of a spread, $K_{22}$ is the elastic constant of a twist, and $K_{33}$ is the elastic constant of a bend. As is apparent from the expression 1, in the rise response (on-time response), the response time of liquid crystal depends on the reciprocal of the square of the value of an applied voltage. That is, the response time of the liquid crystal depends on the reciprocal of the square of the value of a voltage which varies according to each gradation level. Because of this, the response time significantly varies according to the gradation levels; when there is a ten-times voltage differential, a hundred-times difference in the response time occurs. On the other hand, even in the fall response (off-time response), there is a difference in the response time according to the gradation levels; however, the difference falls within an about double range.

According to the third publication, the response speed of the liquid crystal is increased by the overdrive effect that a very high voltage is applied at the time of the rise response (on-time response). Moreover, since every responses used for actual image displays are fall responses (off-time responses), a dependence on the gradation levels is remarkably low. As a result, about the same response time can be achieved over all gradations.

However, the foregoing liquid crystal display apparatuses, that is, the display apparatus using the overdrive, the display apparatus using the reset drive, the display apparatuses disclosed in the documents such as the first publication, and so on have several problems.

A first problem is as follows: in the overdrive system, the rise response (on-time response) speed of the liquid crystal can be increased, while the response speed is on the order of ten and several milliseconds to several tens of milliseconds at most due to limited materials for the liquid crystal. Moreover, as described below, the fall response (off-time response) speed cannot be increased so much.

Such a problem can be solved by the following means. To increase the response speed of the liquid crystal itself, as is apparent from the expressions 1 and 2, it is preferable to take effective measures such as the following:

(1) decreasing the thickness d of the liquid crystal layer;
(2) lowering the viscosity $\eta$;
(3) enhancing the dielectric anisotropy $\Delta\in$ (only in the rise (on-time) response);
(4) increasing the applied voltage (only in the rise (on-time) response); and
(5) decreasing the elastic constants $K_{11}$ and $K_{33}$ and increasing the elastic constant $K_{22}$ (only in fall (off-time) response). However, with the item (1), to sufficiently achieve an optical effect, the thickness of the liquid crystal layer can be decreased only within the range of its constant relationship with a refractive index anisotropy $\Delta n$. Moreover, with the items (2), (3), and (5), since all viscosity, the dielectric anisotropy, and the elastic constants are physical property values, these are highly dependent on the materials of the liquid crystal and hence, it is difficult to set these at values which exceed certain conditions. And further, it is very difficult to significantly vary any one of the physical property values and hence, it is difficult to achieve an effect on the high-speed response expected from the expressions. For example, although $K_{11}$, $K_{22}$, and $K_{33}$ are independent elastic constants, a relationship $K_{11}:K_{22}:K_{33}=10:5:14$ is substantially established from the measurement results on actual materials, so that these cannot be always treated as independent constants. That is, from the relationship and the expression 3, for example, a relationship $K=11 \cdot K_{22}/5$ is established and therefore, only $K_{22}$ is an independent constant. Because of this, these can be adjusted a little, but it is difficult to achieve improvement above scores of percent. Still further, with the item (4), the method for increasing the value of the applied voltage also has a considerable limitation in terms of power consumption and the increased production cost of the high-voltage driving circuit. In addition, when the display apparatus is driven by providing an active element such as a thin film transistor, the response speed is limited by the withstand pressure of the element. As described above, there is a considerable limit to the fast response speed achieved by using those conventional means including the overdrive in principle.

A second problem is that in the overdrive system, the rise response (on-time response) can be sped up but the fall response (off-time response) can be hardly sped up. As is apparent from the expressions 1 and 2, this is because the rise response (on-time response) depends on the potential difference to effect the variation in the response time but the fall response (off-time response) does not depend on the potential difference. That is, the rise response (on-time response) can be sped up by increasing the potential difference, but the fall response (off-time response) cannot. As a result, in the conventional overdrive system, the fall response (off-time response) not sped up dominantly determines the response speed of the entire system.

A third problem is that in the conventional overdrive system the voltage required for the overdrive is high. The video signals of the display apparatus are high-frequency signals and hence, in the overdrive system in which the voltages of the video signals are increased, power consumption, which is determined by the voltage and the frequency, has been increased significantly. Moreover, since there is a need to produce the high-frequency high-voltage signals, it is difficult to use the same driving IC and signal conditioning system as those of conventional display apparatuses, so that a need to use ICs fabricated by using a special process or expensive ICs has often arisen.

A fourth problem is that in the reset system, a method of applying reset signals via a pixel switch has the disadvantages that the structure of a driving system becomes complex and power consumption is increased. That is, scanning for the writing of the video signals requires the driving of scanning lines which is different in scanning period and scanning method. When the pixel switch is reset, a method for resetting all scanning lines together is often used instead of sequential scanning and hence, it becomes necessary to provide a structure where signals are sent together into the scanning system. Moreover, since the scanning lines are driven at the time of not only the writing of the video signals but also the writing of the reset signals, the frequencies of signals for the scanning lines having the highest voltage amplitude in the display apparatus are increased, thereby power consumption is increased. As a result, it is desirable that the reset not be conducted via the pixel switch.

A fifth problem is that in the reset system, the state of the display considerably changes due to the reset of an excessive or short degree. This problem also holds true for the method described in the first publication which is created by combining the overdrive system and the reset system.

First, the reset is excessive, the initiation of the optical response of the liquid crystal after the reset becomes slow and abnormal optical responses are observed before the initiation of normal optical responses. This is because at the time of a transition from a predetermined alignment state realized by the reset to the normal response, a direction in which the liquid crystal operates during the response is not clear and hence, nonuniform and unstable responses are shown. An example of the abnormal optical responses is shown in FIG. 21. As shown in FIG. 21, when the reset is excessive, delays in the optical responses and abnormal displays (such as the transient rise in transmittance) develop.

On the other hand, in the reset system, the shortage of the reset effects a situation where when the same data is written several times, the same transmittance cannot be sometimes obtained. When the reset is insufficient, a predetermined alignment state is not completely realized during the reset, so that the response following the reset shows transmittance corresponding to the history of a previous frame. As a consequence, a one-to-one correspondence is not established between the applied voltage and the transmittance. Because of this, a desired gradation cannot be attained or even when the same gradation is displayed, brightness varies greatly. The variation in the brightness may result in, for example, a difference between brightness caused by the application of a positive signal voltage and brightness caused by the application of a negative signal voltage, that is, flicker.

A sixth problem is that it is difficult to attain stable display over a wide temperature range. This is because the viscosity $\eta$ of the liquid crystal is highly dependent on temperature and hence, the response speed of the liquid crystal is also highly dependent on temperature. Particularly, in the reset system and the method described in the first publication, when a temperature changes, the foregoing excessive or insufficient reset develops clearly. As a result, the response speed is decreased at low temperatures, which result in, for example, a considerable reduction in brightness. On the other hand, at high temperatures, for example, the response speed at intermediate gradation display is increased and the brightness is enhanced all over the display, so that the display approaches a white image. Because of this, a phenomenon in which the entire display becomes whitish and so on takes place. Furthermore, since the shortage of the reset occurs at low temperatures, the problem that the correspondence between the applied voltage and the transmittance is not established arises, thereby a desired gradation cannot be obtained or flicker is caused.

SUMMARY OF THE INVENTION

An object of the present invention is to provide a liquid crystal display apparatus, which is capable of improving display performance, increasing a response speed, and improving temperature dependence and reliability, a driving method for the same, and a driving circuit for the same.

Another object of the present invention is to provide a liquid crystal display apparatus, which is capable of achieving a high-speed response and a high light-use efficiency, operating at low power consumption, stabilizing images within one frame, eliminating image degradation caused by the influence of history, and displaying sharp moving images without developing blurred moving images during moving image display, a driving method for the same, and a driving circuit for the same.

Moreover, another object of the present invention is to provide a liquid crystal display apparatus, which is capable of eliminating uneven and unstable liquid crystal responses resulting from reset driving and so on, producing an excellent display having a small change in display despite a change in ambient temperature, and exhibiting high reliability and which can be fabricated at low cost without requiring a high-performance IC for driving and a high-performance signal processing circuit, a driving method for the same, and a driving circuit for the same. For example, the object of the present invention is to provide a liquid crystal which is capable of eliminating flicker and so on, producing a smooth change in gradation, and exhibiting high reliability to a change in environment and which can be fabricated at low cost for the entire display system.

Further, another object of the present invention is to provide a high-speed liquid crystal display apparatus capable of writing data by using a frame frequency (of, for example, 70 Hz, 80 Hz, or 200 Hz) which is higher than an ordinary frame frequency (of, for example, 60 Hz) or a frame frequency (of, for example, 120 Hz, 180 Hz, or 360 Hz) which is an integral multiple of the ordinary frame frequency.

Still further, another object of the present invention is to provide a liquid crystal display apparatus capable of producing a field sequential color display attained by dividing a display image into several color images, successively displaying the respective color images in time sequence, and lighting light sources having the same colors as those of the color images in synchronization with the color images. More particularly, another object of the present invention is to provide a liquid crystal display apparatus capable of effecting field sequential driving in a TN type liquid crystal display mode. Moreover, another object of the present invention is to provide a liquid crystal display apparatus capable of effecting field sequential driving in a TN type liquid crystal display mode even when the apparatus is a transmissive type. Furthermore, another object of the invention is to provide a liquid crystal display apparatus capable of realizing field sequential driving in various liquid crystal display modes other than the TN type liquid crystal display mode. In addition, another object of the invention is to make these liquid crystal display apparatuses have a high efficiency in light utilization.

Referring to FIG. 9 and FIG. 12 of the embodiments of the present invention, a liquid crystal display apparatus according to a first aspect of the present invention has a common electrode potential controlling circuit (203) and a synchronizing circuit (204). The common electrode potential controlling circuit (203) changes the potential of a common electrode (215) into a pulse shape after a scanning signal driving circuit (202) scans the entire scanning electrodes (212) to transmit a video signal to a pixel electrode (214).

Referring to FIG. 10 and FIG. 13 of the embodiments of the present invention, a liquid crystal display apparatus according to a second aspect of the present invention has a storage capacitance electrode potential controlling circuit (205) and a synchronizing circuit (204). The storage capacitance electrode potential controlling circuit (205) changes the potential of a storage capacitance electrode (216) into a pulse shape after a scanning signal driving circuit (202) scans the entire scanning electrodes (212) to transmit a video signal to a pixel electrode (214).

In the liquid crystal display apparatus according to the first aspect and the second aspect of the present invention, the comparison of the data and the variation in the potentials is performed one by one or is performed by using an LUT (look-up tables, correspondence table) prepared in advance.

In the liquid crystal display apparatus according to the present invention, the comparison of the data and the variation in the potentials is performed by using an LUT (look-up tables, correspondence table) prepared in advance according to the polarity of the video signals with respect to the common electrodes and the type of color signals to be displayed.

In the liquid crystal display apparatus according to the present invention, an LUT (look-up tables, correspondence table) is used in which a relationship between the video signals and the brightness of gradation obtained from the video signals is set up. The LUT varies with the polarity of the video signals and the type of the color signals to be displayed.

Referring to FIG. 11 and FIG. 14 of the embodiments of the present invention, a liquid crystal display apparatus according to a third aspect of the invention has a common electrode potential controlling circuit (203), a storage capacitance electrode potential controlling circuit (205), and synchronizing circuit (204). The common electrode potential controlling circuit (203) changes the potential of a common electrode (215) into a pulse shape after a scanning signal driving circuit (202) scans the entire scanning electrodes (212) to transmit a video signal to a pixel electrode (214). The storage capacitance electrode potential controlling circuit (205) changes the potential of a storage capacitance electrode (216) into a pulse shape after a scanning signal driving circuit (202) scans the entire scanning electrodes (212) to transmit a video signal to a pixel electrode (214).

Referring to FIG. 9 and FIG. 12 of the embodiments of the present invention, a liquid crystal display apparatus according to a fourth aspect of the invention has a common electrode potential controlling circuit (203), a synchronizing circuit (204), and a plurality of common electrodes (215) electrically isolated from one another. The common electrode potential controlling circuit (203) changes the potential of the common electrodes (215), which correspond to scanning electrodes (212) scanned by a scanning signal driving circuit (202), into a pulse shape after the scanning signal driving circuit (202) scans part of the scanning electrodes (212) to transmit video signals to pixel electrodes (214).

As shown in FIG. 10 and FIG. 13, a liquid crystal display apparatus according to a fifth aspect of the invention has a storage capacitance electrode potential controlling circuit (205), a synchronizing circuit (204), and a plurality of storage capacitance electrodes (216) electrically isolated from one another. The storage capacitance electrode potential controlling circuit (205) changes the potential of the storage capacitance electrodes (216), which correspond to scanning electrodes (212) scanned by a scanning signal driving circuit (202), into a pulse shape after the scanning signal driving circuit (202) scans part of the scanning electrodes (212) to transmit video signals to pixel electrodes (214).

As shown in FIG. 11 and FIG. 14, a liquid crystal display apparatus according to a sixth aspect of the invention has a common electrode potential controlling circuit (203), a storage capacitance electrode potential controlling circuit (205), a synchronizing circuit (204), a plurality of common electrodes (215) electrically isolated from one another, and a plurality of storage capacitance electrodes (216) electrically isolated from one another. The common electrode potential controlling circuit (203) changes the potential of the common electrodes (215), which correspond to scanning electrodes (212) scanned by a scanning signal driving circuit (202), into a pulse shape after the scanning signal driving circuit (202) scans part of the scanning electrodes (212) to transmit video signals to pixel electrodes (214). The storage capacitance electrode potential controlling circuit (205) changes the potential of the storage capacitance electrodes (216), which correspond to the scanning electrodes (212) scanned by the scanning signal driving circuit (202), into a pulse shape after the scanning signal driving circuit (202) scans part of the scanning electrodes (212) to transmit video signals to the pixel electrodes (214).

In the liquid crystal display apparatus according to the present invention, the potentials of the common electrodes (215) changed into a pulse shape and the potentials of the storage capacitance electrode (216) changed into a pulse shape are potentials by which a display on a display unit (200) is not reset.

In the liquid crystal display apparatus according to the present invention, the potentials of the common electrodes (215) vary between at least three potentials and preferably between at least four potentials. Moreover, the potentials of the storage capacitance electrodes (216) vary between at least three potentials and preferably between at least four potentials.

In the liquid crystal display apparatus according to the present invention, the potentials of the common electrodes (215) changed into a pulse shape or the potentials of the storage capacitance electrodes (216) are changed into a pulse shape to temporarily increase a potential difference between the potentials of the pixel electrodes (214) and the potentials of the common electrodes (215) or the potentials of the storage capacitance electrodes (216).

In the liquid crystal display apparatus according to the present invention, the potentials of the video signals are different from the potentials of video signals in a stable display state brought about during static driving in consideration of the response characteristics of the display unit (200) during charge holding type driving.

In the liquid crystal display apparatus according to the present invention, the potentials of the video signals are determined by making a comparison between data held by individual pixels before the writing of the video signals and display data to be newly displayed.

In the liquid crystal display apparatus according to the present invention, a field response type substance is sandwiched between the pixel electrodes (214) of the display unit (200) and the common electrodes (215) of the display unit (200). Moreover, the field response type substance is made of a liquid crystal substance.

In the liquid crystal display apparatus according to the present invention, the liquid crystal substance is a nematic liquid crystal which effects twisted nematic alignment.

And further, between the twist pitch p (μm) of the nematic liquid crystal and the average thickness d (μm) of the nematic liquid crystal layer, the relationship p/d<20 is set up. It is preferable that the relationship p/d<8 be set up between the twist pitch p (μm) of the twisted nematic liquid crystal and the average thickness d (μm) of the twisted nematic liquid crystal substance layer.

In the liquid crystal display apparatus according to the present invention, the twisted nematic liquid crystal substance is stabilized by a polymer liquid crystal having a mostly continuously twisted structure.

In the liquid crystal display apparatus according to the present invention, the liquid crystal substance is used in an electrically controlled birefringence mode.

In the liquid crystal display apparatus according to the present invention, the liquid crystal substance has a pie-type alignment (bend-type alignment). Moreover, it is preferable that the liquid crystal substance be provided with an optical compensation plate and used in an OCB (optically compensated birefringence or optically compensated bend) mode.

In the liquid crystal display apparatus according to the present invention, the liquid crystal substance is used in a VA (vertical alignment) mode in which homeotropic alignment is developed. And further, it is preferable that a wide viewing angle be secured by providing a multidomain and so on.

In the liquid crystal display apparatus according to the present invention, the liquid crystal substance is used in an IPS (in-plane switching) mode in which the response of the substance is made by an electric field developed parallel to the substrate surface.

In the liquid crystal display apparatus according to the present invention, the liquid crystal substance is used in a FFS (fringe field switching) mode or an AFFS (advanced fringe field switching) mode.

In the liquid crystal display apparatus according to the present invention, the liquid crystal substance is a ferroelectric liquid crystal substance, an antiferroelectric liquid crystal substance, or a liquid crystal substance which produces an electroclinic type response.

In the liquid crystal display apparatus according to the present invention, the liquid crystal substance is a cholesteric liquid crystal substance.

In the liquid crystal display apparatus according to the present invention, the alignment of the liquid crystal substance is stabilized by polymer to the alignment in the state being applied no voltage or allied a low voltage.

In the liquid crystal display apparatus according to the present invention, a stereoscopic display is produced by using a lenticular lens sheet, a lenticular film, or a double-sided prism sheet and by sending video signals for one eye to the individual pixels arranged parallel to one another, that is, by separately sending video signals for the right eye and video signals for the left eye to these. And further, it is preferable that the stereoscopic display is produced by using a scan backlight produced by alternately sending two beams of light from two light sources to a backlight and at the same time, by performing switching with time between the video signals for the right eye and the video signals for the left eye through the use of a frequency which is more than twice as high as that used conventionally.

In the liquid crystal display apparatus according to the present invention, the video signals are divided into a plurality of color video signals corresponding to a plurality of colors, the light sources, which correspond to the colors, are synchronized with the color video signals with a predetermined phase difference provided, and the color video signals are displayed in sequence.

In the liquid crystal display apparatus according to the present invention, video signals consist of video signals for the right eye and video signals for the left eye. The individual video signals for one eye are divided into a plurality of color video signals corresponding to a plurality of colors, and light sources, which are disposed at two places and correspond to the colors, are synchronized with the video signals for one eye with a predetermined phase difference provided and are also synchronized with the color video signals. Then the video signals for one eye are sent in sequence as the divided color video signals for display.

In the liquid crystal display apparatus according to the present invention, the pixel switch comprises an amorphous silicon thin film transistor, a polycrystalline silicon thin film transistor, a single-crystalline silicon thin film transistor including a SOI (silicon on insulator), or the like.

In the liquid crystal display apparatus according to the present invention, the polarity of the video signals is reversed with a predetermined timing. Among the varying potentials of the common electrodes, one or two potentials whose application period is longer than those of the remaining potentials are nearly equal to a potential intermediate between the maximum and the minimum potentials of all potentials applied as the video signals.

In the liquid crystal display apparatus according to the present invention, the polarity of the video signals is reversed with a predetermined timing. Among the varying potentials of the common electrodes, one or two potentials whose application period is longer than those of the remaining potentials are nearly equal to a potential intermediate between the maximum and the minimum potentials of all potentials which can be applied as the video signals.

In the liquid crystal display apparatus according to the present invention, the potentials of the common electrodes provided immediately before the scanning signal driving circuit (202) starts to scan the initial electrode of the scanning electrodes (212) are equal to the potentials of the common electrodes to be changed into a pulse shape immediately after the scanning signal driving circuit (202) has scanned all scanning electrodes (212) and has transmitted video signals to the pixel electrodes (214).

In the liquid crystal display apparatus according to the present invention, the potentials of the common electrodes provided immediately before the scanning signal driving circuit (202) starts to scan the initial electrode of the scanning electrodes (212) are different from the potentials of the common electrodes to be changed into a pulse shape immediately after the scanning signal driving circuit (202) has scanned all scanning electrodes (212) and has transmitted video signals to the pixel electrodes (214).

In the driving method for the liquid crystal display apparatus according to the present invention, the common electrode has four potentials. The first potential is the potential of the common electrode developed at a time period over which the scanning signal driving circuit (202) scans the scanning electrode (212) to transmit a video signal having one polarity of the video signal which is periodically reversed. The second potential is the potential of a pulse height portion which is formed when the potential of the common electrode (215) is changed into a pulse shape following the development of the first potential. The third potential is not only a potential which is developed after the potential of the common electrode (215) has been changed into a pulse shape following the development of the second potential but the potential of the common electrode developed at a time period over which the scanning signal driving circuit (202) scans the scanning electrode (212) to transmit a video signal having the other polarity of the video signal which is periodically reversed. The fourth potential is the potential of the pulse height portion which is formed when the potential of the common electrode (215) is changed into a pulse shape following the development of the third potential.

In the driving method for the liquid crystal display apparatus according to the present invention, the common electrode has six potentials. The first potential is the potential of the common electrode developed at a time period over which the scanning signal driving circuit (202) scans the scanning electrode (212) to transmit a video signal having one polarity of the video signal which is periodically reversed. The second potential is the potential of the pulse height portion which is formed when the potential of the common electrode (215) is changed into a pulse shape following the development of the first potential. The third potential is a potential which is developed after the potential of the common electrode (215) has been changed into a pulse shape following the development of the second potential. The fourth potential is the potential of the common electrode which is developed at a time period over which the scanning signal driving circuit (202) scans the scanning electrode (212) to transmit a video signal having the other polarity of the video signal which is periodically reversed. The fifth potential is the potential of the pulse height portion which is formed when the potential of the common electrode (215) is changed into a pulse shape following the development of the fourth potential. The sixth potential is a potential which is developed after the potential of the common electrode (215) has been changed into a pulse shape following the development of the fifth potential.

The liquid crystal display apparatus according to the present invention has a light irradiating unit, which irradiates the display unit with light and a synchronizing circuit which synchronizes the intensity of light from the light irradiating unit with the video signal so as to have a predetermined phase for modulation.

The liquid crystal display apparatus according to the present invention has a light irradiating unit, which irradiates the display unit with light and a synchronizing circuit which synchronizes the color of light from the light irradiating unit with the video signal so as to have a predetermined phase for change.

In the driving method for the liquid crystal display apparatus according to the present invention, when a timing, at which the intensity of light from the light irradiating unit is modulated or the color of the light is changed, is divided into individual fields or a plurality of colors, the timing is set after the division of subfields corresponding to the colors, that is, immediately before a video signal of the next field is written.

In the liquid crystal display apparatus according to the present invention, the potential of the video signals is determined by making a comparison of data held by the pixels before the writing of the video signals, a variation in the potentials of the pixel electrodes associated with a variation in the potentials of the common electrodes (215) changed into a pulse shape, the potentials of the storage capacitance electrodes (216) changed into a pulse shape, or the potentials of both the common electrodes (215) and the storage capacitance electrodes (216), and display data to be newly displayed. And further, data to be newly displayed is determined by taking into account the variation in the potentials of the pixel electrodes resulting from a capacitance coupling associated with the polarity reversal of data signals as well.

By changing the potentials of the common electrodes, the potentials of the storage capacitance electrodes, or the potentials of both of these to the pulse from after the scanning signal driving circuit has scanned the entire scanning electrodes and transmitted video signals to the pixel electrodes, the potential difference between the pixel electrodes and the common electrodes developed after the transmission of the video signals varies at the individual time periods, that is, before and after the change into the pulse shape and at the time of formation of the pulse height portion (however, the potential difference before the change into the pulse shape may become equal to that after the change into the pulse shape). As a result, it is possible to adjust a change in the state and the response speed of the display substance at the individual time period, thereby the response speed can be increased. Moreover, it is also possible to decrease the response speed as necessary. In particular, a temporary increase in the potential difference between the potentials of the pixel electrodes and the potentials of the common electrodes is highly effective in increasing the response speed.

And further, the provision of the electrically isolated common electrodes, storage capacitance electrodes, or both of these allows only part of the display unit to be changed into a pulse shape. As a consequence, regions having any shape within the display unit can be changed into a pulse shape in any order, so that the state of the response can be changed at each region.

By setting the potentials of the common electrodes, the potentials of the storage capacitance electrodes, or the potentials of both of these at a potential at which reset is not allowed when these are changed into a pulse shape, the following action is effected. In general, the reset brings the liquid crystal alignment into a predetermined state. As a result, when the transition from the predetermined state to another state is processed, delay often develops. However, by setting these potentials at the potential at which the reset is not allowed, the development of the delay can be prevented, so that the faster response speed can be attained.

The delay developed due to the transition from the reset state is divided into two types of delays. The first delay is a delay developed by the fact that when the transition from the reset state to another state is made, a direction in which the display substance should respond is not determined promptly due to fluctuation and so on of the substance itself. In this delay, an optical state including transmission and reflection of light is still in about the same state as the reset state, so that a time delay develops until changes in the optical state start to occur. The second delay is a delay developed by the fact that when the transition from the reset state to another state is made, the display substance temporarily responds in directions other than its objective direction such as the reverse direction. In this delay, the optical state including the transmission and reflection of light are different from that in the reset state, while an optical state different from a desired control state arises. During a time period over which a change from a response in the undesired direction to the response in the desired direction is performed, there is a time delay which is longer than the first delay. Moreover, a phenomenon which occurs more frequently is as follows: in a system in which the second delay develops, the first delay also develops simultaneously and hence, the delay time becomes longer.

By setting the potentials of the common electrodes, the potentials of the storage capacitance electrodes, or the potentials of both of these at the potential at which the reset is not allowed, these two delays and the combined delay are eliminated, thereby a response speed expected originally can be achieved.

Furthermore, since the reset is not allowed, the dependence of the display on the excess of deficiency of the reset is eliminated. Because of this, it becomes possible to attain a stable display over a wide temperature range.

By changing the potentials of the common electrodes or the potentials of the storage capacitance electrodes into the pulse shape so as to temporarily increase the potential difference between the potentials of the pixel electrodes and the potentials of the common electrodes or the potentials of the storage capacitance electrodes, an overdrive (feed-forward) effect can be secured without the operation of the video signals. In the invention, in contrast to conventional overdriving in which video signals are operated, it is possible to simultaneously produce the overdrive effect on the entire region electrically interconnected.

And further, by performing overdriving on the video signals themselves as well, a two-step fast response speed can be achieved in combination with the foregoing effect. This overdriving is different from the conventional overdriving in that since there is no need to increase the response speed only by the overdriving, only the application of a relatively small voltage is necessary.

On the other hand, a fall response (off-time response) cannot be sped up only by the foregoing method. Because of this, in the twisted nematic liquid crystal, a torque required to return to the twisted state is increased by setting a twist pitch p at p/d<8. Moreover, in all liquid crystal display modes including the twisted nematic liquid crystal display mode, a torque required to return to the alignment applying no voltage resulting from polymer stabilization and so on is increased, thereby the fall response (off-time response) is sped up.

To make a comparison between the fast response speed attained in the invention and conventional response speeds, a comparison between differences in response times will be made theoretically. In this comparison, twisted nematic liquid crystal display apparatuses are used. As the response times, two response times will be examined which correspond to the rise response (on-time response) and the fall response (off-time response) described in the item "Technical Background of the Invention." In FIG. 41A and FIG. 41B, the outline of ways to determine the on-time response and the off-time response of the twisted nematic liquid crystal which produces a normally white image is shown. FIG. 41A and FIG. 41B are graphs in which horizontal axes represent individual gradation levels and vertical axes represent brightness. FIG. 41A represents a rise response (on-time response) and FIG. 41B represents a fall response (off-time response). As shown in FIG. 41A, in the rise response, the on-time response is defined as a response time over which brightness varies from the highest gradation level to individual gradation levels. Also, as shown in FIG. 41B, in the fall response, the off-time response is defined as a response time over which the brightness varies from lowest gradation level to individual gradation levels. In the twisted nematic liquid crystals other than the normally white image liquid crystal and the other liquid crystal display modes, the highest-level brightness and the lowest-level brightness may be transposed. The on-time responses and the off-time responses of the four types of twisted nematic liquid crystal display apparatuses different in driving methods are schematically shown in the drawings in which horizontal axes represent individual gradation levels and vertical axes represent response times. The liquid crystal display apparatus shown in the drawing is as follows: (1) the liquid crystal display apparatus using normal driving (FIG. 42); (2) the liquid crystal display apparatus using an overdrive system (feedforward driving) (FIG. 43); (3) the method described in the foregoing first publication (Japanese Translation of International Application (Kohyo) No. 2001-506376), i.e., the liquid crystal display apparatus using a driving method which is developed by combining the overdrive system and the reset system (FIG. 44); and (4) the liquid crystal display apparatus according to the present invention (FIG. 45).

In the normal driving shown in FIG. 42, the speed of the on-time response (indicated by a broken line) is high during the application of a high voltage but is extremely low during the application of a low voltage. This response approximately adheres to the expression (1). However, the off-time response (indicated by a solid line) takes the same time over almost all the voltage range (in actuality, the response time varies with voltages; however, the response time often falls within a range which is nearly double at most. As a result, the rate-determining step of the response speed of the display apparatus (a step in which a dominant factor, which determines a reaction rate, is present: in this case, of the on-time and off-time responses, one whose speed is slower is the dominant factor) is indicated by a dotted line in FIG. 42 and shows a slow response in a low voltage range. In this figure, a voltage represented at a point where the on-time response and the off-time response intersect with each other is twice the square root of 2 of a threshold voltage Vtc in an ideal state in which the voltage adheres to the expressions (1) and (2); for example, when Vtc=1.5V, the voltage is a little more than 2V.

In the overdriving shown in FIG. 43, the on-time response (indicated by a broken line) is sped up when compared with the on-time response of the normal driving indicated by an alternate long and short dashed line in FIG. 42. However, since the off-time response (indicated by a solid line) is about the same, its rate-determining step is indicated by that of a dotted line in FIG. 43. That is, at a voltage which is higher than a voltage indicated at the intersection point of the on-time response and the off-time response, its response time is the same as that of the normal driving. At a voltage which is lower than a voltage indicated at the intersection point, its response speed is sped up. As described above, an effect at the high voltage side is small but at the low voltage side, the longest response time is taken, thereby a display can be considerably improved by overdriving. However, when a high voltage is excessively applied during the overdriving, a response delay which is the same as the transition from the reset state described above develops and in particular, the off-time response becomes slow.

In the method described in the first publication (Japanese Translation of International Application (Kohyo) No. 2001-506376) shown in FIG. 44, that is, in the driving method developed by approximately combining the overdrive system and the reset system, since a reset state is effected once on the entire display, the on-time response is produced only at the point of the reset. That is, the response time is approximately determined by the off-time response (indicated by a solid line) and hence, a rate-determining step represented a broken line is approximately determined only by the off-time response. When compared with an off-time response produced by the normal driving indicated by a broken line in FIG. 48, the off-time response of this method (indicated by a solid line) is slower because a delay is developed by a transition resulting from the reset state. However, since there is no slow response on a low voltage side, the largest length of the response time is much shorter than that of the normal driving and the response speed is higher than that achieved by the overdriving. On the other hand, on a high voltage side, the off-time response is slower than those of the normal driving and the overdriving, while the sum of the on-time response time and the off-time response time, which is frequently used as a response time, is shorter than those of the normal driving and the overdriving since the on-time response hardly contributes to it.

In the liquid crystal display apparatus according to the present invention shown in FIG. 45, since a variation in the response speed, which corresponds to that achieved by the overdriving, is made through a two-step effect achieved by the overdriving and a change into the pulse shape, the on-time response (indicated by a broken line) is sped up when compared with that of the conventional overdriving (FIG. 43). And further, since a state in which no voltage is applied is stabilized, a torque, which is required to return to the state in which no voltage is applied, is high, the off-time response (indicated by a solid line) is also sped up. Moreover, since a change in potential is implemented to secure a state in which the reset does not occur, the delay associated with the transition from the reset state shown in FIG. 44 does not occur. As a result, among the four liquid crystal display apparatuses, the display apparatus according to the present invention has the fastest response speed. In these cases, only the explanation for on-time responses and the off-time responses have been given, while it is a matter of course that responses of intermediate gradation levels are also sped up.

A first effect of the liquid crystal display apparatus according to the present invention is that the response speed of the display substance can be increased.

This is because a speedup, which corresponds to a two-step overdrive comprising the overdrive of the video signals and the change into the pulse shape at the common electrodes or the storage capacitance electrodes after the writing of the video signals, is achieved at the time of the rise. And further, this is because the delay is not developed by setting the potential and the variation in the potential at a range in which the display substance is not reset at these steps. Moreover, this is because it is possible to increase the torque at the time of the fall and to effect a change to the state in which no voltage is applied at high speed. This effect can be achieved by the control of the twist pitch, the polymer stabilization, the control of the electric field, the control of interface alignment, and so on. That is, in the liquid crystal display according to the present invention, the response speed can be sped up at all steps including the rise response, the fall response, and the intermediate gradation response.

A second effect of the invention is that the high-reliability liquid crystal display apparatus can be obtained which is capable of producing an excellent display even when the ambient temperature changes.

This is because the response speed of the liquid crystal is high and unstable alignment states such as bounce do not arise. In particular, this is due to the variation in the potentials at which the reset does not occur.

A third effect of the invention is that the liquid crystal display apparatus can be obtained which has high light-use efficiency and low power consumption.

This is because first, the optical response of the liquid crystal is sped up to reach stable transmittance quickly and secondly, the voltage required for the overdrive of the high-frequency video signals is low to perform the two-step overdrive and hence, power consumption can be reduced when compared with that of the conventional overdrive system.

A fourth effect of the invention is that the liquid crystal display apparatus can be obtained in which stable images can be generated in one frame and there is no degradation in image (variations in gradation and flicker) resulting from histories.

This is because response delays such as bounces and delays do not develop and the video signals by which desired display states can be obtained are produced by using a comparison computing unit or the look-up table (LUT). In particular, this is because the comparison between the data held by the individual pixels before the writing of the video signals, the variation in the potentials of the pixel electrodes associated with the variation in the potentials of the common electrodes changed into a pulse shape, the potentials of the storage capacitance electrodes (216) changed into a pulse shape, or the potentials of both of these, and the display data to be newly displayed is made. The variation in the potentials of the common electrodes includes the variation in the potentials of the pixel electrodes effected at the time of the polarity reversal when the display apparatus is driven by reversing the polarity of the potentials of the common electrodes. Moreover, this is because the data to be newly displayed is determined in consideration of the polarity reversal of the data signals, that is, the variation in the potentials of the pixel electrodes resulting from the capacitance coupling associated with the switching of the frames and so on. Through the waveform application taking into account such variation, the development of variations in gradation and flicker are not observed.

A fifth effect of the invention is that the liquid crystal display apparatus in which moving image blurring does not develop can be provided.

This is because an excellent display can be produced by combining field sequential driving and the driving method according to the present invention. That is, this is because moving image blurring resulting from holding type display is improved by switching the light sources through the use of a frequency which is higher than ordinary ones. And further, when the light sources are lit only in a certain period during the subframe, a response close to that of an impulse type display apparatus can be achieved, so that moving image blurring does not further develop.

A sixth effect of the invention is that it is possible to implement the overdrive type display apparatus which has a simple system configuration and which is less expensive.

This is because there is no need to compare data on all colors of the previous screen and data on all colors of the next screen and only data on a certain color (or one color made by combining a plurality of colors) of the previous screen and data on a certain color (or one color made by combining a plurality of colors) of the next screen can be compared through the adoption of the field sequential system. As a result, the required memory is reduced in size and a small comparison computing unit and small LUTs used at one time can be used.

In addition, another reason is that since the driving corresponding to the two-step overdriving is performed, the voltage for the overdriving to the video signals is lower than that of the conventional overdrive system. Among signals used in liquid crystal display apparatuses, video signals have high frequencies and in conventional overdrive systems, the voltages of high-frequency video signals are high. Because of this, conventional driving ICs have been unable to be used and there has been a necessity to use expensive driving ICs requiring a special manufacturing process and so on. Moreover, ICs, which generate video signals, are required to address special uses as well. In the system of the invention, since the voltage for the overdriving is lower than that for the conventional overdriving, there is no need to use special ICs, so that it is possible to check an increase in the production cost of the liquid crystal display apparatus according to the present invention.

A seventh effect of the invention is that a stereoscopic display liquid crystal display apparatus having a high degree of a sense of realism can be obtained. This is because a high degree of color reproducibility is achieved by using LEDs and so on. Moreover, another reason is that stereoscopic images can be displayed without spatial division and color display can be produced without spatial division. As a result, a liquid crystal display apparatus having far more pixels can be easily implemented when compared with conventional ones and a sense of realism can be improved.

BRIEF DESCRIPTION OF THE DRAWINGS

FIG. 36 (B) is a graph showing measurement results of variations in potential with respect to time in an example of the invention;

FIG. 36 (C) is a graph showing measurement results of variations in potential with respect to time in an example of the invention;

FIG. 36 (D) is a graph showing measurement results of variations in transmittance with respect to time in an example of the invention;

FIG. 41 (B) is a view showing an outline of a method for determining an off-time response of a twisted nematic liquid crystal during a normally white image;

FIG. 47 (B) is a sectional view of a display panel substrate of the invention illustrated in the order of its main production steps;

FIG. 47 (C) is a sectional view of a display panel substrate of the invention illustrated in the order of its main production steps;

FIG. 47 (D) is a sectional view of a display panel substrate of the invention illustrated in the order of its main production steps;

FIG. 48 (B) is a sectional view of the display panel substrate of the invention illustrated in the order of its main production steps;

FIG. 48 (C) is a sectional view of the display panel substrate of the invention illustrated in the order of its main production steps; and FIG. 48 (D) is a sectional view of the display panel substrate of the invention illustrated in the order of its main production steps.

DETAILED DESCRIPTION OF THE PREFERRED EMBODIMENTS

Next, embodiments of the present invention will be described in detail with reference to the accompanying drawings.

Figure 9:
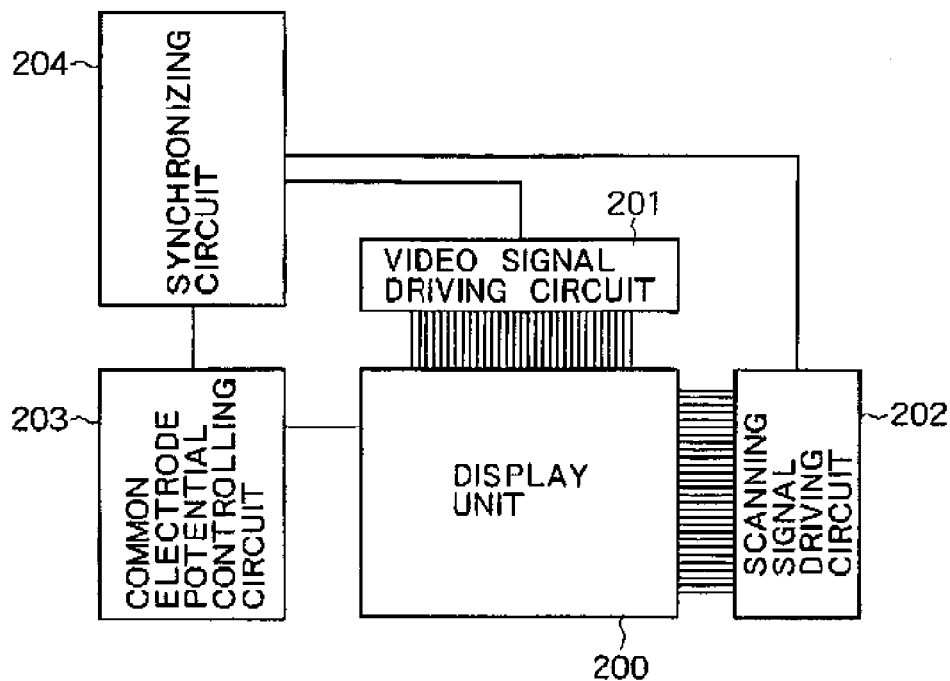
FIG. 9 is a view showing a configuration of a liquid crystal display apparatus according to a first embodiment of the present invention.
Figure 12:
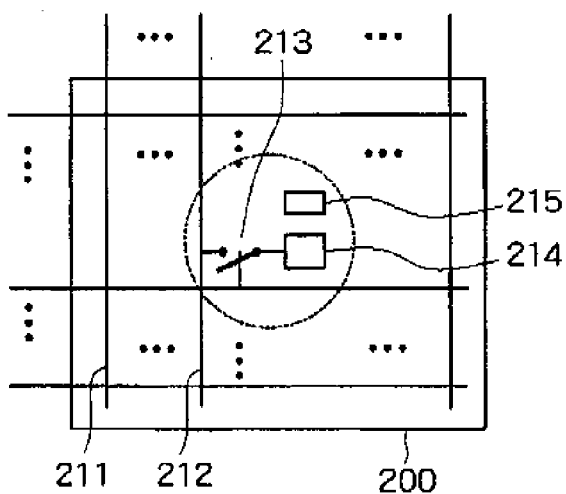
FIG. 12 is a view showing an exemplary configuration of a display unit according to the present invention.

First, a first embodiment of the present invention will be described with reference to FIG. 9 and FIG. 12. A liquid crystal display apparatus according to the first embodiment has a display unit 200, a video signal driving circuit 201, a scanning signal driving circuit 202, a common electrode potential controlling circuit 203, and a synchronizing circuit 204. In addition, the display unit 200 includes scanning signal electrodes 212, a video signal electrode 211, a plurality of pixel electrodes 214 arranged in matrix form, a plurality of switching elements 213 which transmit video signals to the pixel electrodes 214, and common electrodes 215. The common electrode potential controlling circuit 203 changes the potential of the common electrodes 215 into a pulse shape after the scanning signal driving circuit 202 scans the entire scanning electrodes 212 and transmits video signals to the pixel electrodes 214.

Figure 15:
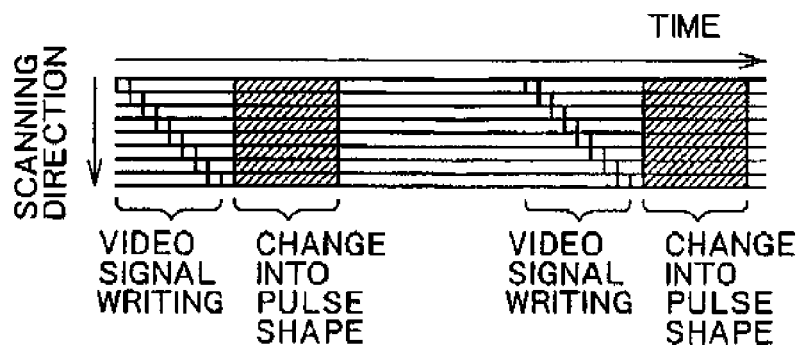
FIG. 15 is a view showing an exemplary timing according to the first embodiment of the invention.
Figure 16:
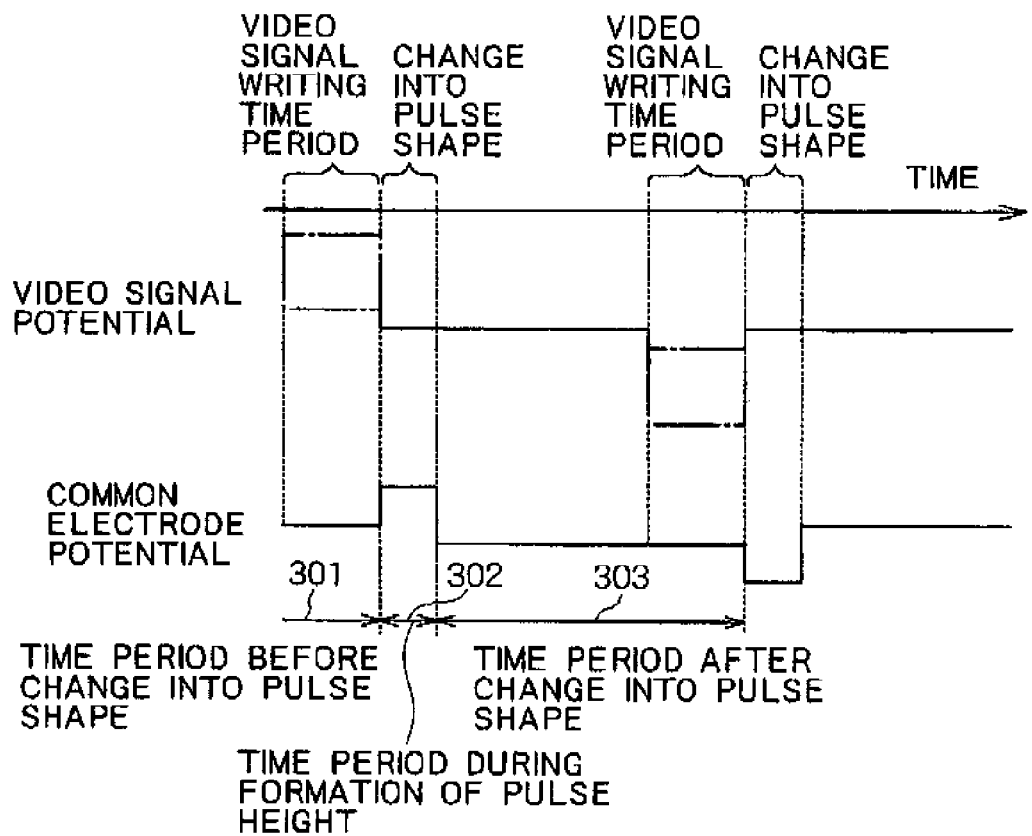
FIG. 16 is a view showing an exemplary waveform according to the first embodiment of the invention.

Next, an operation of the liquid crystal display apparatus according to the first embodiment having such a configuration will be described with reference to FIG. 15 and FIG. 16. FIG. 15 is a drawing for showing an exemplary timing according to the embodiment and FIG. 16 is a drawing for showing an exemplary waveform according to the embodiment. According to the embodiment, after video signals are transmitted to the pixel electrodes 214, the potential of the common electrode is changed into a pulse shape. Through the change of the potential into the pulse shape, a potential difference between the potentials of the pixel electrodes and the potential of the common electrode developed after the transmission of the video signals varies between a time period 301 before the potential is changed into a pulse shape, a time period 302 over which the pulse height portion to which the transmission of the video signals varies is formed, and a time period 303 after the change of the potential into the pulse shape has ended. However, the potential difference before its change into the pulse shape may be equal to the potential difference after its change into the pulse shape. As a result, a change in the state and the response speed of a display substance at each time period can be adjusted. Therefore, it is possible to increase the response speed and it is also possible to decrease it as required. The effect of the adjustment of the response speed is adjusted by a difference between the potentials changed into a pulse shape in (the time period 301 before its change into the pulse shape, the time period 302 during the formation of the pulse height portion to which the transmission of the video signals varies, and the time period 303 after its change into the pulse shape) and the length of the time period over which the potential is changed into a pulse shape.

And further, the potential difference between the potential developed in the time period 301 before its change into the pulse shape and the potential developed in the time period 303 after its change into the pulse shape is adjusted so as to complement the effect of a variation in the potentials of the pixel electrodes resulting from a capacitance coupling associated with the change into the pulse shape. Moreover, the potential difference is adjusted according to the state of a display which is desired after the change into the pulse shape and so on.

Figure 10:
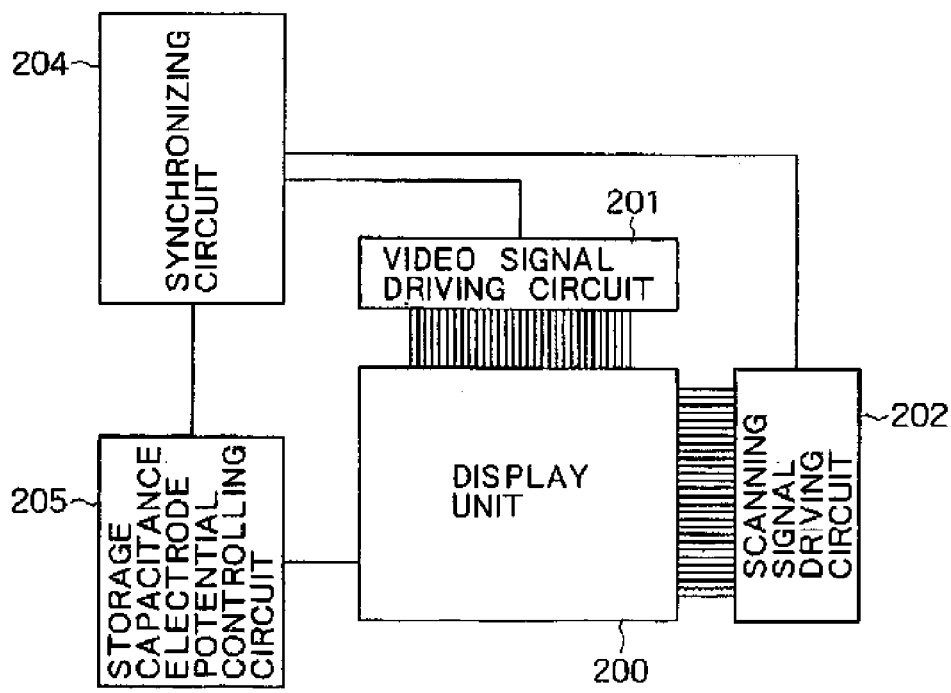
FIG. 10 is a view showing a configuration of a liquid crystal display apparatus according to a second embodiment of the invention.
Figure 13:
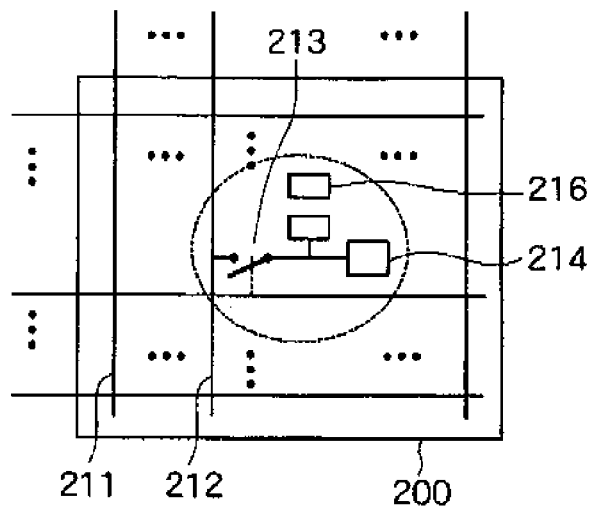
FIG. 13 is a view showing an exemplary configuration of a display unit according to the present invention.

Next, a second embodiment of the present invention will be described with reference to FIG. 10 and FIG. 13. A liquid crystal display apparatus according to the second embodiment has the display unit 200, the video signal driving circuit 201, the scanning signal driving circuit 202, a storage capacitance electrode potential controlling circuit 205, and the synchronizing circuit 204. In addition, the display unit 200 has the scanning signal electrodes 212, the video signal electrodes 211, the plurality of pixel electrodes 214 arranged in matrix form, the plurality of switching elements 213 which transmit video signals to the pixel electrodes 214, and storage capacitance electrodes 216. The storage capacitance electrode potential controlling circuit 205 changes the potential of the storage capacitance electrodes 216 into a pulse shape after the scanning signal driving circuit 202 scans the entire scanning electrodes 212 and transmits video signals to the pixel electrodes 214.

Next, an operation of the liquid crystal display apparatus according to the second embodiment will be described. In this embodiment, by changing the potential of the storage capacitance electrodes into the pulse shape after the transmission of the video signals to the pixel electrodes 214, the same effect as that described in the first embodiment can be obtained. However, the effect of such an adjustment made in this embodiment is achieved by a variation in the potentials of the pixel electrodes resulting from capacitance coupling and hence, such an effect is different from the effect of the first embodiment which is achieved by both the variation in the potential of the common electrode and the variation in the potentials of the pixel electrodes resulting from the capacitance coupling. That is, the effect of the second embodiment is not brought about by a direct means, that is, the variation in the potential of the common electrode is brought about by an indirect means, that is, the variation in the potentials of the pixel electrodes resulting from the capacitance coupling.

Figure 11:
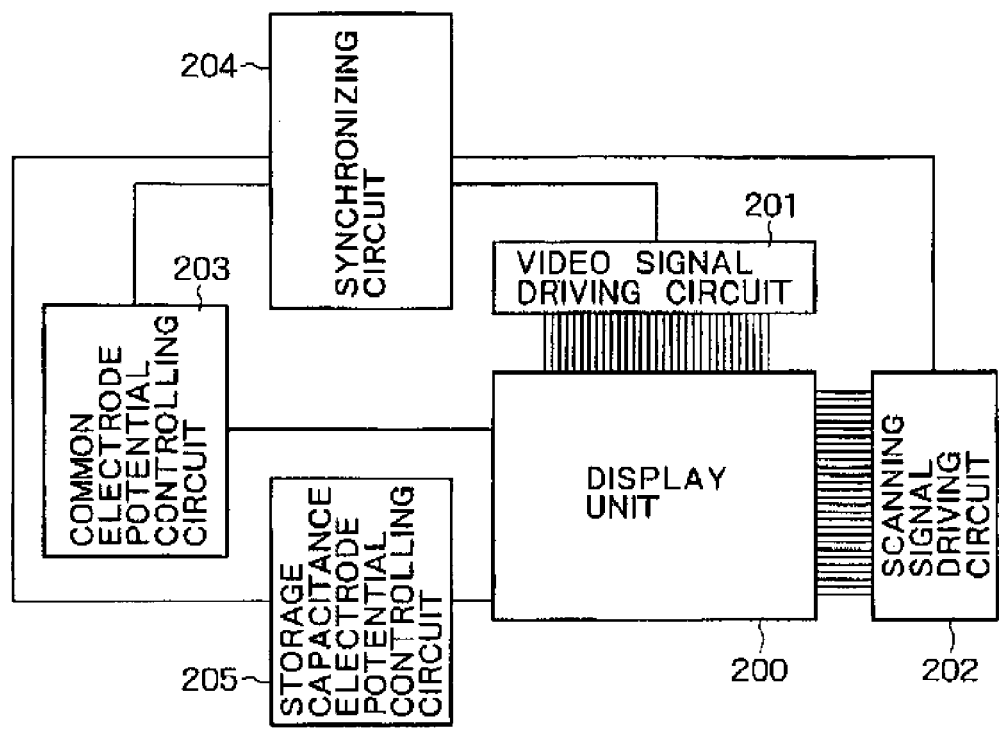
FIG. 11 is a view showing a configuration of a liquid crystal display apparatus according to a third embodiment of the invention.
Figure 14:
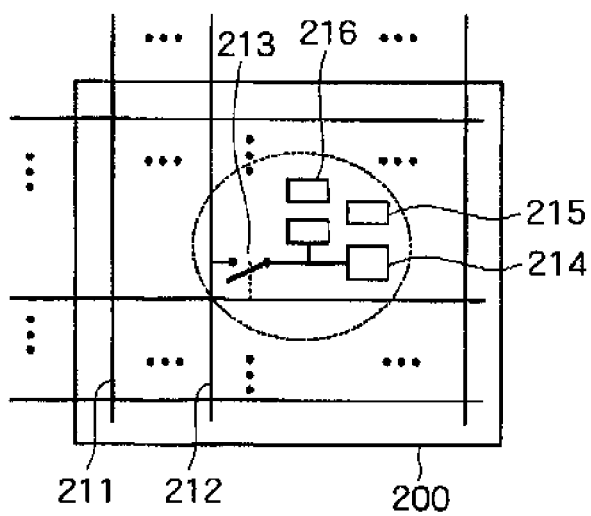
FIG. 14 is a view showing an exemplary configuration of a display unit according to the present invention.

A third embodiment according to the present invention will be described with reference to FIG. 11 and FIG. 14. A liquid crystal display apparatus according to the third embodiment has the display unit 200, the video signal driving circuit 201, the scanning signal driving circuit 202, the common electrode potential controlling circuit 203, the storage capacitance electrode potential controlling circuit 205, and the synchronizing circuit 204. In addition, the display unit 200 has the scanning signal electrodes 212, the video signal electrodes 211, the plurality of pixel electrodes 214 arranged in matrix form, the plurality of switching elements 213 which transmit video signals to the pixel electrodes 214, the common electrodes 215, and the storage capacitance electrodes 216. The common electrode potential controlling circuit 203 changes the potential of the common electrodes 215 into a pulse shape after the scanning signal driving circuit 202 scans the entire scanning electrodes 212 and transmits video signals to the pixel electrodes 214. The storage capacitance electrode potential controlling circuit 205 changes the potential of the storage capacitance electrodes 216 into a pulse shape after the scanning signal driving circuit 202 scans the entire scanning electrodes 212 and transmits video signals to the pixel electrodes 214.

Next, an operation of the liquid crystal display apparatus according to the third embodiment will be explained. In this embodiment, by changing the potentials of both the common electrode and the storage capacitance electrode into the pulse shapes, the state of a display, a response speed, and so on are adjusted. Therefore, the operation of the liquid crystal display apparatus according to the embodiment corresponds to a combination of the operation described in the first embodiment and the operation described in the second embodiment.

However, in this embodiment, excellent operation, which cannot be achieved by such a mere combination, can be expected. For example, by making the polarity of the change into the pulse shape of the common electrode differ from that of the storage capacitance electrode, the variation in the potential of the pixel electrode resulting from the capacitance coupling can be suppressed. On the other hand, by making the common electrode and the storage capacitance electrode have the same polarity of the change into the pulse shape, the variation can be increased further, thereby the effect of the liquid crystal display apparatus of the third embodiment can be doubled when compared with those described in the first and second embodiments. And further, by making their timing of the synchronization different from each other or by making their length of the time period over which the change into the pulse shape is performed different from each other, the response speed can be adjusted more minutely.

A fourth embodiment of the invention will be explained below. In the fourth embodiment, the configurations of a liquid crystal display apparatus and a display unit correspond to those described in the first embodiment shown in FIG. 9 and FIG. 13. That is, the liquid crystal display apparatus according to the fourth embodiment also has the display unit 200, the video signal driving circuit 201, the scanning signal driving circuit 202, the common electrode potential controlling circuit 203, and the synchronizing circuit 204. The display unit 200 has the scanning signal electrodes 212, the video signal electrodes 211, the plurality of pixel electrodes 214 arranged in matrix form, the plurality of switching elements 213 which transmit video signals to the pixel electrodes, and the plurality of common electrodes 215 which are electrically isolated from one another. The fourth embodiment differs from the first embodiment in that after the scanning signal driving circuit 202 scans part of the scanning electrodes 212 and transmits video signals to the pixel electrodes 214, the common electrode potential controlling circuit 203 changes the potentials of the common electrodes 215, which correspond to the scanning electrodes 212 scanned by the scanning signal driving circuit 202, into pulse shapes.

A fifth embodiment according to the present invention will be described below. In the fifth embodiment, the configurations of a liquid crystal display apparatus and a display unit correspond to those described in the second embodiment and will be explained with reference to FIG. 10 and FIG. 13. The liquid crystal display apparatus according to the fifth embodiment also has the display unit 202, the video signal driving circuit 201, the scanning signal driving circuit 202, the storage capacitance electrode potential controlling circuit 205, and the synchronizing circuit 204. Also, the display unit 200 has the scanning electrodes 212, the video signal electrodes 211, the plurality of pixel electrodes 214 arranged in matrix form, the plurality of switching elements 213 which transmit video signals to the pixel electrodes 214, and the plurality of storage capacitance electrodes 216 which are electrically isolated from one another. The fifth embodiment differs from the second embodiment in that after the scanning signal driving circuit 202 scans part of the scanning electrodes 212 and transmits video signals to the pixel electrodes 214, the storage capacitance electrode potential controlling circuit 205 changes the potentials of the storage capacitance electrodes 216, which correspond to the scanning electrodes 212 scanned by the scanning signal driving circuit 202, into pulse shapes.

A sixth embodiment according to the present invention will be described below. The configuration of the sixth embodiment corresponds to that of the third embodiment shown in FIG. 11 and FIG. 14. A liquid crystal display apparatus according to the sixth embodiment also has the display unit 200, the video signal driving circuit 201, the scanning signal driving circuit 202, the common electrode potential controlling circuit 203, the storage capacitance electrode potential controlling circuit 205, and the synchronizing circuit 204. Also, the display unit 200 has the scanning electrodes 212, the video signal electrodes 211, the plurality of pixel electrodes 214 arranged in matrix form, the plurality of switching elements 213 which transmit video signals to the pixel electrodes 214, the plurality of common electrodes 215 which are electrically isolated from one another, and the plurality of storage capacitance electrodes 216 which are electrically isolated from one another. The sixth embodiment differs from the third embodiment in that after the scanning signal driving circuit 202 scans part of the scanning electrodes 212 and transmits video signals to the pixel electrodes 214, the common electrode potential controlling circuit 203 changes the potentials of the common electrodes 215, which correspond to the scanning electrodes 212 scanned by the scanning signal driving circuit 202, into pulse shapes and after the scanning signal driving circuit 202 scans part of the scanning electrodes 212 and transmits video signals to the pixel electrodes 214, the storage capacitance electrode potential controlling circuit 205 changes the potentials of the storage capacitance electrodes 216, which correspond to the scanning electrodes 212 scanned by the scanning signal driving circuit 202, into pulse shapes.

Figure 17:
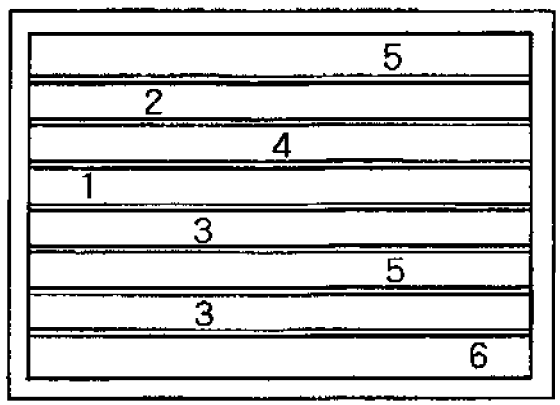
FIG. 17 is a view showing an exemplary order used for scanning electrically isolated electrodes according to the fourth to sixth embodiments of the invention.
Figure 18:
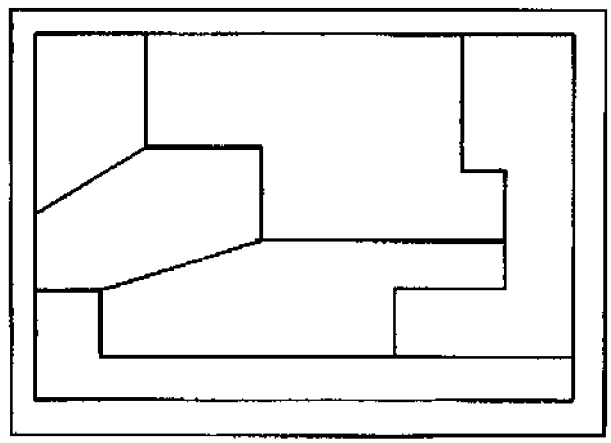
FIG. 18 is a view showing an exemplary shape of electrically isolated electrodes of display units according to the fourth to sixth embodiments of the invention.
Figure 19:
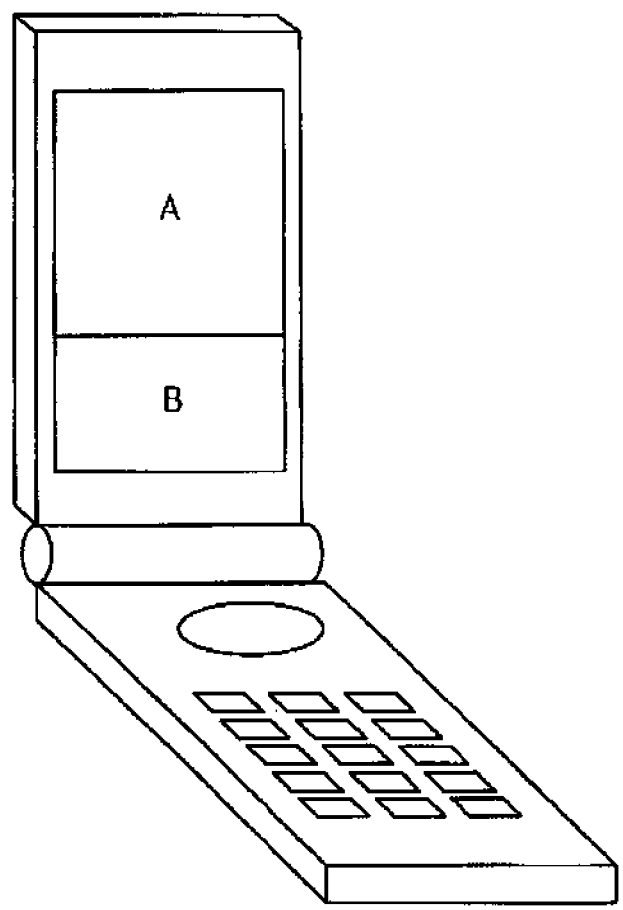
FIG. 19 is a view showing an exemplary display for a cellular telephone to which the fourth to sixth embodiments of the invention are applied.
Figure 20:
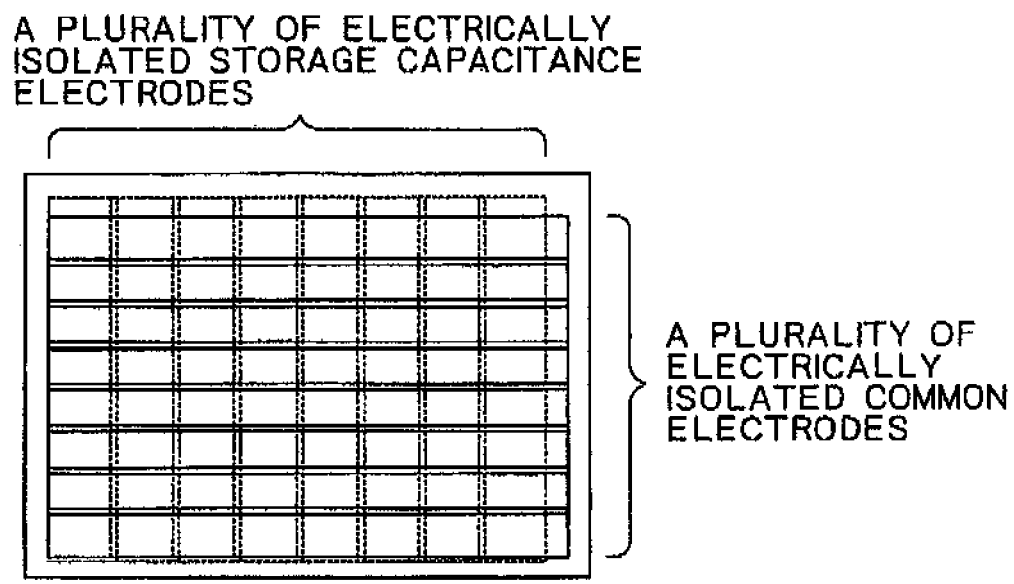
FIG. 20 is a view showing an exemplary arrangement of a plurality of electrically isolated common electrodes and a plurality of electrically isolated storage capacitance electrodes of the display units according to the fourth to sixth embodiments of the invention.

Next, the operations of the liquid crystal display apparatuses according to the fourth to sixth embodiments of the invention will be described with reference to FIG. 17 to FIG. 20. FIG. 17 is a drawing showing an exemplary order in which the electrodes, which are electrically isolated in the display units described in the fourth to sixth embodiments, are scanned. FIG. 18 is a drawing for explaining an exemplary shape of the electrodes which are electrically isolated in the display units described in the fourth to sixth embodiments. FIG. 19 is a drawing showing an exemplary display for a cellular phone to which the liquid crystal display apparatuses according to the fourth to sixth embodiments are applied. FIG. 20 is a drawing showing an exemplary arrangement of the electrically isolated common electrodes and the electrically isolated storage capacitance electrodes of the display units described in the fourth to sixth embodiments.

In the fourth to sixth embodiments of the invention, since the common electrodes, the storage capacitance electrodes, or both of these is divided into a plurality of portions electrically isolated, the same change in the potentials as those described in the first to third embodiments can be given to only part of the display unit. As a result, in the fourth to sixth embodiments, the effect exerted on the entire display unit described in the first to third embodiments can be limited so as to be exerted on part of the display unit. That is, since the display unit is divided into a plurality of sub display units, it is possible to give a change in potential to the individual sub display units in sequence while scanning the sub display units in sequence. Moreover, it is also possible to simultaneously give a change in potential to the plurality of sub display units. In either case, the locations of the sub display units scanned in sequence within the display unit can be selected freely. For example, it is possible to give a change in potential in order shown by the numbers of FIG. 17. That is, it is possible to give a change in potential in such a way that not only are the suitably selected regions scanned in sequence but the plurality of regions are simultaneously changed at the scanning order of No. 3 and No. 5. Furthermore, for example, it is possible to give the change through the use of different areas and shapes shown in FIG. 18.

Furthermore, it is also possible to selectively give a change in potential only to part of the entire display unit among all display units. As a result, it is possible to make a difference between the state of display at the selected display unit and the state of display at the nonselected display unit. For example, it is possible to produce a fast response at the portion of a display region A of the display for the cellular phone shown in FIG. 19, while it is possible to produce a response at normal speed at the portion of a display region B. As a consequence, for example, a display is divided into a portion where fast moving image displays such as TV images are required and a portion where freeze-frame picture-like displays, on which images are not changed so much, are required, so that it becomes possible to reduce power consumption as a whole.

On the other hand, in the sixth embodiment of the invention, by making a difference between the shape of the electrically isolated common electrodes and the shape of the electrically isolated storage capacitance electrodes as shown in FIG. 20, the display unit is divided into four regions, that is, the region where only the potentials of the common electrodes are changed into pulse shapes, the region where only the potentials of the storage capacitance electrodes are changed into a pulse shape, the region where the potentials of both the common electrodes and the storage capacitance electrodes are changed into pulse shapes, and the region where the change into pulse shapes are not made.

By these operations, for example, a response at a certain region where a response speed is particularly slow in the display unit can be sped up. Further, it is possible to correct the unevenness of brightness resulting from viewing angle dependence by adjusting a response speed of the display unit so as to correct viewing angle dependency which develops within the display unit. Still further, it is possible to correct differences in the unevenness of display and flicker which are developed according to the scanning order of scanning lines and which are affected by the positions of the display within the screen. That is, by limiting regions where the change into the pulse shape is made in a certain time period to some regions, the unevenness of display and flicker at the other regions can be suppressed or the unevenness of display and flicker at the regions where the change into the pulse shape is made can be suppressed. The common electrodes and the storage capacitance electrodes, which are separately provided to this plurality of regions, can also be, for example, synchronized with the scanning timing of the scanning line at a certain relationship for scanning. As a consequence, the unevenness of display and flicker resulting from the scanning can be suppressed efficiently.

A liquid crystal display apparatus according to a seventh embodiment of the invention corresponds to that described in the first, third, fourth, or sixth embodiment in which the potential of the common electrode 215 to be changed into a pulse shape is equal to the potential by which display produced by the display unit 200 is not reset.

A liquid crystal display apparatus according to an eighth embodiment of the invention corresponds to that described in the second, third, fifth, or sixth embodiment in which the potential of the storage capacitance electrode 216 to be changed into a pulse shape is equal to the potential by which display produced by the display unit 200 is not reset.

In the seventh and eighth embodiments, since the potential to be changed into a pulse shape is equal to the potential by which a display produced by the display unit is not reset, the foregoing delay is not developed and responses are sped up. The explanation of the principle of the foregoing will not be repeated because it has been made in the item "Means for Solving the Problems," but an example of the actual fabrication of the liquid crystal display apparatus according to the seventh embodiment will be described below based on its operation and effect in comparison with a comparative example.

The example of the seventh embodiment will be explained in comparison with the comparative example in which a voltage to be reset is applied. In the example and the comparative example, a thin film transistor made of amorphous silicon to be described below is used as the switching element, and a nematic liquid crystal substance is used as the display substance of the display unit to produce a twisted nematic alignment.

Figure 21:
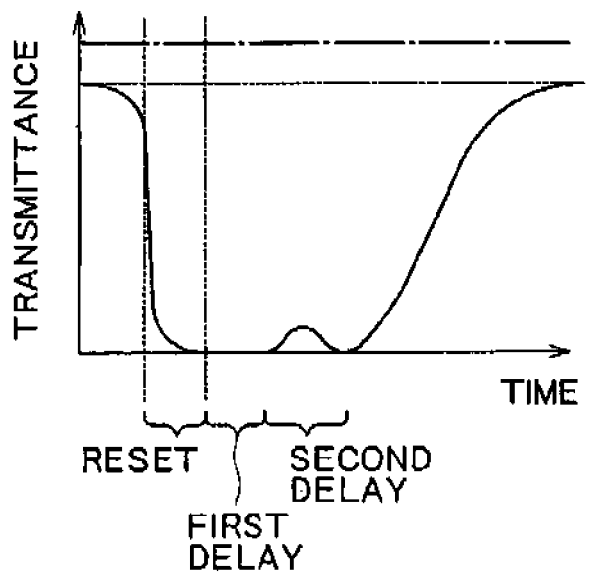
FIG. 21 is a graph showing a variation in transmittance with respect to time shown in a case where a change into a pulse shape, which has the same effect as that of the conventional reset, is provided.
Figure 22:
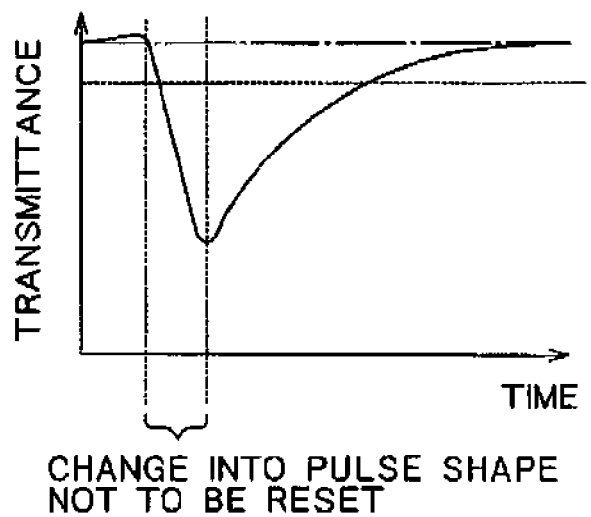
FIG. 22 is a graph showing a variation in transmittance with respect to time shown in a case where a change into a pulse shape is not reset according to the present invention is provided.

FIG. 21 is a graph for explaining a variation in transmittance with respect to time indicated in a case where a change into a pulse shape for reset is provided as in the case with conventional reset driving. On the other hand, FIG. 22 is a graph for explaining a variation in transmittance with respect to time indicated in a case where a change into a pulse shape is not reset according to the present invention is provided. To compare effects of reset states on response speeds, the same sequence for driving is used and a change into a pulse shape is given to both of these. That is, video signals are initially written to all pixels and then a change into a pulse shape (a reset state is provided in FIG. 21 and the reset is not carried out in FIG. 22) is given. When the same change into the pulse shape as that of the conventional reset as shown in FIG. 21, the first delay, which is shown in the item "Means for Solving the Problems," develops and then, the second delay develops after the change into the pulse shape ends. In contrast, in the change into the pulse shape according to the present invention shown in FIG. 22, neither the first delay nor the second delay develop and after the change into the pulse shape ends, a response is produced immediately so as to exhibit a desired transmittance. As a result, in the conventional reset state, a desired transmittance (indicated by an alternate long and two short dashed lines in FIG. 21) is not reached. On the other hand, in the change into the pulse shape according to the present invention, the maximum transmittance which is able to be secured at the conventional reset state (indicated by a chain line in FIG. 21) is reached immediately after the change into the pulse shape ends, following which the desired transmittance is reached, thereby the transmittance is stabilized.

Next, a ninth embodiment according to the present invention will be described below. A liquid crystal display apparatus according to the ninth embodiment corresponds to that described in the first, third, fourth, sixth, or seventh embodiment in which the potential of the common electrodes 215 vary between at least three potentials and preferably between at least four potentials.

A liquid crystal display apparatus according to the tenth embodiment of the invention corresponds to that described in the second, third, fifth, sixth, or eighth embodiment in which the potential of the storage capacitance electrodes 216 vary between at least three potentials and preferably at least four potentials.

Next, the operation of the liquid crystal display apparatuses according to the ninth and tenth embodiments will be explained with reference to FIG. 16. In these embodiments as well, by giving a voltage change shown in FIG. 16, a change into a pulse shape can be effectively given to both the polarities of video signals whose polarity is reversed.

Next, an eleventh embodiment according to the present invention will be explained below. A liquid crystal display apparatus according to the eleventh embodiment corresponds to those described in the first to tenth embodiments in which the potential of the common electrodes 215 or the storage capacitance electrodes 216 are changed into a pulse shape so as to temporarily increase a potential difference between the potential of the pixel electrodes 214 and the potential of the common electrodes 215 or the potential of the storage capacitance electrodes 216.

Next, the operation of the liquid crystal display apparatus according to the eleventh embodiment of the invention will be explained. In the eleventh embodiment, by temporarily increasing such a potential difference, an overdrive (feedforward) effect can be obtained without the control of video signals. In this invention, unlike conventional overdriving in which video signals are controlled, it is possible to simultaneously produce the overdrive effect on the entire region electrically connected.

Next, a twelfth embodiment according to the present invention will be explained. A liquid crystal display apparatus according to the twelfth embodiment corresponds to those described in the first to eleventh embodiments in which the potential of the video signals is different from the potential of a video signals which is in a stable display state in static driving in consideration of the response characteristics of the display unit 200 during charge holding type driving. For example, by providing overshoot characteristics, arrival time for a predetermined transmittance is shortened.

In this embodiment, to transmit video signals to the pixel electrodes 214 via the switching elements, charge holding type driving, in which the display apparatus is driven so as to hold a charge at the instant when the switching elements are turned off, is adopted instead of static driving in which the display unit is driven by continuing to apply voltage.

Next, a thirteenth embodiment according to the present invention will be explained. A liquid crystal display apparatus according to the thirteenth embodiment corresponds to that described in the twelfth embodiment in which the potential of the video signals is determined by comparing the hold data of the individual pixels before the writing of the video signals and display data to be newly displayed in consideration of the response characteristics of the display unit 200. Specifically, by using a comparison computing unit and a look-up table (LUT), a video signal, by which a desired display state can be obtained, is determined. In particular, the video signal is determined by comparing the hold data of the individual pixels before the writing of the video signal, a variation in the potentials of the pixel electrodes associated with a variation in the potentials of the common electrodes to be changed into a pulse shape, the potentials of the storage capacitance electrodes 216 to be changed into a pulse shape, or the potentials of both of these, and display data to be newly displayed. The variation in the potentials of the common electrodes includes the variation in the potentials of the pixel electrodes caused during polarity reversal which is brought about when driving is performed by reversing the polarity of the potentials of the common electrodes, the potentials of the storage capacitance electrodes, or the potentials of both of these. Furthermore, the data to be newly displayed is also determined in consideration of the polarity reversal of data signals, that is, the variation in the potentials of the pixel electrodes resulting from capacitance coupling associated with the switching of the frames and so on. Through the waveform application taking into account such a variation, variations in gradation and flicker do not occur.

Figure 1:
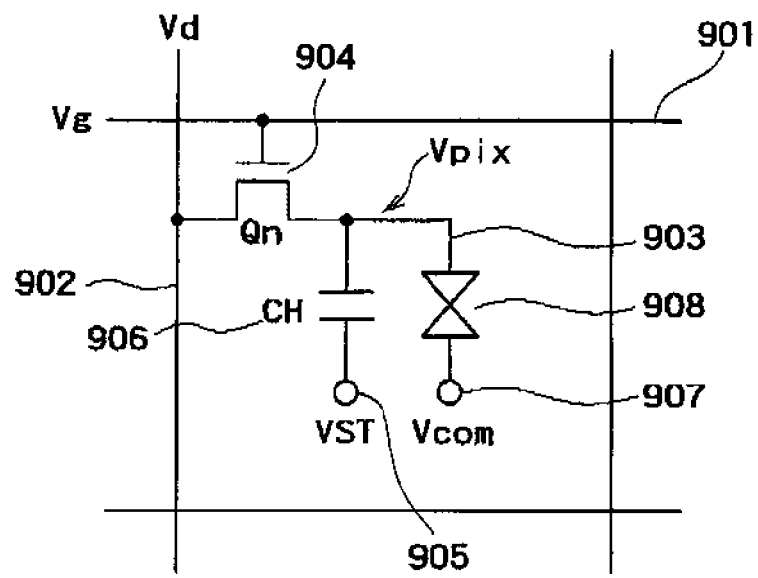
FIG. 1 is a view showing an exemplary pixel circuit included in a conventional liquid crystal display apparatus.
Figure 2:
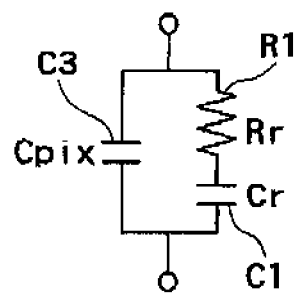
FIG. 2 is a view showing an equivalent circuit of a TN liquid crystal.
Figure 3:
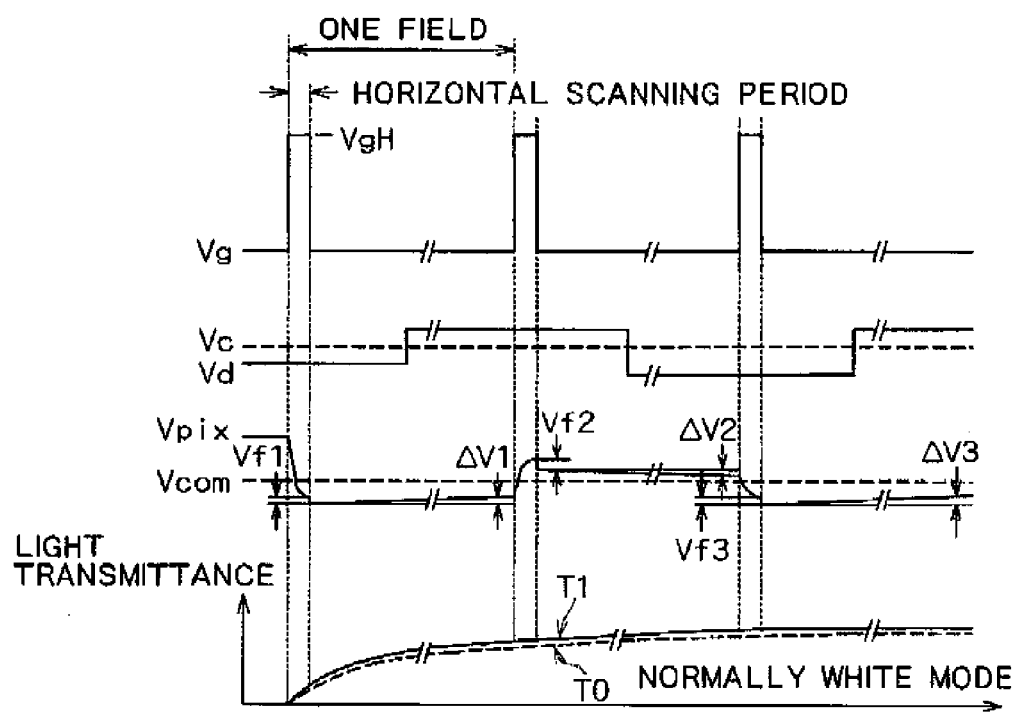
FIG. 3 is a timing chart of the driving of the TN liquid crystal of the conventional liquid crystal display apparatus.
Figure 4:
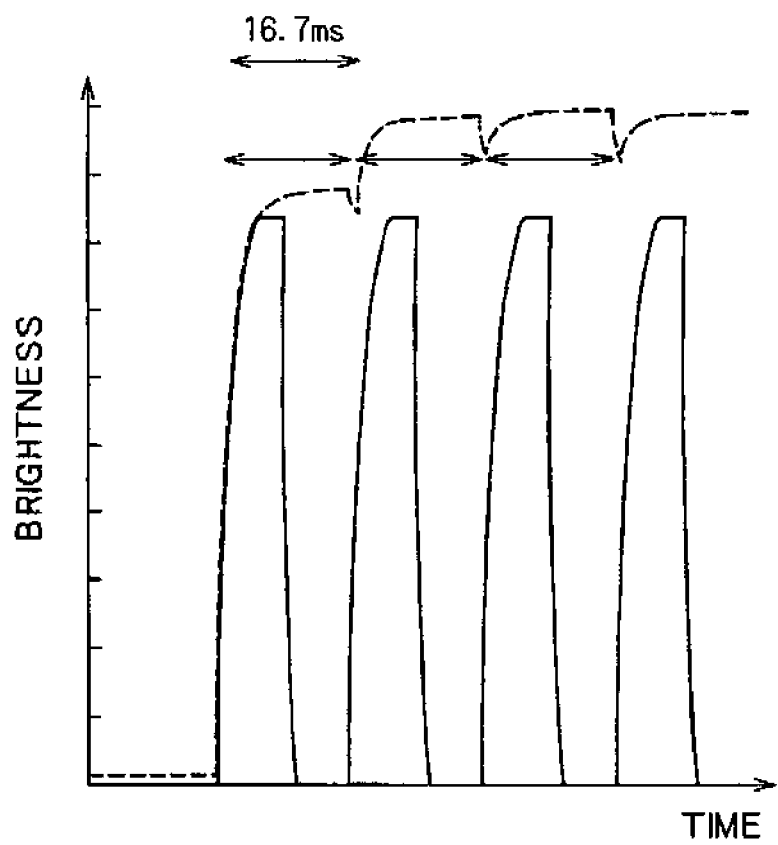
FIG. 4 is a graph showing the effect of conventional reset driving in which a dotted line represents normal driving and a solid line represents a variation in light intensity of driving effected by the reset driving.
Figure 5:
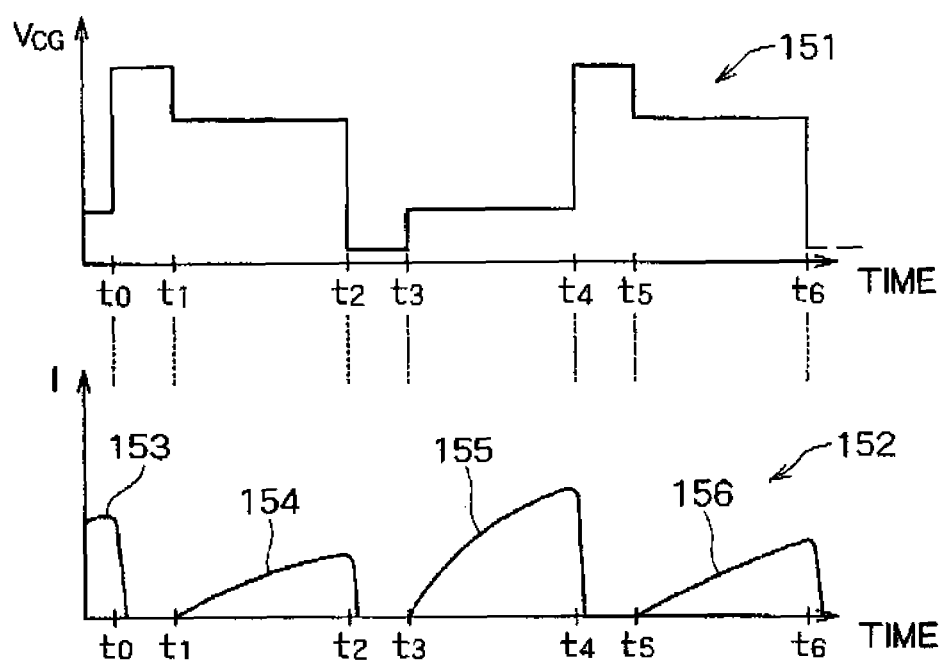
FIG. 5 is a graph for explaining conventional driving performed by modulating common voltage in which an upper graph represents a waveform of a voltage applied to a common electrode and a lower graph represents light intensity.
Figure 6:
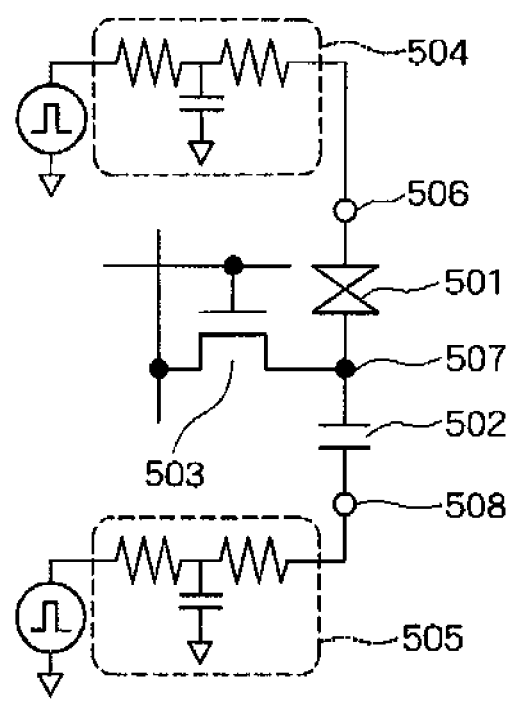
FIG. 6 is a view showing a relationship between wiring electrically connected to a certain pixel and potential.
Figure 7:
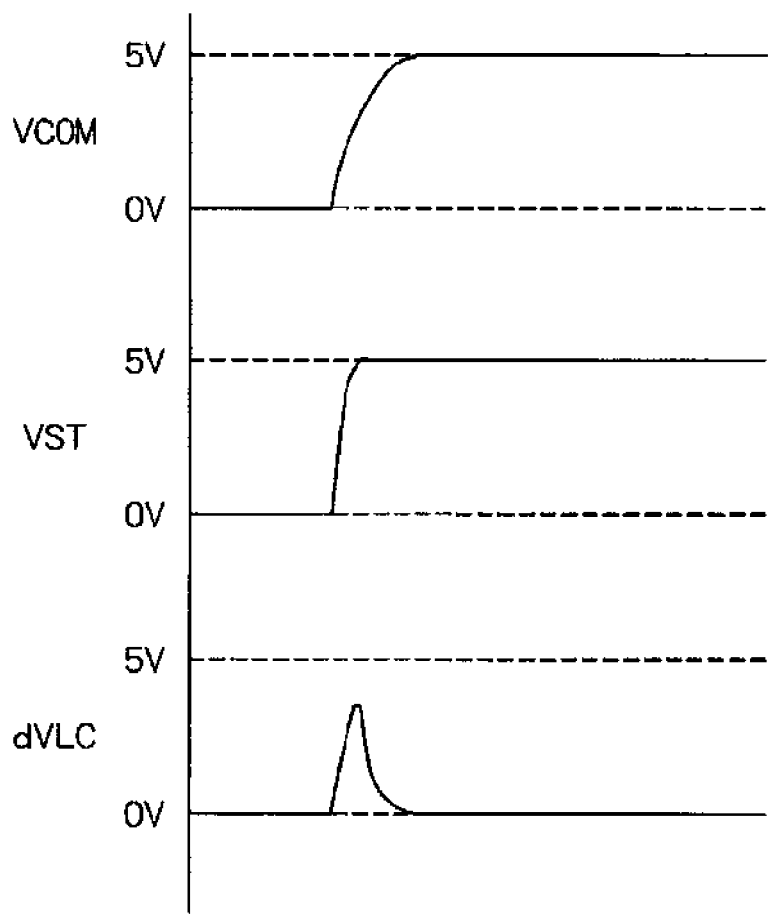
FIG. 7 is a graph showing variations in potentials of an opposing electrode and a storage capacity line with respect to time and a variation in a potential of a liquid crystal capacitor with respect to time which are effected when the potentials of the opposing electrode and the storage capacity line are determined by a time constant circuit.

The operation of some of the liquid crystal display apparatus according to the embodiments performed by using a special method will be specifically explained with reference to FIG. 6 and FIG. 7. FIG. 6 is a drawing for explaining a relationship between wiring electrically connected to a certain pixel and potentials. Video signal data is written into a liquid crystal capacitor 501 and a storage capacitor 502 via a pixel TFT 503. A potential at a node through which writing is carried out is represented as a pixel potential VLC (507). A potential of an opposing electrode of the liquid crystal capacitor, that is, an opposing electrode potential VCOM (506) is supplied from an external power source and between an external electrode and the opposing electrode, additional resistance and additional capacitance are present. A portion where a time constant is determined by the additional resistance and the additional capacitance is indicated in FIG. 6 as the time constant circuit 504 of the opposing electrode. Likewise, a potential on the side other than the liquid crystal side of the storage capacitor, i.e., a storage capacity potential VST (508) is supplied from an external power source and the time constant circuit 505 of the storage capacity line is present as well. When consideration is given to these time constants, it is found that the potentials vary complexly. Those complex variations are shown in FIG. 7. FIG. 7 shows variations dVLC in the individual potentials shown in FIG. 6, i.e., the opposing electrode potential VCOM (506), the storage capacity line potential VST (508), and the pixel potential VLC (507) with respect to time. The opposing electrode is often made of a transparent electrode in general and its wiring resistance is relatively high. Therefore the time constant of the wiring, that is, the response time of the variations in the potentials is, for example, 130 microseconds. When an initial potential (which is represented as 0V in FIG. 7) stands for 0%, the term "response time" refers to a time period during which 90% of a difference between a target potential (5V in FIG. 7) and the initial potential is reached. On the other hand, the storage capacitance electrode line is made of a metal and is of high wiring resistance. Therefore the time constant of the storage capacity line potential is, for example, 8 microseconds. Even when the voltages at the opposing electrode and the storage capacitance electrode line are varied by the same voltage (for example, from 0V to 5V as shown in FIG. 7) with the same timing, the variation in the pixel electrode potential dVLC develops through a difference between the time constant of the opposing electrode potential and the time constant of the storage capacity line potential. Such a variation in the pixel electrode potential develops a difference in display and the difference is recognized as flicker.

Furthermore, voltage fluctuation is developed by capacitance coupling via parasitic capacities between not only the gate and the source of the pixel TFT 503 but also the gate and the drains of the pixel TFT 503. Moreover, voltage fluctuation is developed by the leakage current of the pixel TFT 503 as well. In particular, these voltage fluctuations are developed when the frames are changed, that is, when signals are inverted at each frame. By taking into account these voltage fluctuations as well, the unevenness of display and flicker can be reduced.

In this embodiment, hold data roughly corresponds to the sum of charges held between the pixel electrodes 214 and the common electrodes 215 and charges held between the pixel electrodes 214 and the storage capacitance electrodes 216. Also, display data to be newly displayed roughly corresponds to the average of the sum of charges between the pixel electrodes 214 and the common electrodes 215 and charges between the pixel electrodes 214 and the storage capacitance electrodes 216 within display time or the sum of charges between the pixel electrodes 214 and the common electrodes 215 and charges between the pixel electrodes 214 and the storage capacitance electrodes 216 at the time when the display time has ended.

In the twelfth embodiment of the invention, by providing a charge different from that of static driving, a potential which is suitable for driving using the pixel switches can be applied. And further, by providing overshoot characteristics to video signals, a fast response speed attributed to the overdrive effect can be achieved.

Figure 23:
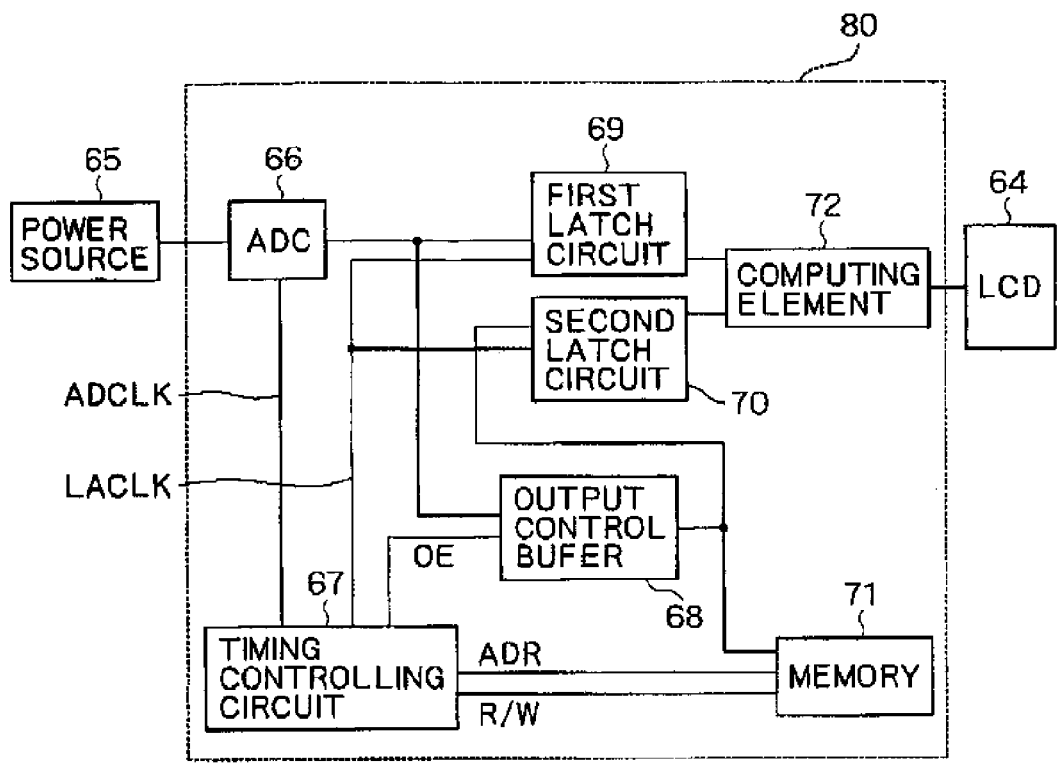
FIG. 23 is a block diagram showing an exemplary driving device which drives liquid crystal display apparatuses according to the twelfth and thirteenth embodiments of the invention.

Moreover, by comparing hold data of the individual pixels before the writing of the video signals and display data to be newly displayed, more efficient video signals can be selected. For example, a circuit described in Japanese Patent No. 3039506 can be used. FIG. 23 shows an example of a driving unit described in this patent publication. This display apparatus displays images of individual display frames by feeding writing signal voltages, which correspond to display data, to individual pixels designated in sequence. A driving unit 80, which drives a liquid crystal display 64, is connected between a signal source 65 and a liquid crystal display (LCD) 64. The driving unit 80 has an analog-digital converter circuit (hereinafter abbreviated as ADC circuit) 66 connected to the signal source 65, a first latch circuit 69 connected to the ADC circuit 66, and an output controlling buffer 68 connected to the ADC circuit 66. The driving unit 80 further has a memory 71 connected to the output controlling buffer 68, a second latch circuit 70 connected to the memory 71 via a node which connects the output controlling buffer 68 and the memory 71, a computing element 72 connected to the first latch circuit 69 and the second latch circuit 70, and a timing controlling circuit 67. The ADC circuit 66 is synchronized with a clock ADCLK and converts an analog signal supplied by the signal source 65 to a digital signal. The output controlling buffer 68, which has an output controlling function, receives a control signal OE to bring an output terminal into a high impedance (hereinafter "Hi-Z") state. Here, at an output enable state in which inputted data is outputted when the control signal OE is at a high level, the output terminal becomes Hi-Z when the signal is at a low level. The memory 71 has a capacity for one full frame or more and is controlled by an address signal ADR and a control signal R/W. The memory 71 performs reading operation when R/W is at a high level and the memory 71 performs writing operation when R/W is at a low level. The first and second latch circuits 69 and 70 are each a circuit which captures input data and holds them while receiving a clock LACLK. In this case, the first and second latch circuits 69 and 70 capture data on a clock rising edge and holds them until the next rising edge. The first latch circuit 69 latches a video signal voltage VS (m, n) and the second latch circuit 70 latches a video signal voltage VS (m, n−1). A writing signal voltage Vex (m, n) at the mth pixel of the frame n is determined from the linear sum Vex(m,n)=AVS(m, n)+BVS (m, n−1) (A and B are constants) of a video signal voltage VS (m, n−1) at the mth pixel of the frame n−1 displayed the last time and a video signal voltage VS (m, n) at the mth pixel of the frame n to be displayed next time. Then the computing element 72 sets a writing signal voltage Vex (m, n) at the mth pixel of the frame n according to the linear sum of the video signal voltage VS (m, n−1) at the mth pixel of the display frame n−1 displayed the last time and the video signal voltage VS (m, n) at the mth pixel of the frame n to be displayed next time according to the expression Vex(m, n)=AVS(m, n)+BVS(m, n−1). The timing control circuit 67 controls the timing of each signal. In addition, the memory 71 and the computing element 72 constitute a display controlling unit.

However, in the present invention, since the response speed is increased by the change in the pulse shape of the common electrode potential and so on, a voltage added at the time of providing the overdrive effect can be set at a smaller value when compared with that of the conventional overdrive system. In the conventional overdrive is high, since a voltage applied during the overdrive, the alignment state of the liquid crystal is often brought to a reset state, which causes, for example, a response speed required to return to a white image to become slow. In the present invention, since a voltage applied during the overdrive is low, the alignment state of the liquid crystal is not brought to the reset state.

Next, a fourteenth embodiment of the invention will be described below. A liquid crystal display apparatus according to the fourteenth embodiment corresponds to those described in the first to thirteenth embodiment in which a field response type substance is interposed between the pixel electrodes 214 and the common electrodes 215 of the display unit 200. Moreover, it is preferable that the field response type substance of the display unit be made of a liquid crystal substance.

The pixel electrodes 214 and the common electrodes 215 may be provided on different substrates, respectively, may be provided on the same substrate, and may be provided between substrates.

By using the field response type substance, the response state of the substance can be changed according to the potential changed into a pulse shape. In particular, through the use of a liquid crystal substance, the alignment and the response speed of the liquid crystal substance change according to the potential changed into a pulse shape.

Next, a fifteenth embodiment of the invention will be described below. The liquid crystal display apparatus according to the fifteenth embodiment corresponds to that described in the fourteenth embodiment in which the liquid crystal substance is a nematic liquid crystal and has twisted nematic alignment. It is preferable that between the twist pitch p (μm) of the liquid crystal substance having the twisted nematic alignment and the average thickness d (μm) of the liquid crystal substance layer having the twisted nematic alignment, a relationship p/d<20 be established. It is preferable that a relationship p/d<8 be established between the twist pitch p (μm) of the liquid crystal substance having the twisted nematic alignment and the average thickness d (μm) of the liquid crystal substance layer having the twisted nematic alignment.

In the liquid crystal display apparatus according to the fifteenth embodiment, to implement a wide viewing angle, an optical compensation plate is provided as necessary. It is preferable that the optical compensation plate compensates optical characteristics in a predetermined state of the liquid crystal substance. For example, the optical compensation plate is formed so as to compensate optical characteristics which can be secured from the alignment structure of the liquid crystal substance during the application of voltage.

By employing the twisted nematic liquid crystal, a continuous change in the gradation can be obtained. In particular, through the presence of such a relationship between the twist pitch p and the thickness d, it becomes possible to increase the torque required for the nematic liquid crystal to return to a twisted state. As a result, it becomes possible to increase a response speed at the time of returning to the state in which no voltage is applied or a low voltage is applied. That is, the fall response can be sped up.

Figure 24:
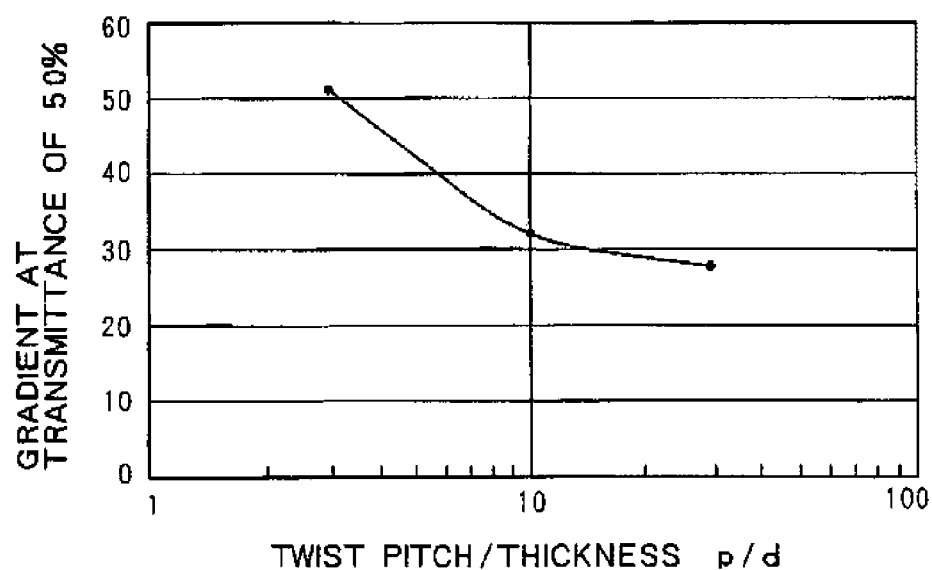
FIG. 24 is a graph showing a relationship between twist pitch/thickness and a gradient at a transmittance of 50% during a fall response according to a fifteenth embodiment of the invention.

Next, the effect of the fifteenth embodiment will be explained by using an example. When a normally white image can be obtained by preparing liquid crystals different in twist pitch, by fabricating liquid crystal panels for the respective liquid crystals, and by arranging a pair of polarizing plates outside the panels, the effect of the embodiment is confirmed. The gap of substrates (the thickness of the liquid crystal layer) was set to 2 μm and the liquid crystals having twist pitches of 6 μm, 20 μm, and 60 μm were used. The thickness of the liquid crystal acts on the response speed with the square of the thickness. For example, when the slimness of the liquid crystal layer is set at 6 μm (triple thickness), the response speed is decreased to a ninth. Because of this, the thickness of the liquid crystal layer is preferably 4 μm or less and more preferably 3 μm or less. Although there is no limitation to the small thickness of the liquid crystal layer, in consideration of the limitation on the twist pitch of the liquid crystal and of difficulty in the production of the gap of the substrates, the thickness of the liquid crystal layer is preferably 0.5 μm or more and more preferably 1 μm or more. In such a state, the time-transmittance characteristics of the liquid crystals at the time of a rise (optical responses during the fall of the liquid crystals, that is, responses from a dark state to a bright state in the normally white arrangement) were observed. By bringing black image states to white image states in which complete transmission is developed, the gradients of changes in transmittance close to 50% was determined from time-transmittance characteristics observed. The reason why a transmittance close to 50% was selected is that the change in the transmittance shows a maximum value around 50%. FIG. 24 is a graph in which a relationship between the determined gradient (%/ms: vertical axis) and the ratio of the twist pitch/the thickness of the liquid crystal layer (p/d: horizontal axis) is plotted. Here, it is a matter of course that the thickness of the liquid crystal layers is equivalent to the distance of the gaps between the substrates. It is found from FIG. 24 that when the ratio of the twist pitch/the thickness of the liquid crystal layer becomes small, the gradient becomes large and hence, the response during the rise of the liquid crystal is sped up. In particular, an abrupt increase in the gradient is found from the ratio of about 15 and when the ratio become about 3, the gradient exceeds 50 (%/ms). That is, ideally, it becomes possible to achieve a response within 2 milliseconds as well. In FIG. 24, when the ratio p/d of 30 is compared with the ratio p/d of 3, a gradient at the ratio p/d of 3 can be roughly doubled, thereby it is found that there is a possibility that the optical response time during the fall of the liquid crystal can be halved. Moreover, even under the conditions of the ratios p/d of 30 and 10, the response speed is increased by 15%. In short this effect is achieved by increasing a torque required to return to a initial alignment state in which no voltage and so on is applied (that is, a roughly evenly twisted alignment state between the substrates).

Next, a sixteenth embodiment of the invention will be described below. A liquid crystal display apparatus according to the sixteenth embodiment corresponds to the fourteenth embodiment in which the liquid crystal substance having the twisted nematic alignment is stabilized by a polymer having a structure twisted roughly continuously. Moreover, it is preferable that the liquid crystal substance be stabilized by a polymer structure effected during the application of no voltage or of a low voltage.

Moreover, it is preferable that the substance be stabilized by a polymer by adding a photocurable monomer into the twisted nematic liquid crystal and by giving light irradiation. It is further preferable that the photocurable monomer be a liquid crystal monomer having a liquid crystal skeleton. And it is further preferable that the liquid crystal monomer be a diacrylate or a monoacrylate made by combining polymeric functional groups and the liquid crystal skeleton without a methylen spacer.

Next, the operation of the liquid crystal display apparatus according to the sixteenth embodiment of the invention will be described below by using an example. A twisted nematic liquid, to which 2% of a photocurable diacrylate liquid crystal monomer having a structural formula shown in Chemical Formula 1 described below was added, was injected and then the liquid crystal was polymerized by providing light irradiation (ultraviolet light: 1 mW/cm$^2$×600 sec) in the state of the application of no voltage to give a TN type display apparatus having a normally white image. In contrast to such a process, when a twisted nematic liquid crystal, to which 2% of a photocurable monoacrylate liquid crystal monomer made by combining polymeric functional groups having a structure shown in Chemical Formula 2 described below and the liquid crystal skeleton without a methylene spacer, was injected and then the liquid crystal was polymerized by providing light irradiation in the state of application of no voltage, the same effect as that of use of the diacrylate liquid crystal monomer was achieved.

(Chemical Formula 1)

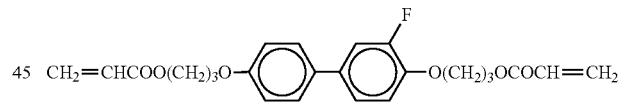

(Chemical Formula 2)

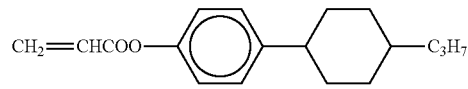

This is because use of the monomer not involving a methylene spacer receives less limitation of responsiveness against voltage of the liquid crystal with respect to the addition of the monomer. As a matter of course, liquid crystal monomers other than those monomers can be used by adjusting the amount of the monomer added. To stabilize the alignment properties of the liquid crystal to the unevenness of the substrate, the amount of the monomer added can be 0.5% or more to the liquid crystal and it is preferable that the amount be 1% or more. When the responsiveness of the liquid crystal is 5% or less, the inhibition of responsiveness does not occur, while the responsiveness of 3% or less is preferable.

As described above, by performing polymer stabilization, the same effect as that described in the fifteenth embodiment can be obtained. This is because a torque, which is required to return to a state in which the polymer stabilization has been established, increases.

Next, a seventeenth embodiment of the invention will be described below. The embodiment is the liquid crystal display apparatus according to the fourteenth embodiment in which the liquid crystal substance is in an electrically controlled birefringence mode.

Furthermore, in the fourteenth embodiment, the liquid crystal substance can have a pie-type alignment (bend-type alignment). In addition, it is preferable that a liquid crystal display apparatus having the pie-type alignment be provided with an optical compensation plate and have an OCB (optically compensated birefringence) mode.

Moreover, in the fourteenth embodiment, the liquid crystal substance can be in a VA (vertical alignment) mode in which homeotropic alignment develops. It is preferable that a wide viewing angle be implemented by providing multidomains. As a method for providing multidomains, a MVA (multidomain vertical alignment) method, a PVA (patterned vertical alignment) method, an ASV (advanced super V) method, and so on can be used. In addition, it is further preferable that a wider viewing angle can be implemented by providing an optical compensation plate on an as needed basis.

And further, in the fourteenth embodiment, an IPS (in-plane switching) mode can be used in which the liquid crystal substance responds through an electric field which develops parallel to the substrate surface. The responsiveness can be preferably further improved by providing a Super-IPS mode using electrodes having a zigzag structure.

Still further, in the fourteenth embodiment, the liquid crystal substance may be in a FFS (fringe field switching) mode or an AFFS (advanced fringe field) mode.

Moreover, in the fourteenth embodiment, as the liquid crystal substance, it is possible to use a ferroelectric liquid crystal substance, an antiferroelectric liquid crystal substance, or a liquid crystal substance exhibiting an electroclinic type response. It is preferable that the liquid crystal substance has the transmittance response to the voltage which is a V-shaped response or a half V-shaped response.

Furthermore, in the fourteenth embodiment, the liquid crystal substance may be a cholesteric liquid crystal substance.

Next, an eighteenth embodiment of the invention will be described below. The embodiment is the liquid crystal display apparatus according to the seventeenth embodiment in which the alignment of the liquid crystal substance is stabilized in such a way that the substance is produced as a polymer having a structure in the state of the application of no voltage or of a low voltage.

It is preferable that the liquid crystal substance be polymerized by adding a photocurable monomer to the twisted nematic liquid crystal and by irradiating the liquid crystal with light.

It is further preferable that the photocurable monomer be a liquid crystal monomer having a liquid crystal skeleton.

It is still further preferable that the liquid crystal monomer is a diacrylate or a monoacrylate made by combining polymeric functional groups and a liquid crystal skeleton without the use of a methylene spacer.

In the seventeenth and eighteenth embodiments of the invention, liquid crystal modes other than the twisted nematic liquid crystal are used.

The pie-type mode and the OCB mode are modes capable of exhibiting both a high-speed response and a wide viewing angle. By applying the invention, a rise response can be further sped up.

A line of the VA mode exhibits both a wide viewing angle and a high-speed response other than an intermediate gradation response. By applying the invention, a high-speed response including the intermediate gradation response can be achieved.

The IPS mode has a wide viewing angle. Although its rise response is slower than that of the VA mode, its intermediate gradation response is faster than that of the VA mode. However, by applying the invention, a high-speed response including a rise response can be implemented. The FFS mode has a wide viewing angle and shows response characteristics which are similar to those of the IPS mode. By applying the invention, high-speed response including rise response can be implemented.

Ferroelectric liquid crystals, antiferroelectric liquid crystals, electroclinic liquid crystals, and so on have an extremely high-speed response and a wide viewing angle. Even when these liquid crystals are used, high-speed responses can be achieved by applying the invention. On the other hand, it is also possible to slow the responses.

On cholesteric liquid crystals as well, the present invention acts effectively.

As for the fall responses of these liquid crystal modes, their responses cannot be sped up by the adjustment of the twist pitch as in the case with the twisted nematic type. Therefore, these polymers are stabilized in the state of the application of no voltage.

In the display apparatus according to the present invention, the display substance and the display mode are not limited to the several kinds described in the above-mentioned embodiments. That is, as long as the substance is an electric field response substance so that the behavior of the response depends on the electric field strength, the period of application, the magnitude relationship with the threshold value, and the like, the invention is effective for any of such substances.

Next, a nineteenth embodiment according to the present invention is a color liquid crystal display apparatus according to the first through eighteenth embodiments described above, in which a color filter is used in the display unit so that color display is achieved.

The invention permits the speedup of the response time of the liquid crystal display apparatus using a color filter. Thus, a liquid crystal display apparatus suitable for moving image displays and the like is obtained.

Figure 25:
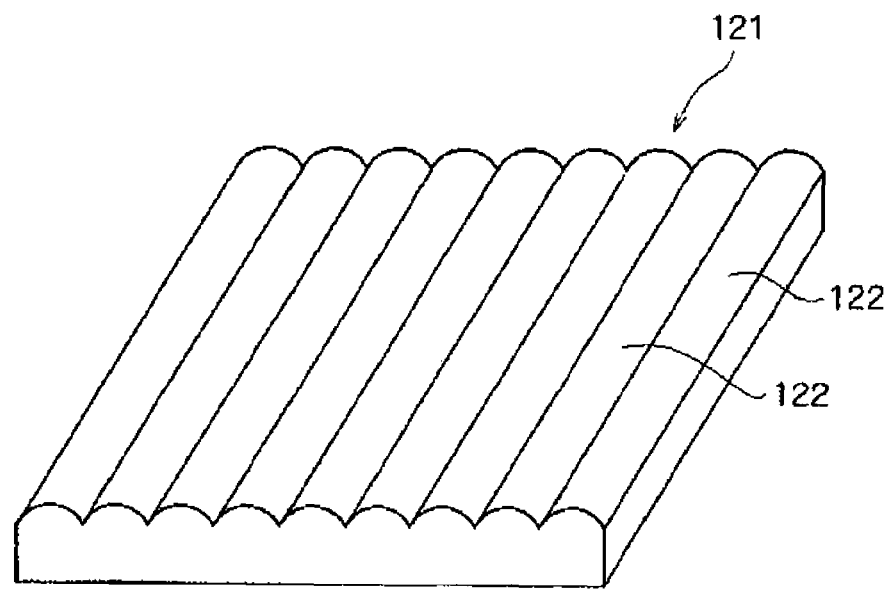
FIG. 25 is a perspective view of a lenticular lens sheet (lenticular film)
Figure 26:
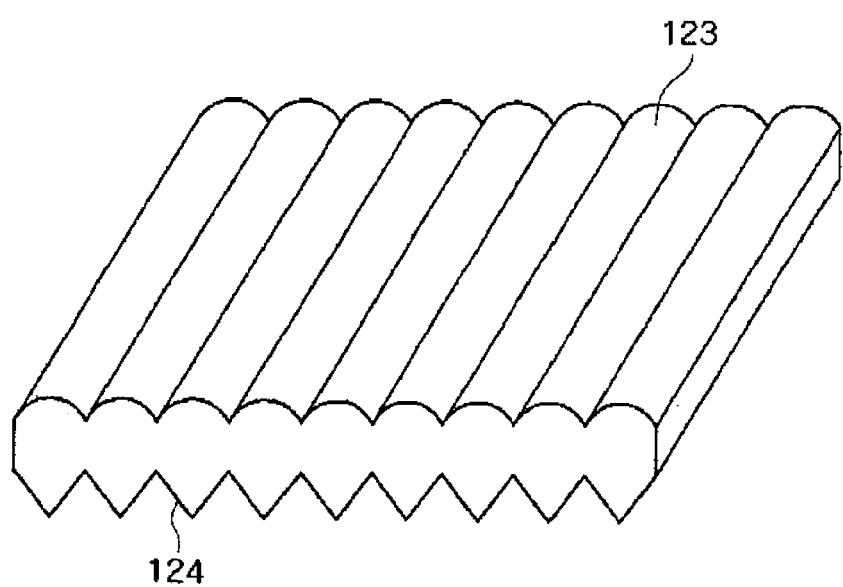
FIG. 26 is a perspective view of a double-sided prism sheet.

Next, a twentieth embodiment according to the present invention is a stereoscopic display liquid crystal display apparatus according to the first through eighteenth embodiments described above, in which a double-sided prism sheet shown in FIG. 26 or a lenticular lens sheet (lenticular film) shown in FIG. 25 is used so that stereoscopic display is achieved. Preferably, a time-sharing type stereoscopic display method is used in which a scanning backlight is formed by projecting light into a backlight alternately in time from two positions and in which in synchronization with this, the video signal is switched into the video signal for the right eye and the video signal for the left eye alternately in time at twice or more the ordinary frequency so that stereoscopic display is achieved.

Next, an operation of the twentieth embodiment of the invention will be explained below with reference to FIG. 25 and FIG. 26. A lenticular lens (lenticular film) 121 shown in FIG. 25 comprises a plurality of cylindrical lenses 122. This allows the image for the right eye and the image for the left eye to be distributed to the respective eyes by utilizing the positional relationship with the pixels. Further, a double-sided prism sheet shown in FIG. 26 is provided with lenticular lenses 123 similar to those of FIG. 25 on one side and with light separating prisms 124 on the other side. By virtue of this, the double-sided prism sheet shown in FIG. 26 can separate the light at a larger angle in comparison with the simple lenticular lens shown in FIG. 25. In the scanning backlight, for example, light sources are arranged on the right and left of the light guide plate for the backlight. One of the light sources is used as the light source for the left eye, while the other is used as the light source for the right eye. When the image for the left eye or the image for the right eye to be displayed on the display unit is selected in synchronization with the light source to be turned ON, stereoscopic display is achieved. For example, the images need to be switched at a frequency of 120 Hz or higher. Thus, the speedup realized by the invention acts remarkably effectively.

In the invention, even when the lenticular lens is used or the scanning backlight is used, no difference arises in the number of pixels when two-dimensional display and three-dimensional display are switched for each other. Further, when the scanning backlight is used, the inside of the pixel is not divided into two. Thus, a high resolution or a high numerical aperture is easily realized.

Next, a twenty-first embodiment according to the present invention will be explained below. This embodiment is a color field sequential (color time-sharing) type liquid crystal display apparatus according to the first through eighteenth embodiments described above, in which the video signal is divided into a plurality of color video signals corresponding to a plurality of colors and in which light sources corresponding to a plurality of colors are used so that a plurality of color video signals are displayed sequentially in time in synchronization with a plurality of color video signals at a predetermined phase difference.

Figure 27:
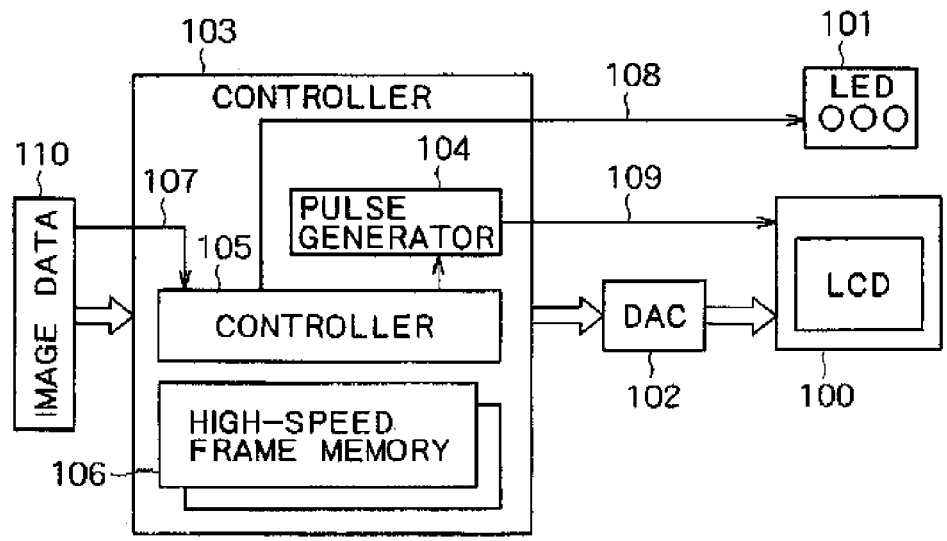
FIG. 27 is a schematic diagram of an entire field sequential display system according to a twenty-first embodiment of the invention.

The twenty-first embodiment according to the present invention realizes a color field sequential driving type display apparatus. FIG. 27 is a block diagram showing an example of an outline of a field sequential display system. Ordinary image data is processed by a controller IC 103 comprising a controller 105, a pulse generator 104, and a high-speed frame memory 106, and thereby converted into image data of each color of red, blue, and green. The image data is inputted to a liquid crystal display panel (LCD) 100 via a DAC 102. A scanning circuit in the LCD 100 is controlled with driving pulses from the pulse generator of the controller IC. Further, an LED 101 of three colors is used as the light source. This LED is controlled with LED control signals 108 from the controller IC.

In this configuration, the image of each color needs to be switched at a frequency of 180 Hz or higher. Thus, the speedup realized by the invention acts effectively. Further, in the case of displaying at 180 Hz, the phenomenon of "color breakup" occurs in which the images of distinct colors separate from each other and are visible to the eyes when the line of sight is moved rapidly in the case of eye blinking and the like. In order to avoid this, various approaches are taken. For example, white is added to the three colors of red, blue, and green. Alternatively, one particular color is repeated twice like red, green, blue, and green. Yet alternatively, driving is performed at a yet doubled frequency (for example, 360 Hz or higher). As such, in many cases, a higher frequency is necessary in order to resolve the color breakup. Thus, the speedup realized by the invention acts effectively to a remarkable extent.

In the invention, the inside of the pixel is not divided into three like in a color filter method. Thus, a high resolution or a high numerical aperture is easily realized.

Next, a twenty-second embodiment according to the present invention will be explained below. This embodiment is a liquid crystal display apparatus of a color field sequential (color time-sharing) type time-sharing stereoscopic display method according to the twenty-first embodiment, in which: the video signal is composed of a video signal for the right eye and a video signal for the left eye; the video signal for one eye is divided into a plurality of color video signals corresponding to a plurality of colors; the video signal for one eye is displayed sequentially in time in such a manner that light sources corresponding to a plurality of colors arranged at two positions are synchronized with the video signal for one eye at a predetermined phase difference and in a manner synchronized with a plurality of color video signals; and the video signal for one eye is displayed sequentially in time as a plurality of divided color video signals.

In the twenty-second embodiment according to the present invention, performed simultaneously are the color field sequential display according to the twenty-first embodiment and the field sequential stereoscopic display according to the twentieth embodiment. For this purpose, the image is switched preferably at a frequency of at least 360 Hz or higher. The speedup realized by the present invention acts effectively to obtain a satisfactory response at this frequency.

In the invention, even when two-dimensional display and three-dimensional display are switched for each other, no difference arises in the number of pixels. Further, the inside of the pixel is not divided into six for the three dimensions and the color filters. Thus, a high resolution or a high numerical aperture is realized remarkably easily. That is, in comparison with the case that the pixel is divided spatially, 6 times the area efficiency is obtained. This realizes a stereoscopic display apparatus that provides remarkably high presence. Further, the number of wirings is reduced to ⅙. This permits the increasing of the wiring thickness, and hence reduces the delay in the wiring.

Further, in the twenty-second embodiment, performed are the color field sequential display according to the twenty-first embodiment and the stereoscopic display employing the cylindrical lens of FIG. 25 or FIG. 26 according to the twentieth embodiment. This can be implemented at a frequency of 180 Hz. In these embodiments, the stereoscopic display method and the color field sequential display method are used simultaneously. Thus, the number of pixels can be reduced in comparison with the color filter method. This is a feature of the color field sequential display. Accordingly, the amount of arrangement of the signal wiring is reduced similarly. The reduction in the amount of arrangement of the signal wiring permits the reduction of the frame portion of the display panel.

Next, a twenty-third embodiment according to the present invention will be explained below. This embodiment is a display apparatus according to the first through twenty-second embodiments described above, in which the pixel switch is composed of a thin-film transistor made of amorphous silicon.

Further, this embodiment is a display apparatus according to the first through twenty-second embodiments described above, in which the pixel switch is composed of a thin-film transistor made of polycrystalline silicon. Further, the thin-film transistor made of polycrystalline silicon may be fabricated sequentially on a substrate, or alternatively may be fabricated temporarily on a substrate and then transferred onto another substrate.

Furthermore, this embodiment is a display apparatus according to the first through twenty-second embodiments described above, in which the pixel switch is composed of a transistor made of single-crystalline silicon. The transistor made of single-crystalline silicon may be fabricated by a bulk silicon technique, an SOI (silicon-on-insulator) technique, an amorphous silicon technique where the channel region is single-crystallized by means of a crystallization technique, and the like. Further, the transistor made of single-crystalline silicon may be fabricated sequentially on a substrate, or alternatively may be fabricated temporarily on a substrate and then transferred onto another substrate.

Furthermore, this embodiment is a display apparatus according to the first through twenty-second embodiments described above, in which the pixel switch is composed of an MIM (metal-insulator-metal) element.

Next, a twenty-fourth embodiment according to the present invention will be explained below. This embodiment is a display apparatus according to the first through twenty-third embodiments, in which the polarity of the video signal is reversed at a predetermined timing and in which one or two potentials having a longer period of application than other potentials among the common electrode potentials varying over a plurality of potentials are approximately equal to the intermediate potential of the maximum potential and the minimum potential among all the potentials applied as the video signal.

Figure 28:
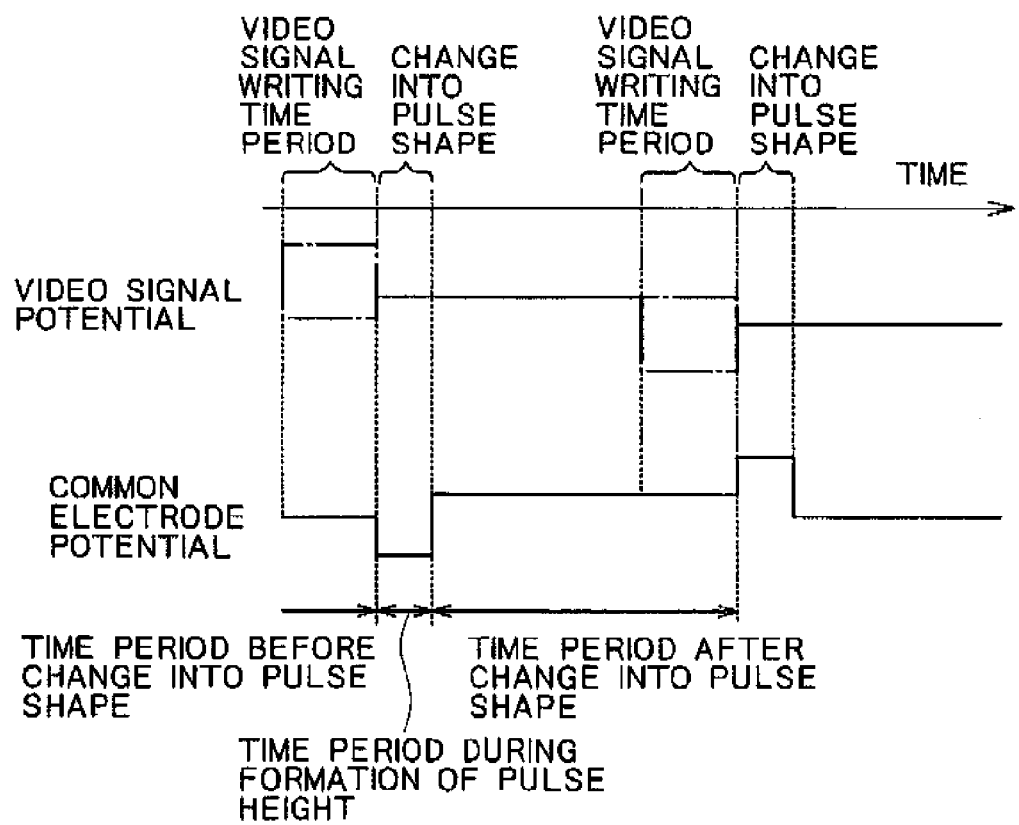
FIG. 28 is a graph showing exemplary waveforms according to a twenty-fourth embodiment of the invention.

In the liquid crystal display apparatus according to the twenty-fourth embodiment of the invention, for example, waveforms shown in FIG. 28 are applied. When the voltage change as shown in FIG. 28 is applied, the response speed can be increased in the period of pulse shape change. Further, the video signal is reversed relative to the common electrode potential, so that the minimum values in the two polarities are approximately equal to each other.

Next, a twenty-fifth embodiment according to the present invention will be explained below. This embodiment is a display apparatus according to the first through twenty-third embodiments, in which the polarity of the video signal is reversed at a predetermined timing and in which one or two potentials having a longer period of application than other potentials among the common electrode potentials varying over a plurality of potentials are approximately equal to one of the maximum potential and the minimum potential among all the potentials applicable as the video signal.

Figure 29:
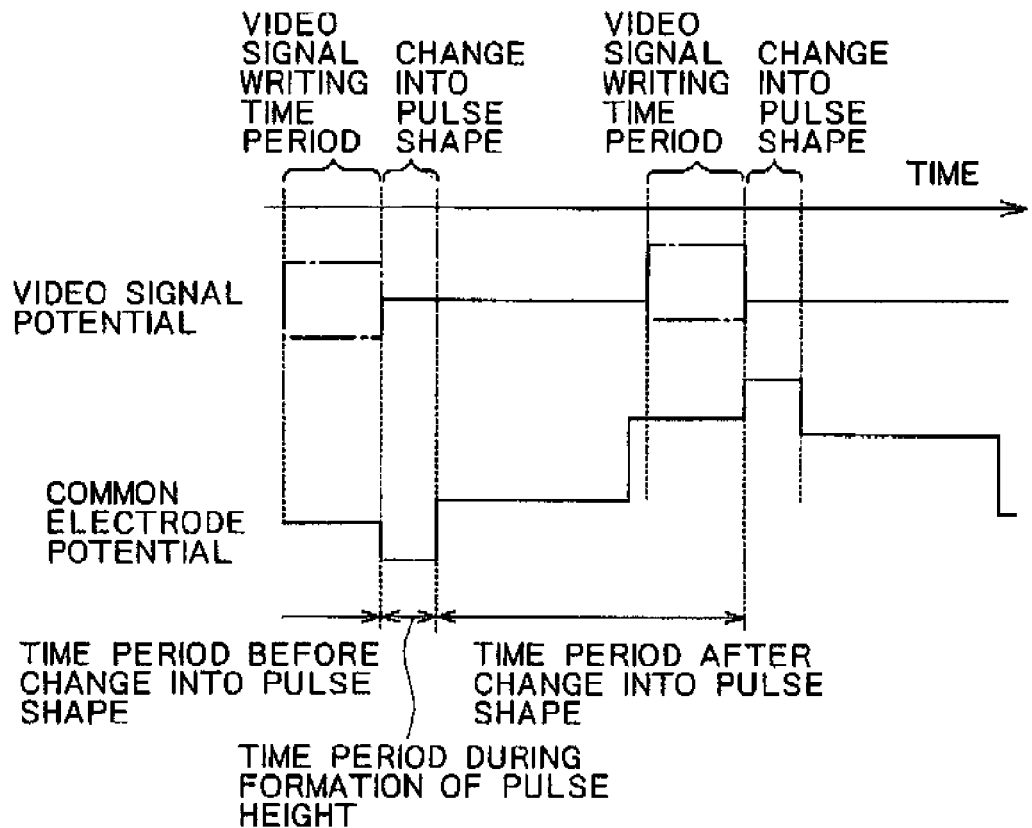
FIG. 29 is a graph showing exemplary waveforms according to a twenty-fifth embodiment of the invention.

In the liquid crystal display apparatus of this embodiment, for example, waveforms as shown in FIG. 29 are applied. When the voltage change as shown in FIG. 29 is applied, the response speed can be increased in the period of pulse shape change. Further, the video signal is reversed relative to the common electrode potential, so that the maximum value of one of the polarities is approximately equal to the minimum value of the other polarity.

Next, a twenty-sixth embodiment according to the present invention will be explained below. This embodiment is a liquid crystal display apparatus according to the first through twenty-third embodiments, in which the common electrode potential immediately before the scanning signal driving circuit 202 begins to scan the first scanning electrode of the scanning electrodes 212 is equal to the common electrode potential immediately after the scanning signal driving circuit 202 has scanned the entire scanning electrodes 212 and then transmitted a video signal to the pixel electrodes 214 before the pulse shape change is performed.

An example of the waveforms according to the twenty-sixth embodiment is similar to FIG. 28.

Next, a twenty-seventh embodiment according to the present invention will be explained below. This embodiment is an apparatus according to the first through twenty-third embodiments, in which the common electrode potential immediately before the scanning signal driving circuit 202 begins to scan the first scanning electrode of the scanning electrodes 212 is different from the common electrode potential immediately after the scanning signal driving circuit 202 has scanned the entire scanning electrodes 212 and then transmitted a video signal to the pixel electrodes 214 before the pulse shape change is performed.

In this configuration, preferably, the common electrode potential before the scanning signal driving circuit 202 begins to scan the first scanning electrode of the scanning electrodes 212 is approximately equal to one of the maximum voltage and the minimum voltage allowed in the video signal to be applied from now on. Further, the common electrode potential immediately after the scanning signal driving circuit 202 has scanned the entire scanning electrodes 212 and then transmitted a video signal to the pixel electrodes 214 before the pulse shape change is performed is approximately equal to the other of the maximum voltage and the minimum voltage allowed in the video signal having been applied.

An example of the waveforms according to the twenty-seventh embodiment is similar to FIG. 29.

Next, a twenty-eighth embodiment according to the present invention will be explained below. This embodiment is a liquid crystal display apparatus according to the twenty-fourth and twenty-sixth embodiments, in which: four common electrode potentials are employed; a first potential is a common electrode potential of a period when the scanning signal driving circuit 202 scans the scanning electrodes 212 in order to transmit the video signal of one of the polarities of the video signals to be inverted; a second potential is a potential of the pulse height portion when the potential of the common electrodes 215 is changed into a pulse shape after the first potential; a third potential is a potential after the completion of the pulse where the potential of the common electrodes 215 is changed into a pulse shape after the second potential and, at the same time, is a common electrode potential of a period when the scanning signal driving circuit 202 scans the scanning electrodes 212 in order to transmit the video signal of the other polarity of the video signals to be inverted; and a fourth potential is a potential of the pulse height portion when the potential of the common electrodes 215 is changed into a pulse shape after the third potential.

An example of the waveforms according to the twenty-eighth embodiment is similar to FIG. 28.

Next, a twenty-ninth embodiment according to the present invention will be explained below. This embodiment is a driving method for a display apparatus according to the twenty-fifth and twenty-seventh embodiments, in which: six common electrode potentials are employed; a first potential is a common electrode potential of a period when the scanning signal driving circuit 202 scans the scanning electrodes 212 in order to transmit the video signal of one of the polarities of the video signals to be inverted; a second potential is a potential of the pulse height portion when the potential of the common electrodes 215 is changed into a pulse shape after the first potential; a third potential is a potential after the completion of the pulse where the potential of the common electrodes 215 is changed into a pulse shape after the second potential; a fourth potential is a common electrode potential of a period when the scanning signal driving circuit 202 scans the scanning electrodes 212 in order to transmit the video signal of the other polarity of the video signals to be inverted; a fifth potential is a potential of the pulse height portion when the potential of the common electrodes 215 is changed into a pulse shape after the fourth potential; and a sixth potential is a potential after the completion of the pulse where the potential of the common electrodes 215 is changed into a pulse shape after the fifth potential.

An example of the waveforms according to the twenty-ninth embodiment is similar to FIG. 29.

Figure 30:
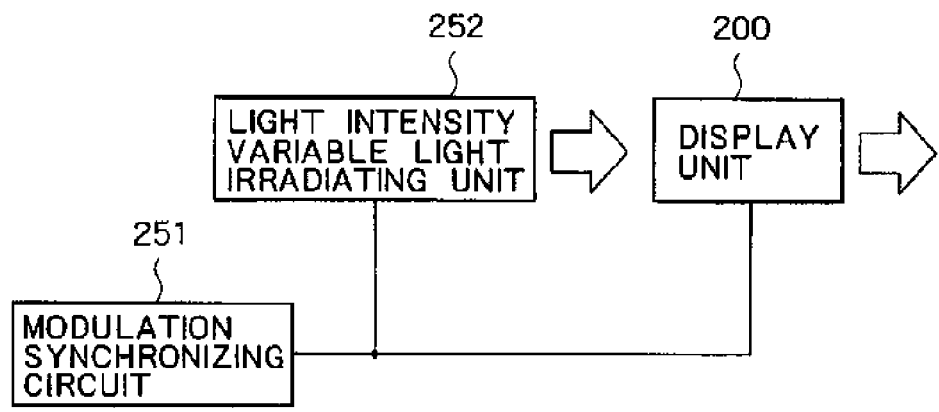
FIG. 30 is a block diagram of an example of a liquid crystal display apparatus according to a thirtieth embodiment of the invention.

Next, a thirtieth embodiment according to the present invention will be explained below. This embodiment is a liquid crystal display apparatus according to the first through twenty-ninth embodiments described above, comprising: an irradiating unit 252 for irradiating the display unit 200 with light as shown in FIG. 30; and a synchronizing circuit 251 for modulating the light intensity of the light irradiating unit 252 in synchronization with the video signal at a predetermined phase.

Figure 31:
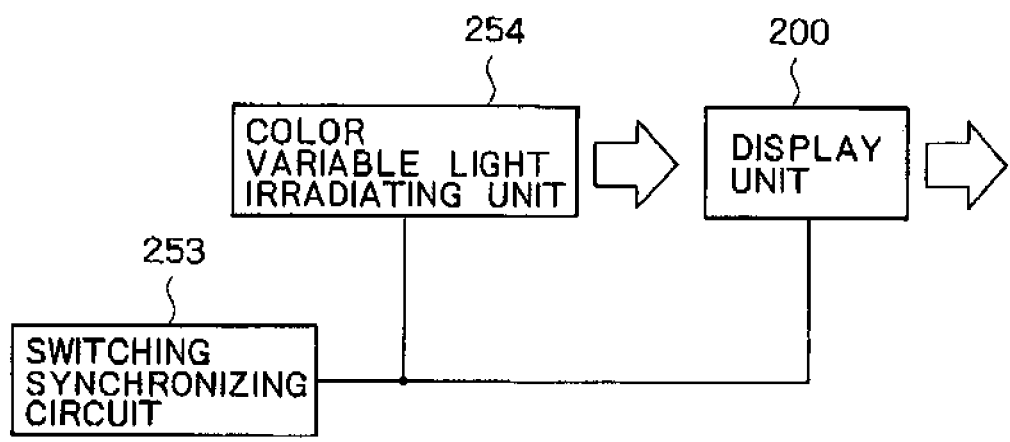
FIG. 31 is a block diagram of another example of the liquid crystal display apparatus according to the thirtieth embodiment of the invention.

Further, this embodiment may be an apparatus according to the first through twenty-ninth embodiments described above, comprising: a light irradiating unit 254 for irradiating the display unit 200 with light as shown in FIG. 31; and a synchronizing circuit 253 for changing the color of the light of the light irradiating unit 254 in synchronization with the video signal at a predetermined phase.

Figure 32:
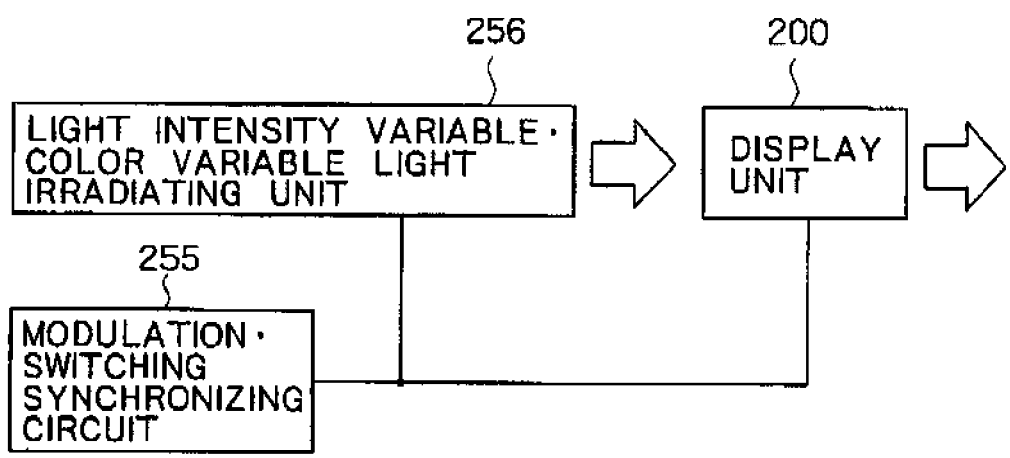
FIG. 32 is a block diagram of another example of the liquid crystal display apparatus according to the thirtieth embodiment of the invention.

Further, this embodiment may be an apparatus according to the first through twenty-ninth embodiments described above, comprising: a light irradiating unit 256 for irradiating the display unit 200 with light as shown in FIG. 32; and a synchronizing circuit 255 for modulating the light intensity of the light irradiating unit in synchronization with the video signal at a predetermined phase and, at the same time, changing the color of the light of the light irradiating unit 256 in synchronization with the video signal at a predetermined phase.

The light irradiating unit according to this embodiment may employ a surface emitting light source, or alternatively a backlight composed of a light guide plate, a light source, and others optical elements. Alternatively, scanning may be performed by a beam-shaped or line-shaped light source of a laser or the like.

The modulation of the light intensity may be performed by intensity modulation or flashing of the light source itself, or by using a modulation filter capable of modulating the transmittance or reflectance.

Next, a thirty-first embodiment according to the present invention will be explained below. This embodiment is a driving method for a display unit according to the thirtieth embodiment, in which when division into each field or a plurality of colors is performed, the timing that the light intensity of the light irradiating unit is modulated or that the color of light is changed is located at the time of completion of each subfield corresponding to the color, that is, immediately before the writing of the video signals of the next field.

The operation of the thirty-first embodiment will be explained below. Since modulation of the light intensity or changing of the color of light is performed in a fixed period at the time of completion of each subfield, light is projected in a state that the response of the display substance of the display unit is relatively stable. This improves efficiency in the light utilization, stabilizes display, and permits high definition display. Since the light intensity is modulated, the brightness over the entire screen or in each of the regions divided into a plurality of the regions can be adjusted, for example, in accordance with the contents of video data. Specifically, when the majority of the contents of video data is at dark gradation levels, the light intensity is reduced, while when the majority of the contents of video data is at light gradation levels, the light intensity is increased, so that the feeling of dynamics in image representation can be improved. Further, in a case that abnormalities such as flicker arise in the brightness, when the light intensity is modulated in response to the brightness abnormalities, the abnormalities such as flicker in the brightness can be suppressed.

Next, a thirty-second embodiment according to the present invention will be explained below. This is an embodiment according to the first through thirty-first embodiments described above, in which the potential of the video signals is determined by comparing: hold data of each pixel before the writing of the video signals; fluctuation in the pixel electrode potential associated with the change in the potential of the common electrodes 215 changed into a pulse shape or the potential of the storage capacitance electrodes 216 changed into a pulse shape or the both potentials; and display data to be newly displayed.

Next, a thirty-third embodiment according to the present invention will be explained below. This embodiment is a display apparatus according to the thirty-second embodiment, in which the comparison between the data and the fluctuation in the potential is performed by successive comparison.

Further, in order to perform the successive comparison, this embodiment employs: storing means for storing the original video signal data in the preceding field or the video signal data including the correction finally applied in the preceding field; and comparison operation means for comparing the stored data with the video signal data to be newly displayed and thereby determining new signal data.

Next, a thirty-fourth embodiment according to the present invention will be explained below. This is an embodiment according to thirty-second embodiment, in which the comparison between the data and the fluctuation in the potential is performed using an LUT (look-up table or correspondence table) prepared in advance.

Further, in order to select necessary data from the correspondence table, this embodiment employs: storing means for storing the original video signal data in the preceding field or the video signal data including the correction finally applied in the preceding field; and searching means or addressing means for searching the stored data and the video signal data to be newly displayed on the correspondence table and thereby determining new signal data.

Next, the operation of the thirty-second through thirty-fourth embodiments of the invention is explained below. In a simple overdriving method, as described in Patent Publication No. 3039506, when the image data of the preceding field is compared with the image data of the new field and when the response of the display substance is taken into consideration, video signal data to be applied can basically be determined. On the other hand, in the invention, the common electrode potential or the storage capacitance electrode potential or the both are changed into a pulse shape. Thus, the effects of the change into a pulse shape need be taken into consideration. These effects are mainly a potential fluctuation caused by capacitance coupling and a temporary change in the response time and the like caused by the potential fluctuation. When the video signal in which these effects are taken into consideration is provided, the highest image quality is obtained in the display according to the present invention. This video signal can be generated by serial calculation, or alternatively by using a look-up table prepared in advance.

Next, a thirty-fifth embodiment according to the present invention will be explained below. This is an embodiment according to embodiments employing twisted nematic liquid crystal among the first through thirty-fourth embodiments, in which the pulse shape change which is not reset is such that the mean tilt angle of the liquid crystal during the pulse shape change is 81 degrees or smaller. Preferably, the mean tilt angle of the liquid crystal is 65 degrees or smaller.

The operation of the thirty-fifth embodiment according to the present invention will be explained below. According to the comparison between experiments, measurements, and computer simulations performed by the present inventors, the delay in the transition from a reset state in the twisted nematic liquid crystal depends on the mean tilt angle of the liquid crystal. Further, the inventors have found that when the mean tilt angle becomes 81 degrees or greater, a delay arises such that the orientation occurs in the direction opposite to the desired one. Further, when the mean tilt angle becomes 65 degrees or greater, the change direction of the orientation temporarily becomes undetermined, so that a delayed state arises. At the time of implementing the potential fluctuation which is not reset, when the tilt angle is maintained below these mean tilt angles, good response characteristics without delay are achieved.

Next, a thirty-sixth embodiment according to the present invention will be explained below. This embodiment is a display apparatus according to the first through thirty-fifth embodiments described above, which performs display by integrated light digital driving in which the video signal is used in the form of a digital signal while the potential applied to the display substance is a binary signal so that gradation is represented in the time axis direction.

Figure 33:
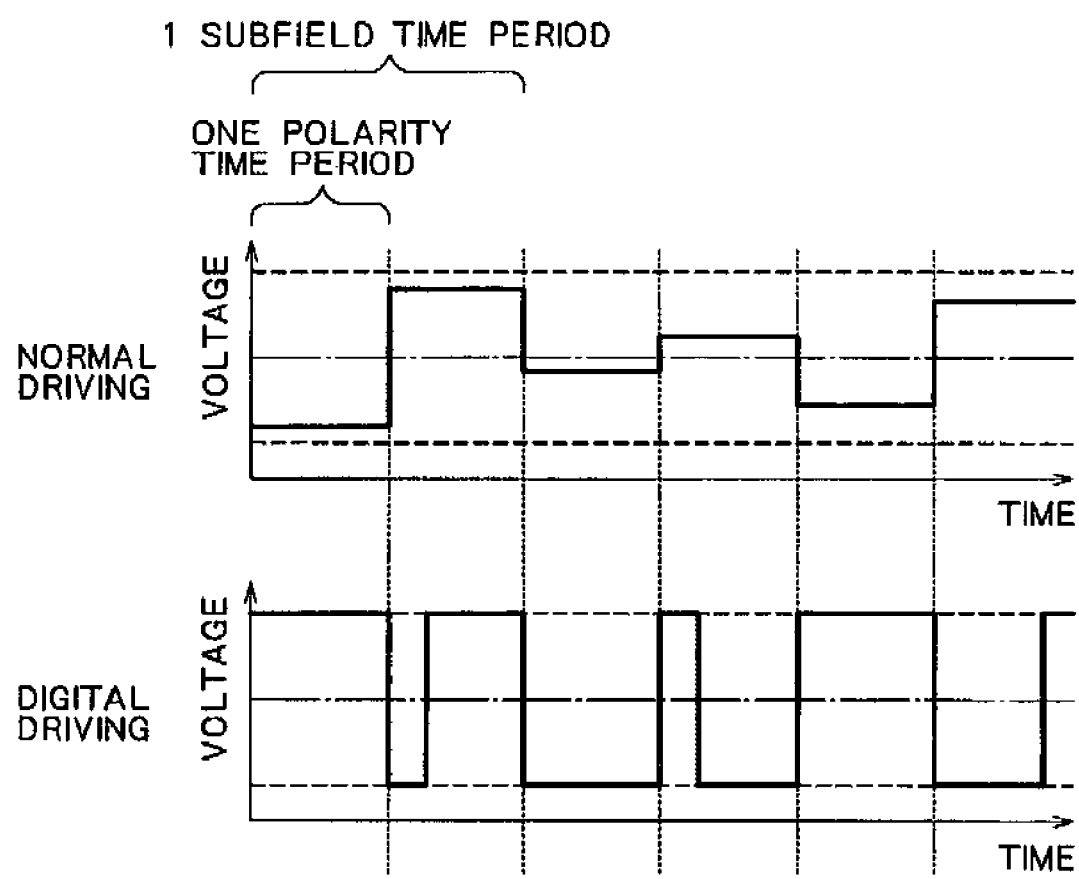
FIG. 33 is a graph showing an exemplary waveform produced by digital driving of a liquid crystal display apparatus according to a thirty-sixth embodiment of the invention.

The operation of the thirty-sixth embodiment will be explained below. Digital driving is performed in this embodiment. Such digital driving is described, for example, in Patent Publication No. 3402602. The digital driving is described below with reference to FIG. 33 and FIG. 34. FIG. 33 is a schematic diagram showing the waveforms in the prior art driving method in which the potential of the common electrode is fixed while the polarity of the video signal having an amplitude within a predetermined range relative to the common electrode potential is reversed within one subfield period so that driving is performed and in the digital driving method in which digital driving is performed using the same amplitude as the maximum voltage amplitude of the video signal of the prior art driving method. The common electrode potential to be fixed is shown by a dash-dotted line, while the maximum potential and the minimum potential of the video signal are shown by broken lines. In the prior art driving shown in the upper part of FIG. 33, gradation is represented by the magnitude of the voltage value. That is, gradation is implemented by modulation in the electric field strength. On the other hand, in the digital driving shown in the lower part of FIG. 33, the voltage value is binary, while the subfield period is divided into a plurality of periods, so that gradation is represented in a digital manner by the number of times of turning ON and OFF the voltage or the like. That is, gradation is implemented by the number of pulses. In the digital driving shown in the lower part, the amplitude of the video signal voltage can be twice the amplitude of the prior art. This permits remarkably rapid ON-time response. Nevertheless, a delay similar to the delay in the transition from a reset state can be generated in some cases. Further, the video signal cannot be reversed, and hence electric neutrality cannot be maintained in the display substance.

Figure 34:
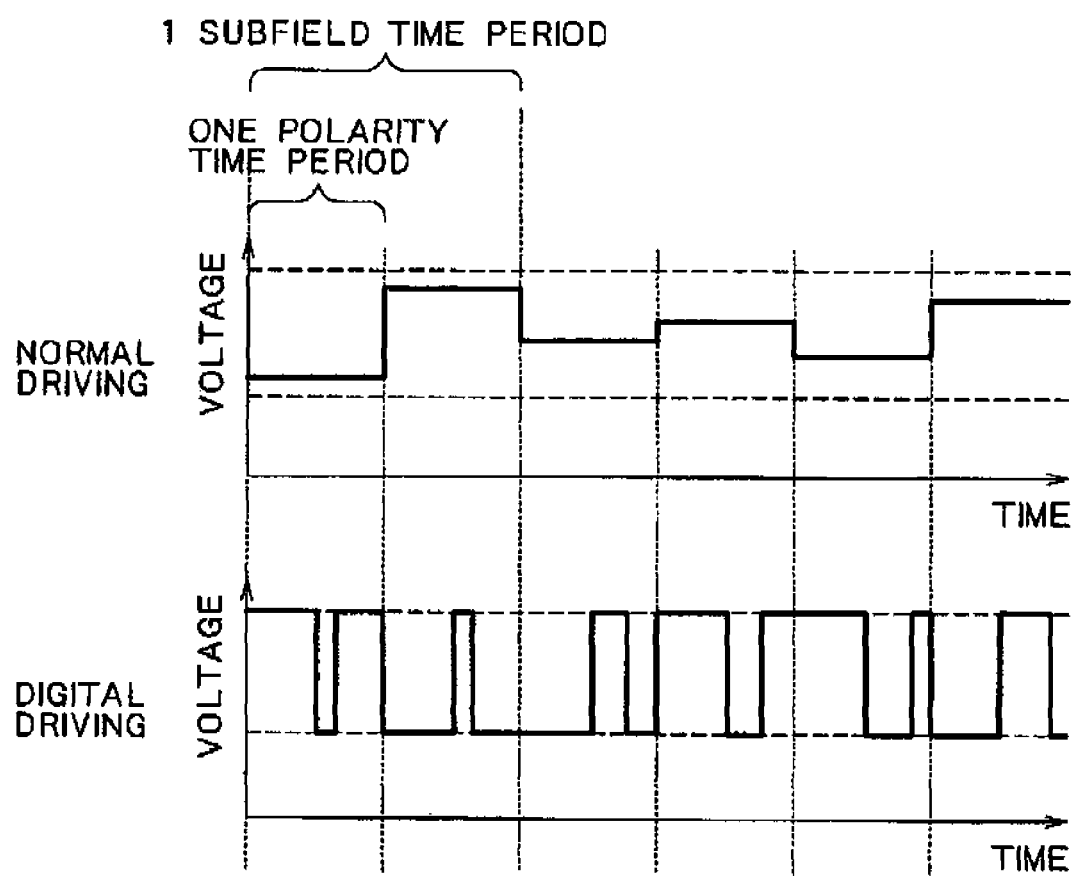
FIG. 34 is a graph showing another exemplary waveform produced by the digital driving of the liquid crystal display apparatus according to the thirty-sixth embodiment of the invention.

FIG. 34 is a schematic diagram showing the waveforms in the prior art driving method in which the potential of the common electrode is reversed within one subfield period while the polarity of the video signal having an amplitude within a predetermined range relative to the common electrode potential is reversed within one subfield period so that driving is performed and in the digital driving method in which digital driving is performed using the same amplitude as the maximum voltage amplitude of the video signal of the prior art driving method. The common electrode potential to be reversed is shown by a dash-dotted line, while the maximum potential and the minimum potential of the video signal are shown by broken lines. In the prior art driving shown in the upper part of FIG. 34, gradation is represented by the magnitude of the voltage value. That is, gradation is implemented by modulation in the electric field strength. Further, the amplitude of the entire video signal becomes approximately half that of FIG. 33. On the other hand, in the digital driving shown in the lower part of FIG. 34, the voltage value is binary, while the subfield period is divided into a plurality of periods, so that gradation is represented in a digital manner by the number of times of turning ON and OFF the voltage or the like. That is, gradation is implemented by the number of pulses. In contrast to the digital driving shown in the lower part of FIG. 33, in the digital driving shown in the lower part of FIG. 34, the amplitude of the video signal voltage becomes the same as that in the prior art, and hence the ON-time response is also in the same order. On the other hand, a delay similar to the delay in the transition from a reset state is seldom generated. Further, the video signal can be reversed, and hence electric neutrality can be maintained in the display substance.

Also in such digital driving, the speedup realized by the technique of the invention acts effectively. In particular, in a configuration where sufficient ON-time response is not obtained as shown in FIG. 34, the invention is remarkably effective. The display unit and other various kinds of circuits of the invention may be formed on distinct substrates or alternatively on the same substrate. Further, a part of the circuits may be formed on the same substrate, while the other circuits may be formed on distinct substrates.

Figure 35:
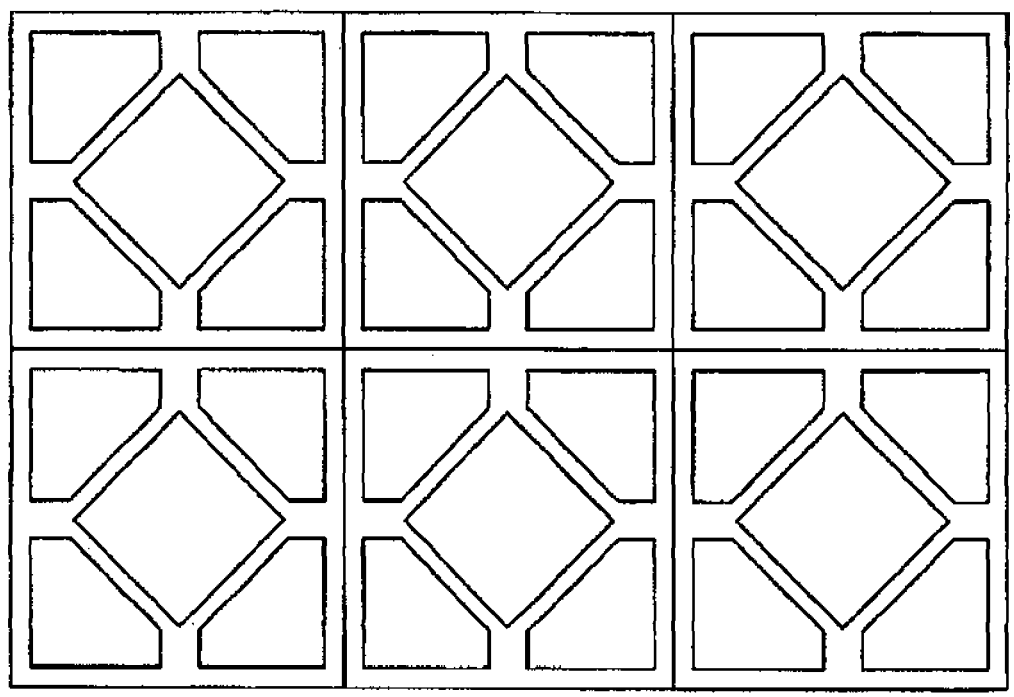
FIG. 35 is a view showing an exemplary PenTile arrangement.

The pixel electrodes arranged in a matrix shape may be arranged in a stripe shape, a delta shape, or a Bayer arrangement (a checker shape), or alternatively in a PenTile arrangement where effective resolution is increased in comparison with ordinary arrangements. The PenTile arrangement has been proposed by Clairvoyante laboratories. An example of this arrangement is shown in FIG. 35.

Next, a thirty-seventh embodiment according to the present invention will be explained below. This is an embodiment according to each embodiment employing the field sequential display of the invention, in which the comparison between the data and the potential fluctuation is performed using an LUT (look-up table or correspondence table) prepared in advance, depending on the polarity of the video signal relative to the common electrode and the kind of color signal to be displayed.

In the thirty-eighth embodiment of the invention, an LUT (the look-up table, correspondence table) is used that defines the correspondence of a video signal with a gradation brightness obtained from the video signal. Further, the LUT used differs depending on the polarity of the video signal and the kind of the color signal to be displayed.

Next, the operation of the thirty-seventh and thirty-eighth embodiments of the invention is explained below. When an LUT is prepared in correspondence to each color signal and the polarity of each video signal, voltage application is performed in a manner optimal for each color subfield, and hence display is performed in a manner optimal for each color subfield. In the field sequential display, the optimal voltage-transmittance characteristics depend on the color. Thus, when an LUT is prepared in correspondence to each color signal, the characteristics can be optimized for each color. Further, the fluctuation in the pixel potential slightly varies depending on the polarity of the video signal. Thus, when an LUT is prepared in correspondence to the polarity of each video signal, the characteristics can be optimized for each polarity.

Figure 8:
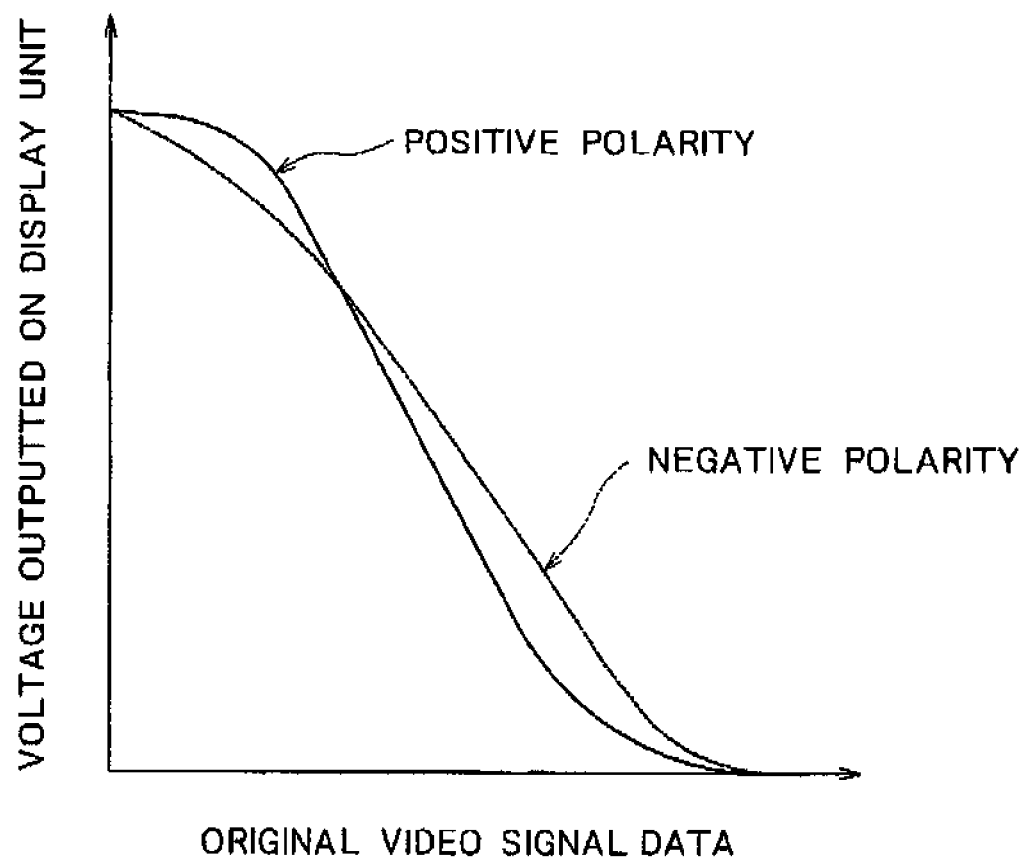
FIG. 8 is a graph showing an exemplary LUT with respect to the polarity of individual color signals and video signals used in simple systems.

For simplicity, an LUT is prepared for converting the input video signal data and the signal voltage outputted to the display unit depending on each color signal and the polarity of each video signal as well as the order of the change. In this method, the fluctuation in the potential cannot be suppressed completely. However, the LUT can be generated by measuring, for each gradation, the relationship of the input video signal data with the signal voltage outputted to the display unit when a still image is displayed on each display condition (such as a red image with positive polarity). Further, the size of the LUT is remarkably reduced. The LUT used may be the same as the LUT used for adjusting the so-called voltage-transmittance curve and the gradation curve (y curve). FIG. 8 shows an example of a simple LUT for a red image. As shown in FIG. 8, the output voltage for the same video signal data is varied depending on whether positive polarity or negative polarity.

Next, a thirty-ninth embodiment according to the present invention will be explained below. This embodiment is a near-eye apparatus employing the liquid crystal display apparatus according to the first through thirty-eighth embodiments. Such near-eye apparatuses include: a viewfinder of a camera, a video camera, or the like; a head mount display or a head-up display; and other apparatuses used in the vicinity of the eyes (for example, within 5 cm).

Since the thirty-ninth embodiment is applied to near-eye use, high image quality is required such as good color reproduction, image clearness, and moving image sharpness. Accordingly, the invention provides a large effect.

Next, a fortieth embodiment according to the present invention will be explained below. This embodiment is a projection apparatus employing the liquid crystal display apparatus according to the first through thirty-eighth embodiments and thereby projecting an original image of the display apparatus through a projection optical system. Such projection apparatuses include: a projector such as a frontward projector and a rearward projector; and a magnifying observation apparatus.

Such a projection apparatus is used in projection application, and hence its image is expanded frequently at large magnification factors. Thus, high image quality is strictly required. Accordingly, the invention provides a large effect.

Next, a forty-first embodiment according to the present invention will be explained below. This embodiment is a portable terminal employing the liquid crystal display apparatus according to the first through thirty-eighth embodiments. Such portable terminals include a portable telephone, an electronic notebook, a PDA (Personal Digital Assistance), and a wearable personal computer.

This portable terminal is used in an always carried application, and employs a battery or a dry cell in many cases. Thus, low power consumption is required. Accordingly, the invention provides a large effect also in such an application. Further, the portable terminal is used indoors and outdoors in many cases. Thus, in order that sufficient luminosity should be obtained, the invention is satisfactorily applied that realizes a high efficiency in light utilization. Further, depending on the carrying environment, the portable terminal is used in a wide temperature range. Thus, a large effect is obtained when the liquid crystal display apparatus of the invention is employed that has a wide temperature range.

Next, a forty-second embodiment according to the present invention will be explained below. This embodiment is a monitoring apparatus employing the liquid crystal display apparatus according to the first through thirty-eighth embodiments. Such monitoring apparatuses include monitoring apparatuses for a personal computer, an AV (audio-visual) apparatus (such as a television receiver), medical applications, design use, and viewing paintings.

This monitoring apparatus is used on a desk or the like for the purpose of detailed observation in many cases. Thus, high image quality is desired, and hence the invention provides a large effect.

Next, a forty-third embodiment according to the present invention will be explained below. This embodiment is a mobile display apparatus employing the liquid crystal display apparatus according to the first through thirty-eighth embodiments. Relevant transportation means include a car, an airplane, a ship, and a train.

The mobile display apparatus is not carried by a person as in the forty-first embodiment, and is attached to a transportation means. The transportation means suffers various environmental changes. Thus, the liquid crystal display apparatus of the invention is desirably employed that hardly depends on environmental changes such as light intensity and temperature as described above. Further, since a restriction is placed on the power supply, the liquid crystal display apparatus of the invention is useful in that it has a low power consumption.

EXAMPLES

Next, effects will be explained below for examples of application of the liquid crystal display apparatus according to the embodiments of the invention.

Figure 46:
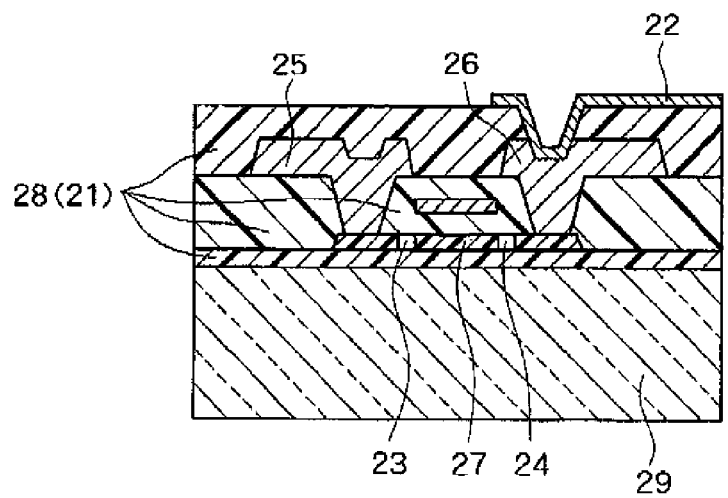
FIG. 46 is a sectional view showing a sectional structure of a planar-type polycrystalline silicon TFT switch used in a first example of the invention.
Figure 47A:
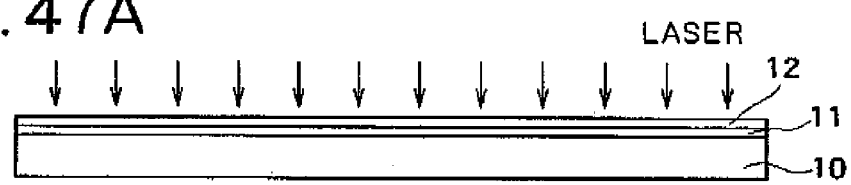
FIG. 47 (A) is a sectional view of a display panel substrate of the invention illustrated in the order of its main production steps.
Figure 47B:
Figure 47C:
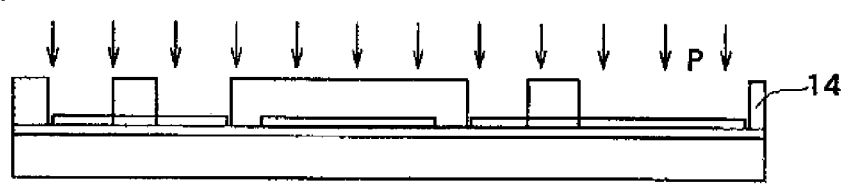
Figure 47D:
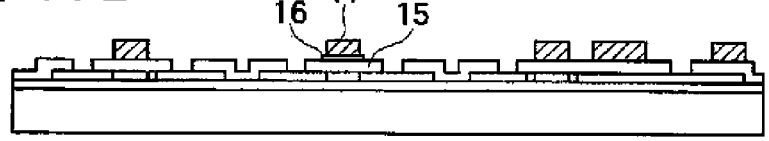
Figure 48A:
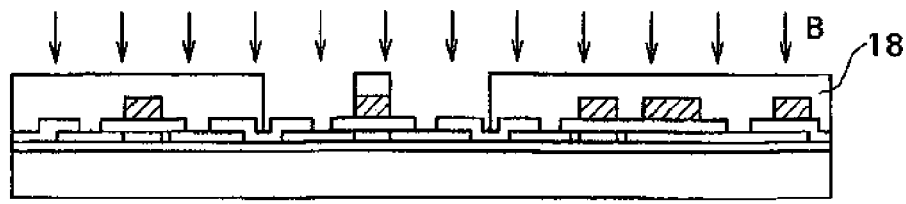
FIG. 48 (A) is a sectional view of the display panel substrate of the invention illustrated in the order of its main production steps.
Figure 48B:
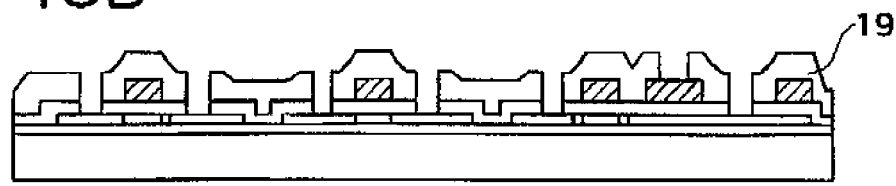
Figure 48C:
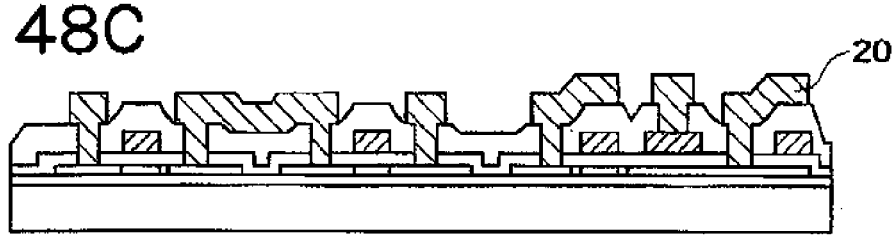
Figure 48D:
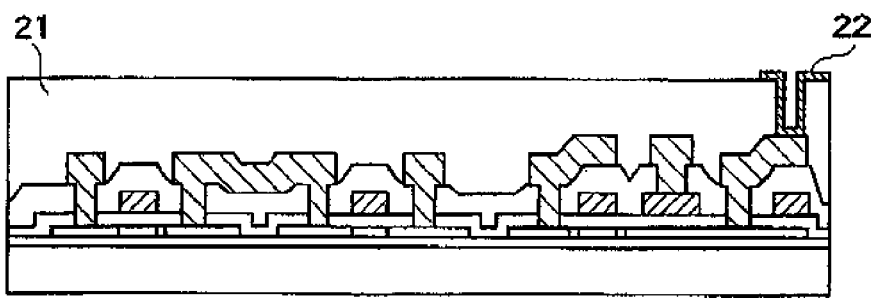

FIG. 46 is a sectional view showing the structure of a TFT array used in an example of the invention. With reference to FIG. 46, the unit structure of a polycrystalline silicon TFT array is explained below in which amorphous silicon was modified into polycrystalline silicon.

A polycrystalline silicon TFT of FIG. 46 was fabricated by forming a silicon oxide film 28 on a glass substrate 29 and then growing amorphous silicon. Next, annealing was performed using an excimer laser, so that the amorphous silicon was polycrystallized into a polycrystalline silicon film 27. After that, a 10-nm silicon oxide film 28 was grown. After patterning, a photoresist was patterned in a size slightly larger than the gate shape (for the purpose of forming LDD regions 23 and 24 in a subsequent process). Then, phosphorous ions were doped so that a source region (electrode) 26 and a drain region (electrode) 25 were formed. After that, a silicon oxide film 28 used as a gate oxide film was grown. Then, amorphous silicon and tungsten silicide (WSi) serving as a gate electrode were grown. Then, a photoresist is patterned. Then, using the photoresist as a mask, the amorphous silicon and the tungsten silicide (WSi) were patterned into a gate electrode shape. Further, using the patterned photoresist as a mask phosphorous ions were doped only into necessary regions, so that LDD regions 23 and 24 were formed. After that, the silicon oxide film 28 and the silicon nitride film 21 were grown continuously. Then, holes for contact were fabricated. Then, aluminum and titanium were formed by sputtering, and then patterned so that a source electrode 26 and a drain electrode 25 were formed. After that, a silicon nitride film 21 was formed over the entire surface. Then, holes for contact were fabricated. Then, an ITO film was formed over the entire surface, and then patterned so that a transparent pixel electrode 22 was formed. As such, a planar type TFT pixel switch as shown in FIG. 46 was fabricated so that a TFT array was fabricated. Finally, a pixel array and a scanning circuit composed of TFT switches were obtained on the glass substrate.

In FIG. 46, a TFT was fabricated in which amorphous silicon was polycrystallized. However, the TFT may be formed by growing polycrystalline silicon and then improving the particle diameter of the polycrystalline silicon by laser irradiation. Further, the laser may be a continuous wave (CW) laser in place of the excimer laser.

Further, when the process of polycrystallizing the amorphous silicon by laser irradiation is omitted, an amorphous silicon TFT array can be formed.

FIG. 47(a) through FIG. 47(d) and FIG. 48(a) through FIG. 48(d) are sectional views showing a fabrication method for a polycrystalline silicon TFT (planar structure) array, in the order of processes. With reference to FIG. 47(a) through FIG. 47(d) and FIG. 48(a) through FIG. 48(d), the fabrication method for a polycrystalline silicon TFT array is explained below in detail. After a silicon oxide film 11 was formed on a glass substrate 10, amorphous silicon 12 was grown. Next, annealing was performed using an excimer laser, so that the amorphous silicon was polycrystallized (FIG. 47(a)). Then, a 10-nm thickness silicon oxide film 13 was grown. After patterning (FIG. 47(b)), a photoresist 14 was applied and patterned (a p-channel region was masked). Then, phosphorous (P) ions were doped so that source and drain regions of the n-channel were formed (FIG. 47(c)). Then, after a 90-nm thickness silicon oxide film 15 serving as a gate insulating film was grown, amorphous silicon 16 and tungsten silicide (WSi) 17 serving as a gate electrode were grown and then patterned into a gate shape (FIG. 47(d)).

A photoresist 18 was applied and patterned (an n-channel region was masked). Then, boron (B) was doped so that source and drain regions of the n-channel were formed (FIG. 48(a)). After the silicon oxide film and the silicon nitride film 19 were grown continuously, holes for contact were fabricated (FIG. 48(b)). Then, aluminum and titanium 20 were formed by sputtering, and then patterned FIG. 48(c)). As a result of this patterning, formed are: source and drain electrodes of the CMOS of the peripheral circuit: data line wiring connected to the drain of the pixel switch TFT; and a contact to the pixel electrode. After that, a silicon nitride film 21 serving as an insulating film was formed. Then, holes for contact were fabricated. Next, an ITO (indium tin oxide) 22 which was a transparent electrode serving as a pixel electrode was formed and patterned FIG. 48(d)).

As such, a TFT pixel switch of a planar structure was formed so that a TFT array was formed. The gate electrode was composed of tungsten silicide. However, another type of electrode such as a chromium electrode may be employed.

Liquid crystal was retained between the TFT array substrate fabricated as described here and an opposing substrate provided with opposing electrodes, so that a liquid crystal display panel was formed. The opposing electrodes were fabricated by forming an ITO film over the entire surface of a glass substrate used as an opposing substrate, then patterning the film, and thereby forming a chromium patterning layer for light shielding. The chromium patterning layer for light shielding may be formed before the forming of the ITO film over the entire surface. Further, 2-µm columns were patterned on the opposing substrate. These columns were used as spacers for maintaining the cell gap and, at the same time, provided with shock resistance. The height of the columns for maintaining the cell gap may be changed appropriately depending on the design of the liquid crystal panel. Orientation films were printed on the mutually opposing surfaces of the TFT array substrate and the opposing substrate, and then rubbed with each other such that the orientation should be achieved at 90 degrees with each other after assembling.

After that, sealant of ultraviolet curing was applied to the outside of the pixel region of the opposing substrate. Then, after the TFT array substrate and the opposing substrate were opposed and bonded to each other, liquid crystal was introduced so that a liquid crystal panel was formed.

The chromium patterning layer serving as a light shielding film has been provided on the opposing substrate. However, the layer may be provided on the TFT array substrate. Further, obviously, the light shielding film may be composed of any kind of material other than chromium, as long as the material can shield light. For example, WSi (tungsten silicide), aluminum, silver alloy, and the like may be used.

When the chromium patterning layer for light shielding is formed on the TFT array substrate, three kinds of structures are possible. In a first structure, the chromium patterning layer for light shielding is formed on the glass substrate. After the forming of the patterning layer for light shielding, the fabrication can be performed similarly to the above-mentioned process. In a second structure, after a TFT array substrate is fabricated into the above-mentioned structure, the chromium patterning layer for light shielding is finally fabricated. In a third structure, in the middle of fabricating the above-mentioned structure, the chromium patterning layer for light shielding is fabricated. When the chromium patterning layer for light shielding is formed on the TFT array substrate, such a chromium patterning layer for light shielding need not be fabricated on the opposing substrate. Thus, the opposing substrate can be fabricated by forming an ITO film over the entire surface and then patterning the film.

As described above, in an example of the invention, nematic liquid crystal was retained between the above-mentioned TFT array substrate and the opposing substrate, while orientation was achieved that was twisted at 90 degrees between both substrates and thereby implementing the TN mode. Further, a part of the scan electrode driving circuit, the signal electrode driving circuit, and the synchronizing circuit, as well as a part of the common electrode potential control circuit, were fabricated on the glass substrate.

A TFT panel fabricated as described above was used, while driving was performed in such a manner that overdrive was applied to the video signal and that a pulse shape change was applied to the common electrode potential. Further, liquid crystal having p/d=3 was used. Furthermore, a comparison operation circuit for video signal generation was also provided. In this configuration, color field sequential driving was performed at 180 Hz. A backlight composed of an LED was used as a color time-sharing light source.

The pixel pitch used was 17.5 µm, while display was performed at a resolution of VGA (horizontal 640 and vertical 480) within a display having a diagonal length of 0.55 inches. Further, a buffer amplifier composed of a thin-film transistor was provided for a pixel at a corner of the display area, so that fluctuation in the pixel potential was measured. Further, a buffer amplifier for buffer amplifier characteristics measurement connected to the pixel electrode and having been fabricated similarly was provided in the substrate. The values of the pixel potential described below are values obtained from the measurement results of the buffer amplifier for buffer amplifier characteristics measurement and by correcting the output voltage by taking the gain and the offset into consideration.

Figure 36A:
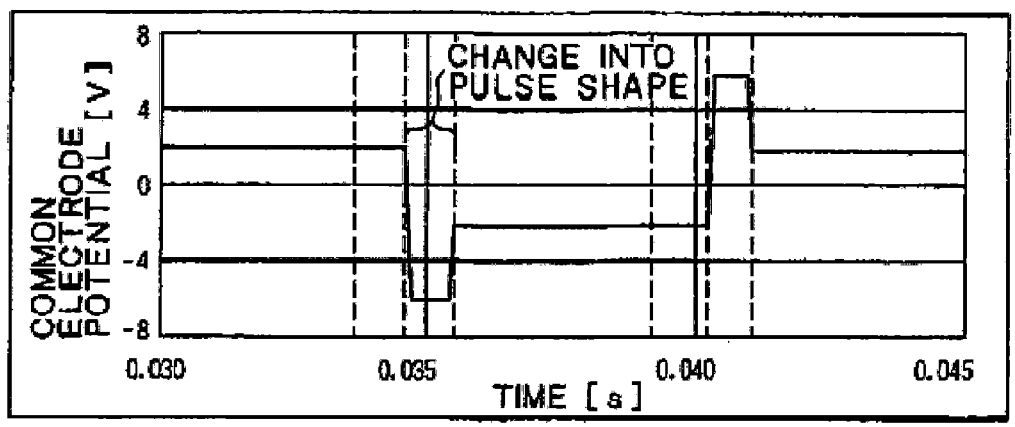
FIG. 36 (A) is a graph showing measurement results of variations in potential and transmittance with respect to time in an example of the invention.
Figure 36B:
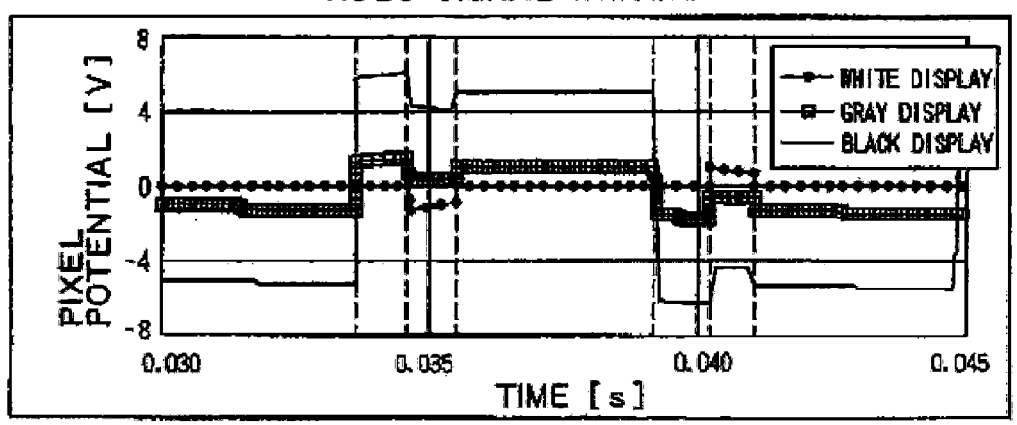
Figure 36C:
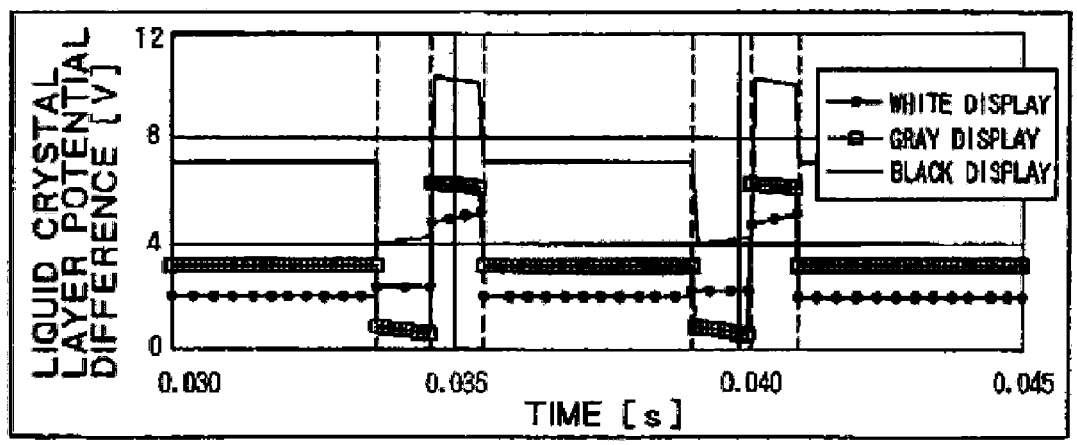
Figure 36D:
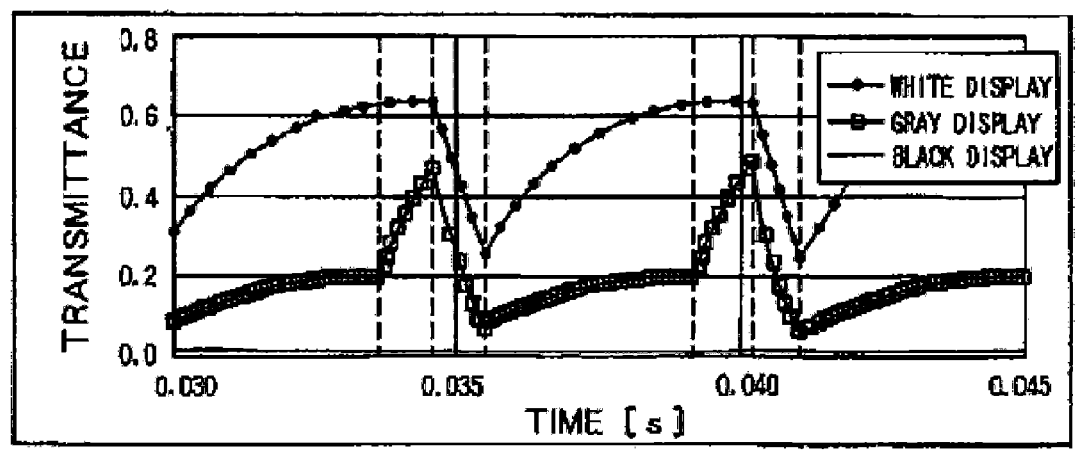

FIG. 36 (A) through FIG. 36D show time-dependent behavior between the transmittance and one of the common electrode potentials, the pixel electrode potential, and the potential difference of the liquid crystal layer obtained from these potentials in this example. Here, in the potential measurement, three kinds of gradation voltages for white image, black image, and gray image (representing an intermediate gradation state) were used. As seen from FIG. 36 (A), the common electrode potential was changed similarly to FIG. 28. As seen from FIG. 36 (B), the pixel potential varies in response to writing of the video signals. Further, also in a period without writing of the video signals, this value fluctuates in association with the response of the liquid crystal. This is because even when the electric charge accumulated between the pixel electrode and the common electrode is maintained approximately constant, the capacitance of the liquid crystal layer varies in association with the response of the liquid crystal, so that a change arises in the pixel potential. Further, when a pulse shape change is started to be provided to the common electrode potential, the pixel potential fluctuates remarkably owing to the capacitance coupling. FIG. 36 (C) shows the potential difference of the liquid crystal layer corresponding to the absolute value of the difference between the pixel electrode potential and the common electrode potential. The pulse height portion of the pulse shape change has a larger potential difference than the other period. This indicates that an overdrive-like effect is achieved. In the period of the pulse height portion, the fluctuation is large in the pixel potential in association with the liquid crystal response. This suggests that the response of the liquid crystal is increased so that a rapid change arises in the capacitance of the liquid crystal layer. At the time of completion of the pulse shape change, the pixel potential fluctuates again owing to the capacitance coupling. FIG. 36 (D) shows the time-dependent change in the transmittance obtained from these waveforms. The transmittance is shown in an arbitrary unit. When the video signal is written, the transmittance begins to vary. Then, in a period that the pulse shape change is provided, a rapid transmittance change arises. After the completion of the pulse shape change, the transmittance varies in a direction approaching a stable state of each condition.

Figure 37:
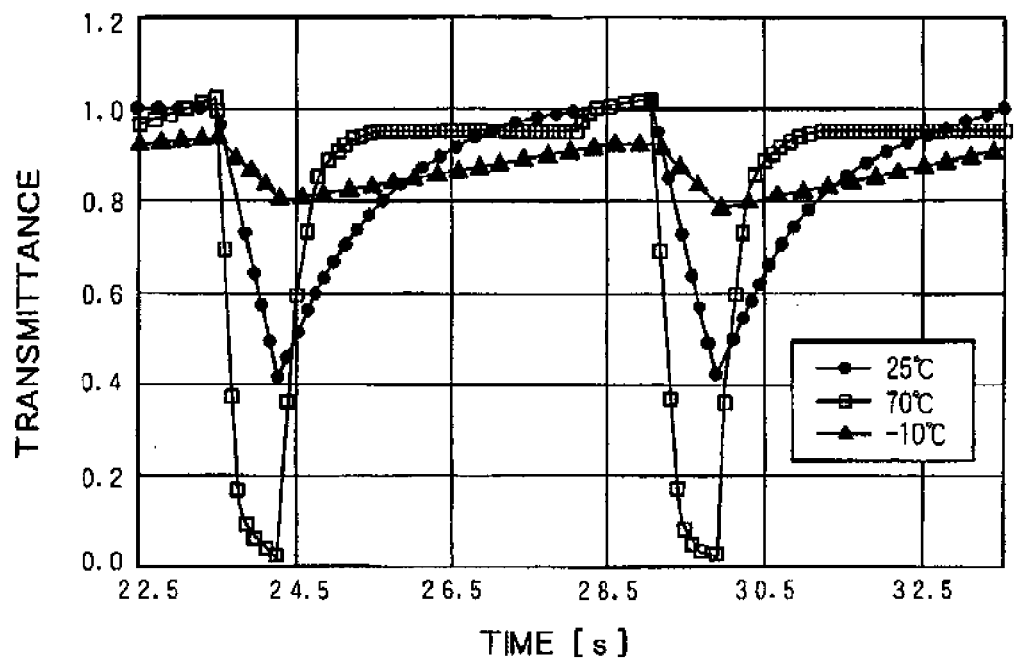
FIG. 37 is a graph showing a variation in transmittance with respect to time measured by changing temperature in the example of the invention.
Figure 38:
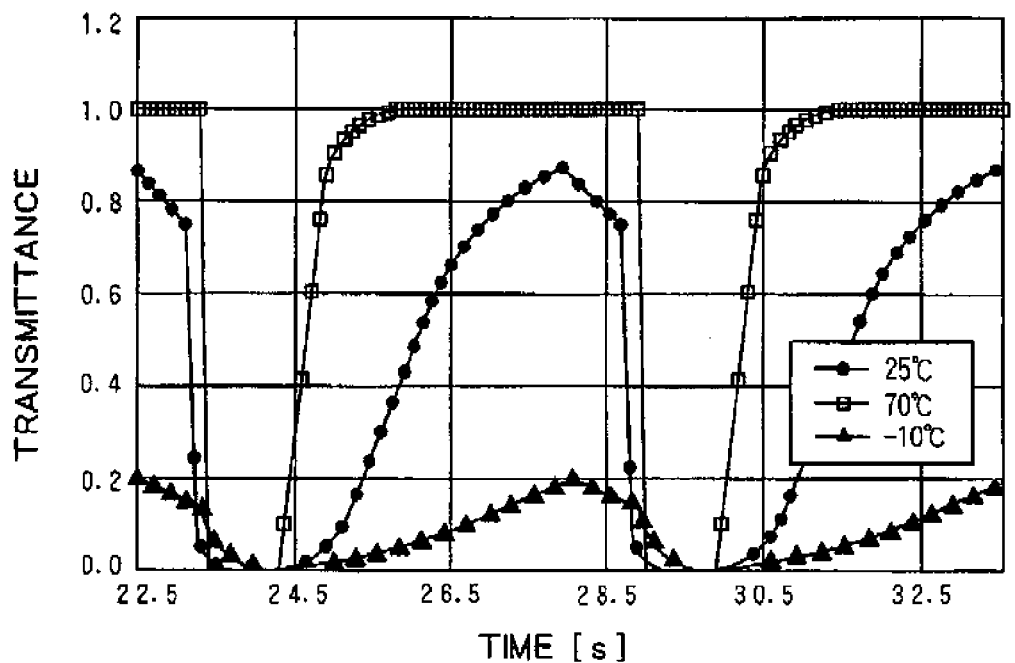
FIG. 38 is a graph showing a variation in transmittance with respect to time measured by changing temperature in a comparative example.
Figure 39:
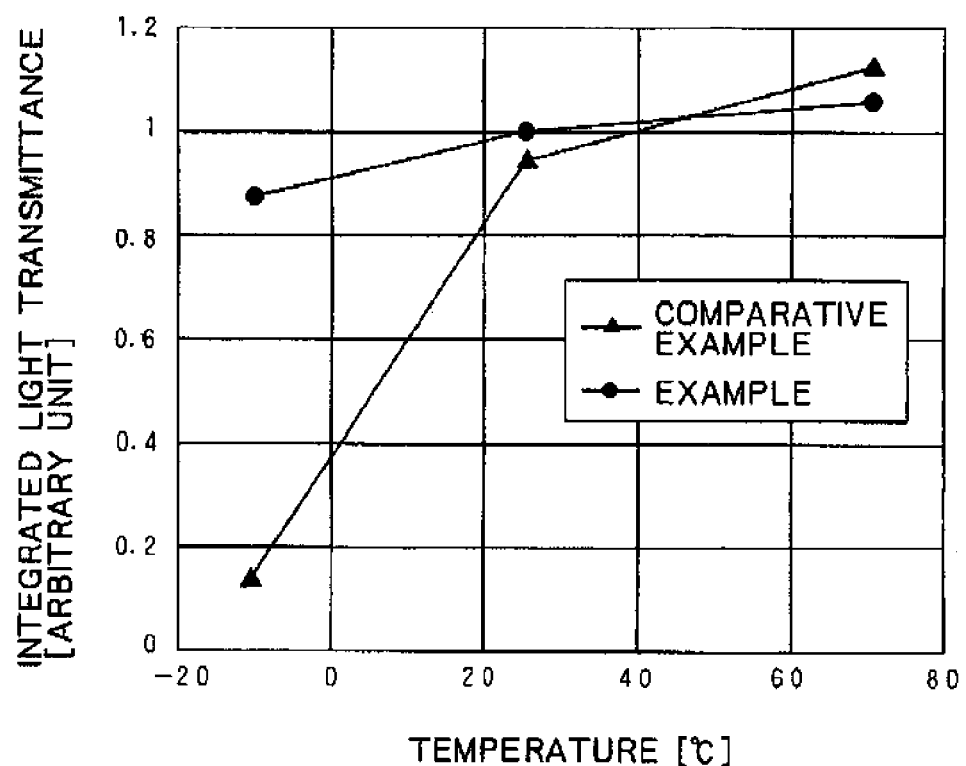
FIG. 39 is a graph showing the dependence of integrated light transmittance on temperature in the example and comparative example of the invention.

Next, the characteristics of the display apparatus of an example of the invention ware measured in the case that the environmental temperature varies. Further, the characteristics of this example ware compared with a comparative example of a 180-Hz color field sequential display apparatus employing a method of a first publication (Japanese Translation of International Application (Kohyo) No. 2001-506376) adopting a combination of overdrive and reset driving. In order that the influence of temperature should be recognized accurately, in the measurement, the display apparatus was installed in a thermostatic oven. Then, a temperature sensor adhered to the display unit was monitored, while the actual measurement was performed after 30 minutes had elapsed after a desired temperature had been obtained, so that the display unit was stably controlled into a desired temperature. FIG. 37 shows the situation of time-dependent change of the transmittance in a white image in an example of the invention when the temperature was changed between −10° C., 25° C., and 70° C. FIG. 38 shows the situation of time-dependent change of the transmittance in a white image in a comparative example when the temperature was changed between −10° C., 25° C., and 70° C. In the example of the invention, after the pulse shape change is completed, the transmittance approaches a stable state, so that the transmittance reaches approximately the same value for every temperature. In contrast, in the comparative example, at 70° C., the transmittance rises rapidly after the reset, whereas the value rises only gradually at 25° C. Further, at −10° C., the transmittance hardly rises, and reaches only ⅕ or the like of the maximum achievable transmittance reached at 70° C. FIG. 39 shows the comparison, between an example of the invention and a comparative example, of the temperature dependence of integrated light transmittance which is a value obtained by integrating the transmittance over the period that the light source is turned ON in the color field sequential method. In actual usage, the mean transmittance over the illumination period is more important than the maximum achievable transmittance. Here, the integrated light transmittance is used as the index. In the comparative example, a rapid change arises in the integrated light transmittance in association with the temperature change. At −10° C., the value is approximately ¹⁄₁₀ of that at 70° C. Thus, the apparatus of the comparative example cannot be used at low temperatures.

Figure 40:
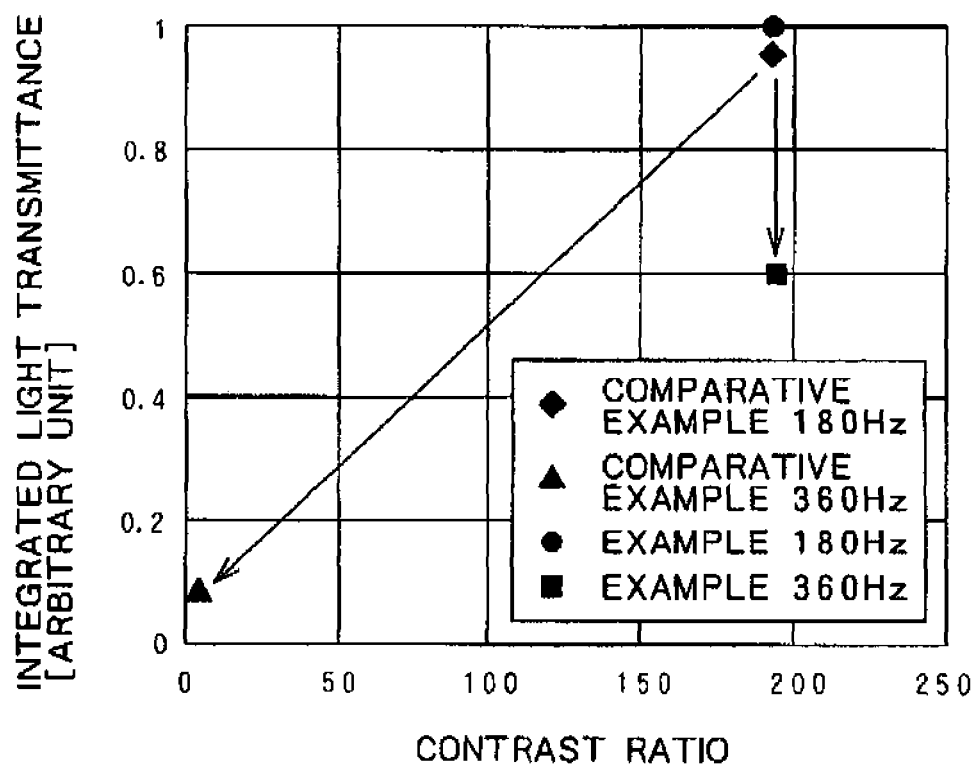
FIG. 40 is a graph showing the dependence of a contrast ratio and integrated light transmittance on a driving frequency in the example and comparative example of the invention.
Figure 41A:
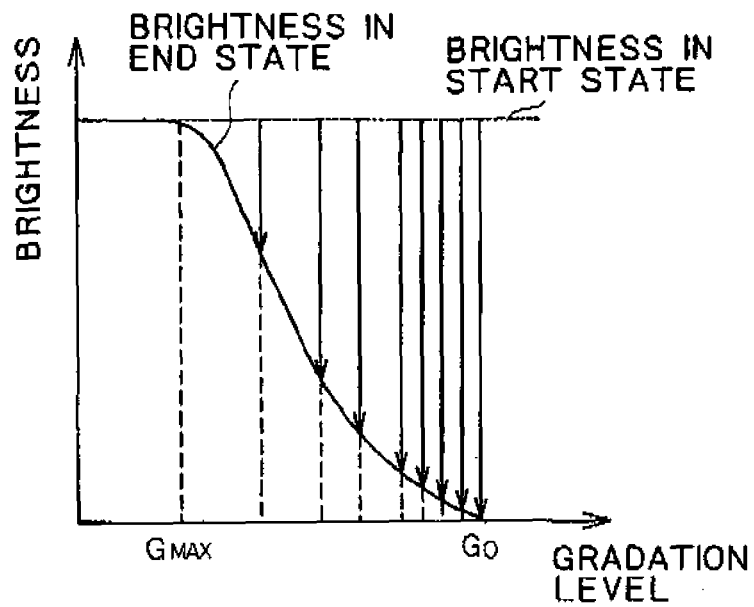
FIG. 41 (A) is a view showing an outline of a method for determining an on-time response and an off time response of a twisted nematic liquid crystal during a normally white image.
Figure 41B:
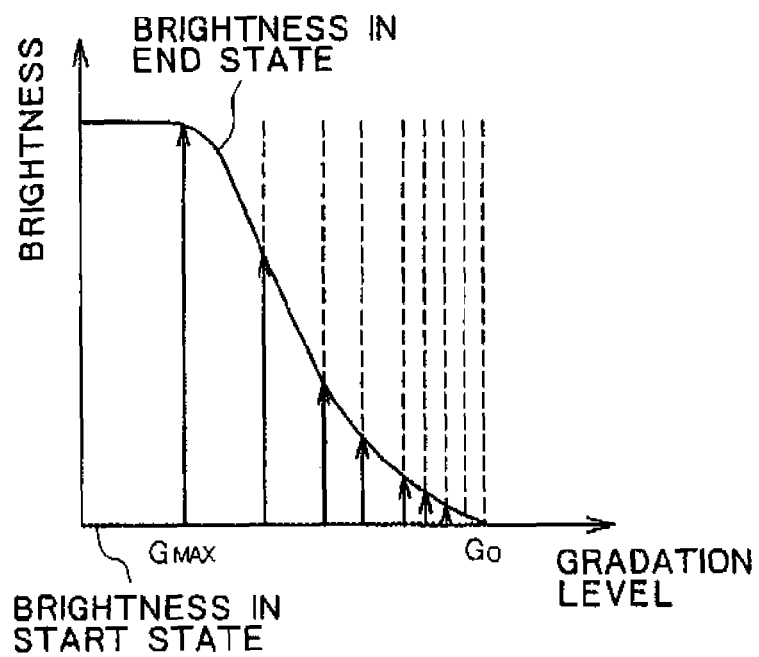
Figure 42:
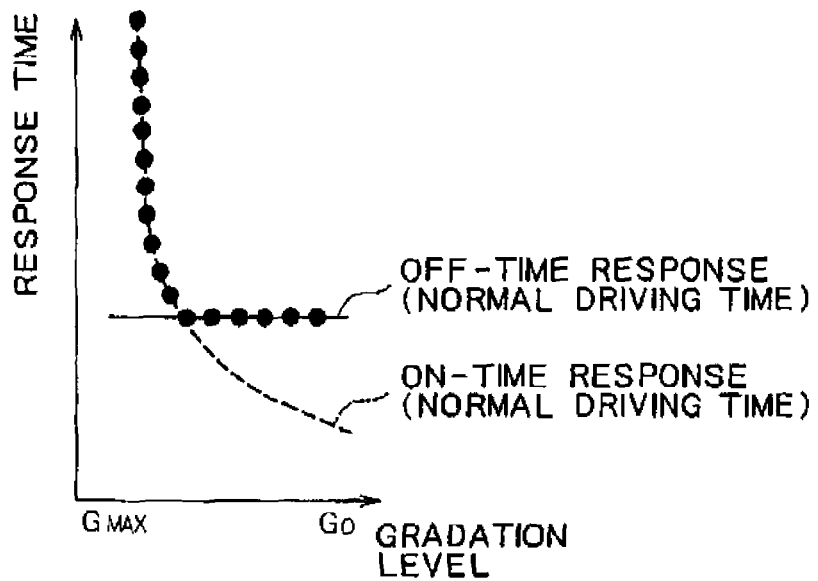
FIG. 42 is a conceptual view showing an exemplary response time of a liquid crystal display apparatus using a normal driving method.
Figure 43:
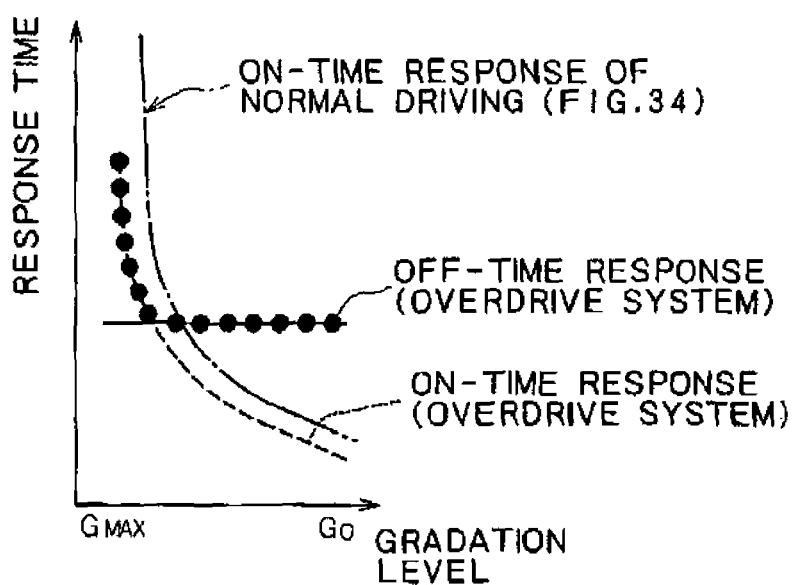
FIG. 43 is a conceptual view showing an exemplary response time of a liquid crystal display apparatus using overdrive.
Figure 44:
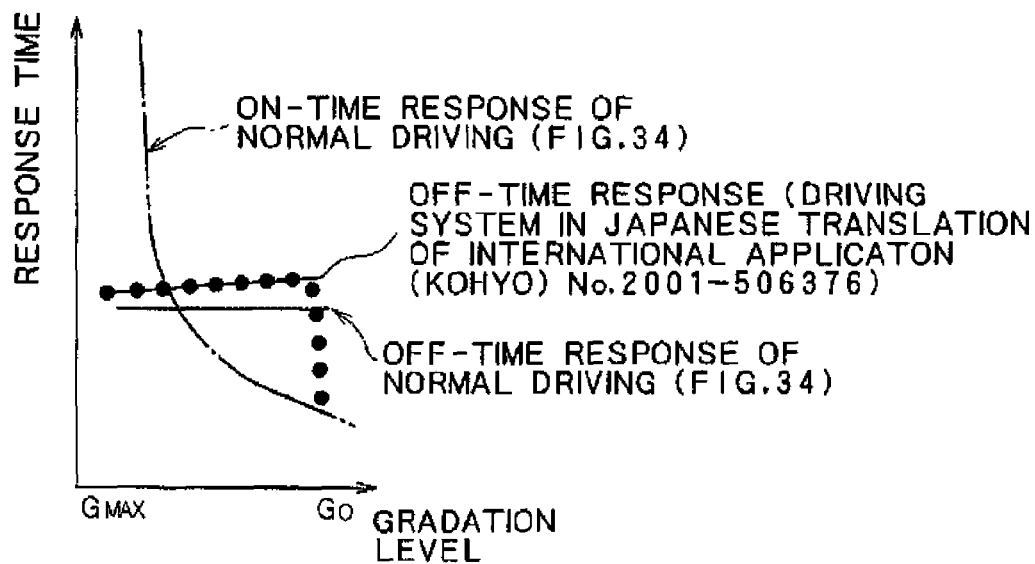
FIG. 44 is a conceptual view showing an exemplary response time of a liquid crystal display apparatus using a driving method described in the first publication (Japanese Translation of International Application (Kohyo) No. 2001-506376), i.e., a driving method developed by roughly combining overdrive and reset.
Figure 45:
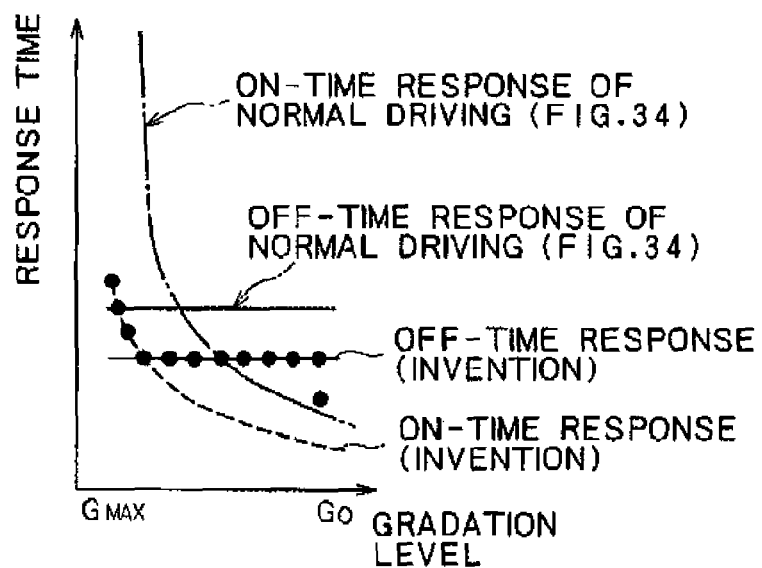
FIG. 45 is a conceptual view showing an exemplary response time of a liquid crystal display apparatus according to the present invention.

Further, the characteristics of the display apparatus of the invention ware measured in the case that the frequency of the color field sequential method is increased. Similarly to FIG. 37 through FIG. 39, the display apparatus employing the method of the first publication (Japanese Translation of International Application (Kohyo) No. 2001-506376) was used in a comparative example. Used frequencies were 180 Hz and 360 Hz, while the integrated light transmittance and the contrast ratio were measured. Results are shown in FIG. 40. As seen from FIG. 40, at 180 Hz, the integrated light transmittance and the contrast ratio are approximately the same between the example and the comparative example. At 360 Hz, the comparative example shows a rapid decrease both in the integrated light transmittance and in the contrast ratio. As a result, the image was hardly recognized visually. In contrast, in the example of the invention, at 360 Hz, the integrated light transmittance has decreased to approximately 60% of the value of 180 Hz, whereas the contrast ratio was almost unchanged. Thus, a good and visually recognizable display was achieved, although slightly darker than that of 180 Hz.

In the liquid crystal display apparatus of this example, a brightness of 150 candela per square meter or greater was obtained. Thus, even under comparatively intense outdoor daylight, the display could be visually recognized well. Further, under extremely more intense light, the backlight was turned OFF in response to a signal from an optical sensor, so that the apparatus could serve as a monochrome type display apparatus.

As such, according to the present invention, in a transmission type twisted nematic liquid crystal display apparatus, remarkably high-speed response is achieved that permits color field sequential driving at 360 Hz.

Further, in the overdrive for a video signal according to the present invention, a lower voltage may be used than in the prior art overdriving method. In this example, a voltage of 6V is applied in a black image as in the case of the pixel potential of FIG. 36 (B). When normal driving is performed for the liquid crystal material used here, since an applied voltage of 5V is necessary in a black image, the voltage in the overdrive is 1V. On the other hand, in the prior art overdriving method, a voltage of 2-3V is applied in general. That is, 7-8V is necessary in the prior art method for the material of this example, while 6V is sufficient in the example. This difference arises from the fact that the speedup is achieved effectively in the invention by means of the pulse shape change in the common electrode potential and the like which is equivalent to two-stage overdrive.

As described above, the invention is remarkably useful for the speedup of the response and the like of a liquid crystal display apparatus.

What is claimed is:

1. A liquid crystal display apparatus comprising:
   a liquid crystal display unit;
   a video signal driving circuit;
   a scanning signal driving circuit;
   a common electrode potential controlling circuit; and
   a synchronizing circuit,
   wherein the liquid crystal display unit comprises:
      a scanning electrode,
      a video signal electrode,
      a plurality of pixel electrodes arranged in matrix form,
      a plurality of switching elements which transmit video signals to the pixel electrodes, and
      a common electrode, and
   wherein the common electrode potential controlling circuit changes the potential of the common electrode into a pulse shape after the scanning signal driving circuit scans the entire scanning electrodes and transmits video signals to the pixel electrodes,
   the potentials of the video signals is determined by comparing the hold data of the individual pixels before the writing of the video signals, a variation in the potentials of the pixel electrodes associated with a variation in the potentials of the common electrodes to be changed into a pulse shape, the potentials of the storage capacitance electrodes to be changed into a pulse shape, or the potentials of both of them, and display data to be newly displayed, and,
   the comparison of the data and the variation in the potentials is made by using look up tables (LUTs) prepared in advance, said LUTs differing from one another according to the polarity of the video signals.

2. The liquid crystal display apparatus according to claim 1, wherein said LUTs differ from one another according also to the colors of light beams of the light irradiating unit changed by synchronizing with the video signals at the predetermined phase, in addition to the polarity of the video signals.

3. The liquid crystal display apparatus according to claim 1, wherein the potential of the common electrode changed into a pulse shape is a potential which does not reset display on the liquid crystal display unit.

4. The liquid crystal display apparatus according to claim 1, wherein the potential of the common electrode varies among at least three potentials.

5. The liquid crystal display apparatus according to claim 1 wherein the potential of the common electrode or the storage capacitance electrode is changed into a pulse shape, thereby temporarily increasing a potential difference between the potential of the pixel electrode and the potential of the common electrode or the storage capacitance electrode.

6. The liquid crystal display apparatus according to claim 1 wherein the potential of the video signal is different from the potential of a video signal in a stable state during static driving in consideration of the response characteristics of the liquid crystal display unit during charge holding type driving.

7. The liquid crystal display apparatus according to claim 6 wherein the potential of the video signal is determined by taking into account the response characteristics of the liquid crystal display unit and by comparing the hold data of individual pixels before the writing of the video signal and display data to be newly displayed.

8. The liquid crystal display apparatus according to claim 1, further comprising a field response type substance sandwiched between the pixel electrodes and the common electrode of the liquid crystal display unit.

9. The liquid crystal display apparatus according to claim 8 wherein the field response type substance is made of a liquid crystal substance.

10. The liquid crystal display apparatus according to claim 9 wherein the liquid crystal substance is a nematic liquid crystal and has a twisted nematic alignment.

11. The liquid crystal display apparatus according to claim 10 wherein p/d<20, wherein p is the twist pitch of the twisted nematic alignment of the liquid crystal substance measured in µm, and d is the average thickness of the layer of the liquid crystal substance having the twisted nematic alignment measured in µm.

12. The liquid crystal display apparatus according to claim 11 wherein p/d<8, wherein p is the twist pitch of the twisted nematic alignment of the liquid crystal substance measured in µm and d is the average thickness of the layer of the liquid crystal substance having the twisted nematic alignment measured in µm.

13. The liquid crystal display apparatus according to claim 10 wherein the liquid crystal substance having the twisted nematic alignment is stabilized by a polymer having a structure almost continuously twisted.

14. The liquid crystal display apparatus according to claim 9 wherein the liquid crystal substance is in an electrically controlled birefringence mode.

15. The liquid crystal display apparatus according to claim 9 wherein the liquid crystal substance has a bend-type alignment.

16. The liquid crystal display apparatus according to claim 15 further comprising an optically compensated plate used in an OCB (optically compensated birefringence) mode.

17. The liquid crystal display apparatus according to claim 9 wherein the liquid crystal substance is in a VA (vertical alignment) mode in which homeotropic alignment develops.

18. The liquid crystal display apparatus according to claim 17 wherein the liquid crystal substance is provided with multidomains.

19. The liquid crystal display apparatus according to claim 9 wherein the liquid crystal substance is in an IPS (in-plane switching) mode in which the liquid crystal substance responds by the action of an electric field which acts roughly parallel to a substrate surface.

20. The liquid crystal display apparatus according to claim 9 wherein the liquid crystal substance is in a FFS (fringe field switching) mode or an AFFS (advanced fringe field) mode.

21. The liquid crystal display apparatus according to claim 9 wherein the liquid crystal substance is a ferroelectric liquid crystal substance, an antiferroelectric liquid crystal substance, or a liquid crystal substance exhibiting an electroclinic type response.

22. The liquid crystal display apparatus according to claim 9 wherein the liquid crystal substance is a cholesteric liquid crystal substance.

23. The liquid crystal display apparatus according to claim 9 wherein the liquid crystal substance is stabilized by a polymer having a structure in a state in which no voltage is applied or a low voltage is applied.

24. The liquid crystal display apparatus according to claim 1 wherein the liquid crystal display unit further comprising a color filter.

25. The liquid crystal display apparatus according to claim 1 wherein a lenticular lens sheet, a lenticular film, or a double-sided prism sheet is provided to the liquid crystal display unit to produce a stereoscopic display.

26. The liquid crystal display apparatus according to claim 1 wherein a color field sequential system is used in which a video signal is divided into a plurality of color video signals which correspond to a plurality of colors, light sources corresponding to the plurality of colors are synchronized with the plurality of color video signals at a predetermined phase difference, and the plurality of color video signals are displayed in time sequence.

27. The liquid crystal display apparatus according to claim 26 wherein a stereoscopic display system of the color field sequential type is used in which video signals consist of video signals for the right eye and video signals for the left eye, the video signals for one eye are divided into a plurality of color video signals which correspond to a plurality of colors, light sources, which correspond to the colors and which are provided at two places, are synchronized with the video signals for one eye at a predetermined phase difference and are synchronized with the color video signal to display the video signals for one eye in time sequence, and at the same time, the video signals for one eye are displayed in time sequence as a plurality of color video signals divided.

28. The liquid crystal display apparatus according to claim 1 wherein the pixel switch is an amorphous silicon thin film transistor display apparatus comprising a thin film transistor of amorphous silicon.

29. The liquid crystal display apparatus according to claim 1 wherein the pixel switch is a polycrystalline silicon thin film transistor display apparatus comprising a thin film transistor of polycrystalline silicon.

30. The liquid crystal display apparatus according to claim 1 wherein the pixel switch comprises a transistor of a single-crystalline silicon.

31. The liquid crystal display apparatus according to claim 1 wherein the polarity of the video signals is reversed with a predetermined timing, and among the potentials of the common electrodes which varies between a plurality of potentials, one or two potentials whose application time periods are longer than those of the other potentials are approximately equal to an intermediate potential between the maximum potential and the minimum potential of all the potentials applied as the video signals.

32. The liquid crystal display apparatus according to claim 1 wherein the polarity of the video signals is reversed with a predetermined timing, and among the potentials of the common electrodes which varies between a plurality of potentials, one or two potentials whose application time periods are longer than those of the other potentials are approximately equal to either the maximum potential or the minimum potential of the all the potentials which can be applied as the video signals.

33. The liquid crystal display apparatus according to claim 1 wherein the common electrode potentials, which are provided immediately before the scanning signal driving circuit starts to scan the scanning electrode, are equal to the common electrode potentials produced immediately after the scanning signal driving circuit scans the entire scanning electrodes and transmits video signals to the pixel electrodes and before the common electrode potentials are changed into a pulse shape.

34. The liquid crystal display apparatus according to claim 1 wherein the common electrode potentials, which are provided immediately before the scanning signal driving circuit starts to scan the scanning electrode, are different from the common electrode potentials produced immediately after the scanning signal driving circuit scans the entire scanning electrodes and transmits video signals to the pixel electrodes and before the common electrode potentials are changed into a pulse shape.

35. The liquid crystal display apparatus according to claim 34 wherein the common electrode potentials, which are provided immediately before the scanning signal driving circuit starts to scan the scanning electrode, are approximately equal to one of a maximum voltage and a minimum voltage which can be produced as video signals to be applied and the common electrode potentials, which are provided immediately after the scanning signal driving circuit scans the entire scanning electrodes and transmits video signals to the pixel electrodes and before the common electrode potentials are changed into a pulse shape, are approximately equal to the other of the maximum voltage and the minimum voltage which can be produced as video signals which have been applied.

36. A driving method for a liquid crystal display apparatus wherein in a driving method for the liquid crystal display apparatus according to claim 31, the common electrode potential varies among four potentials, the first potential being the common electrode potential provided at a time period over which the scanning signal driving circuit scans the scanning electrode to transmit video signals having one polarity of the video signals reversed, the second potential being the potential of the pulse height portion developed when the common electrode potential is changed into a pulse shape following the provision of the first potential, the third potential being a potential, which is developed after the common electrode potential is changed into a pulse shape following the development of the second potential, and the common electrode potential at a time period over which the scanning signal driving circuit scans the scanning electrode to transmit video signals having the other polarity of the video signals reversed, the fourth potential being the potential of the pulse height portion formed when the common electrode potential is changed into a pulse shape following the development of the third potential.

37. A driving method for a liquid crystal display apparatus wherein in a driving method for the liquid crystal display apparatus according to claim 32, the common electrode potential varies among six potentials, the first potential being the common electrode potential provided at a time period over which the scanning signal driving circuit scans the scanning electrode to transmit video signals having one polarity of the video signals reversed, the second potential being the potential of the pulse height portion formed when the common electrode potential is changed into a pulse shape following the provision of the first potential, the third potential being a potential developed after the common electrode potential is changed into a pulse shape following the development of the second potential, the fourth potential is the common electrode potential developed at a time period over which the scanning signal driving circuit scans the scanning electrode to transmits video signals having the other polarity of the video signals reversed, the fifth potential being the potential of the pulse height portion formed when the common electrode potential is changed into a pulse shape following the development of the fourth potential, the sixth potential being a potential developed after the common electrode potential is changed into a pulse shape following the development of the fifth potential.

38. The liquid crystal display apparatus according to claim 1 further comprising a light irradiating unit, which irradiates the liquid crystal display unit with light, and a synchronizing circuit which synchronizes the intensity of light from the irradiating unit with the video signals at a predetermined phase for modulation.

39. The liquid crystal display apparatus according to claim 1 further comprising a light irradiating unit, which irradiates the liquid crystal display unit with light, and a synchronizing circuit which synchronizes the colors of light from the light irradiating unit with the video signals at a predetermined phase to change the colors.

40. The liquid crystal display apparatus according to claim 1 further comprising a light irradiating unit, which irradiates the liquid crystal display unit with light, and a synchronizing circuit which synchronizes the intensity of light from the light irradiating unit with the video signals at a predetermined phase for modulation and which synchronizes the colors of the light from the light irradiating unit with the video signals at a predetermined phase to change the colors.

41. The liquid crystal display apparatus according to claim 38 wherein the light intensity of the light irradiating unit is synchronized with the video signals at a predetermined phase according to the polarity of the video signals for modulation.

42. A driving method for a liquid crystal display apparatus wherein in a driving method for the liquid crystal display apparatus according to claim 38, when the division into individual fields or a plurality of colors is conducted, the timing of modulating the light intensity of the light irradiating unit or of changing the color of the light is present during a fixed time period after the completion of subfield corresponding to the colors or a fixed time period immediately before the writing of the video signals of the next field.

43. A driving method for a liquid crystal display apparatus wherein in a driving method for the liquid crystal display apparatus according to claim 39, when the division into individual fields or a plurality of colors is conducted, the timing of modulating the light intensity of the light irradiating unit or of changing the color of the light is present during a fixed time period after the completion of subfield corresponding to the colors or a fixed time period immediately before the writing of the video signals of the next field.

44. A driving method for a liquid crystal display apparatus wherein in a driving method for the liquid crystal display apparatus according to claim 40, when the division into individual fields or a plurality of colors is conducted, the timing of modulating the light intensity of the light irradiating unit or of changing the color of the light is present during a fixed time period after the completion of subfield corresponding to the colors or a fixed time period immediately before the writing of the video signals of the next field.

45. The liquid crystal display apparatus according to claim 2 wherein the LUTs describe a relationship between input video data and output voltage to the liquid crystal display unit according to the order of the change in the polarity of the video signals and the order of the change in the colors of light beams of the light irradiating unit.

46. The liquid crystal display apparatus according to claim 1, wherein in the change into the pulse shape not to be reset of the liquid crystal display apparatus using the twisted nematic liquid crystal, the mean tilt angle of the liquid crystal during the change into the pulse shape is 81° or less.

47. The liquid crystal display apparatus according to claim 46 wherein in the change into the pulse shape not to be reset, the mean tilt angle of the liquid crystal during the change into the pulse shape is 65° or less.

48. The liquid crystal display apparatus according to claim 1, wherein digital signals are used as the video signals, binary signals are used for the potentials applied to the display substance, and the display is produced by using integrated light digital driving in which gradation is represented in a time-base direction.

49. A near-eye apparatus comprising the liquid crystal display apparatus according to claim 1.

50. A projection apparatus comprising the liquid crystal display apparatus according to claim 1, and a projection optical system which projects base images of the display apparatus.

51. A portable terminal comprising the liquid crystal display apparatus according to claim 1.

52. A monitoring apparatus comprising the liquid crystal display apparatus according to claim 1.

53. A mobile display apparatus comprising the liquid crystal display apparatus according to claim 1.

* * * * *